(12) United States Patent
Kelbaugh et al.

(10) Patent No.: US 7,657,872 B2
(45) Date of Patent: Feb. 2, 2010

(54) PRODUCT TESTING AND BUG TRACKING SYSTEM

(75) Inventors: Michael Kelbaugh, Kirkland, WA (US); Dave Diederich, Kirkland, WA (US); Eric Bush, Monroe, WA (US)

(73) Assignee: Nintendo of America Inc., Redmond, WA (US)

( * ) Notice: Subject to any disclaimer, the term of this patent is extended or adjusted under 35 U.S.C. 154(b) by 1750 days.

(21) Appl. No.: 09/827,332

(22) Filed: Apr. 6, 2001

(65) Prior Publication Data

US 2002/0049962 A1 Apr. 25, 2002

Related U.S. Application Data

(60) Provisional application No. 60/242,075, filed on Oct. 23, 2000.

(51) Int. Cl.
*G06F 9/44* (2006.01)
(52) U.S. Cl. ............... 717/124; 717/125; 714/38
(58) Field of Classification Search ......... 717/124–135; 707/1, 500; 714/38, 39, 57; 709/227; 702/188; 345/87; 703/14; 379/9; 712/11; 716/4; 713/201
See application file for complete search history.

(56) References Cited

U.S. PATENT DOCUMENTS

| | | | | | |
|---|---|---|---|---|---|
| 4,877,404 | A | * | 10/1989 | Warren et al. ............... 434/118 |
| 5,530,867 | A | * | 6/1996 | Beran ............................ 706/12 |
| 5,596,714 | A | * | 1/1997 | Connell ........................ 714/38 |
| 5,598,333 | A | * | 1/1997 | Marsico, Jr. .................. 714/38 |
| 5,608,805 | A | * | 3/1997 | Mandell et al. ............... 381/77 |
| 5,685,775 | A | * | 11/1997 | Bakoglu et al. ............... 463/41 |
| 5,703,788 | A | * | 12/1997 | Shei et al. ...................... 716/4 |
| 5,742,754 | A | * | 4/1998 | Tse ............................... 714/38 |
| 5,754,760 | A | * | 5/1998 | Warfield ....................... 714/38 |
| 5,758,061 | A | * | 5/1998 | Plum ............................ 714/35 |
| 5,862,322 | A | * | 1/1999 | Anglin et al. ................. 714/57 |
| 5,896,535 | A | * | 4/1999 | Ronstrom .................... 717/131 |
| 5,907,705 | A | * | 5/1999 | Carter ......................... 717/122 |
| 6,113,645 | A | * | 9/2000 | Benitz et al. .................. 703/22 |
| 6,167,358 | A | * | 12/2000 | Othmer et al. .............. 702/188 |
| 6,189,084 | B1 | * | 2/2001 | Kurisu ......................... 712/11 |

(Continued)

OTHER PUBLICATIONS

Ghiassi et al., An integrated software testing system based on an object-oriented DBMS, 1992, IEEE, p. 101-109.*

(Continued)

*Primary Examiner*—Wei Y Zhen
*Assistant Examiner*—Phillip H Nguyen
(74) *Attorney, Agent, or Firm*—Nixon & Vanderhye P.C.

(57) ABSTRACT

An Internet-based, secure communications system is utilized for enabling communications between a video game tester, project coordinator and others with a game developer. A master bug log which compiles all uncovered bugs is accessible by a game developer and other authorized system users via a web server, which stores bug tracking system applications programs and associated data bases. Such a master bug log includes a file attachment capability permitting a digitized image file replicating a video game display screen sequence depicting the bug, to be attached for downloading to, for example, a game developer. Bugs may be sorted, for example, so that a game developer can retrieve only those bugs having a digitized file attachment. Game and debugging related messages may be exchanged between testers, project coordinators, and corporate contacts.

30 Claims, 52 Drawing Sheets

U.S. PATENT DOCUMENTS

| | | | |
|---|---|---|---|
| 6,192,108 B1* | 2/2001 | Mumford et al. | 379/9 |
| 6,243,833 B1* | 6/2001 | Hitchcock et al. | 714/33 |
| 6,282,701 B1* | 8/2001 | Wygodny et al. | 717/125 |
| 6,389,379 B1* | 5/2002 | Lin et al. | 703/14 |
| 6,397,244 B1* | 5/2002 | Morimoto et al. | 709/200 |
| 6,405,326 B1* | 6/2002 | Azagury et al. | 714/38 |
| 6,698,013 B1* | 2/2004 | Bertero et al. | 717/127 |
| 6,701,514 B1* | 3/2004 | Haswell et al. | 717/115 |
| 6,721,941 B1* | 4/2004 | Morshed et al. | 717/127 |
| 2001/0049697 A1* | 12/2001 | Johndrew et al. | 707/500 |
| 2002/0021272 A1* | 2/2002 | Zeh | 345/87 |
| 2002/0087882 A1* | 7/2002 | Schneier et al. | 713/201 |
| 2003/0088854 A1* | 5/2003 | Wygodny et al. | 717/130 |

OTHER PUBLICATIONS

McCallum, A fix in time, 1997, IEEE, p. 218-220.*

Whitaker, What is software testing? and why is it so hard, Jan. 2000, IEEE, 70-79.*

TeamShare Homepage, www.teamshare.com, 1 page. Accessed from the Internet Oct. 20, 2000.

tTrack Product Page, www.teamshare.com/PRODUCTS/mobile, 2 pages. Accessed from the Internet Oct. 20, 2000.

tTrack Product Page, www.teamshare.com/PRODUCTS/teamtrack, 1 page. Accessed from the Internet Oct. 20, 2000.

tSupport Product Page, www.teamshare.com/products/tsupport, 3 pages. Accessed from the Internet Oct. 20, 2000.

TeamShare News, www.teamshare.com/Partners/Index, 2 pages. Accessed from the Internet Oct. 20, 2000.

TeamShare Tech Note Library, www.teamshare.com/support/knowledge, 3 pages. Accessed from the Internet Oct. 20, 2000.

TeamShare Company Info, www.teamshare.com/company/index, 1 page. Accessed from the Internet Oct. 20, 2000.

TeamShare Main Products Page, www.teamshare.com/products/index, 1 page. Accessed from the Internet Oct. 20, 2000.

TeamShare Support, www.teamshare.com/support/index, 2 pages. Accessed from the Internet Oct. 20, 2000.

TeamShare Training, www.teamshare.com/training/index, 1 page. Accessed from the Internet Oct. 20, 2000.

TeamShare Tech Note Library, www.teamshare.com/support/knowledge, 3 pages. Accessed from the Internet Oct. 20, 2000.

TeamShare PR Jul. 12, 2000, www.teamshare.com/NEWS/pr_july_12_2000, 2 pages.

* cited by examiner

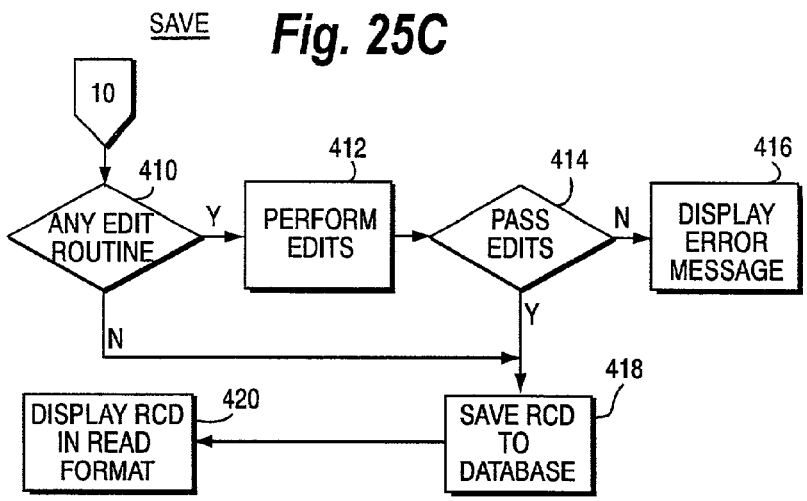
Fig. 25C SAVE
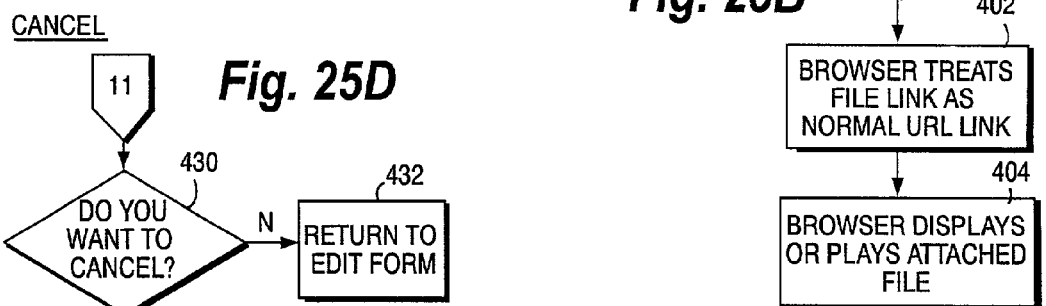
Fig. 25B FILE ATTACHMENT
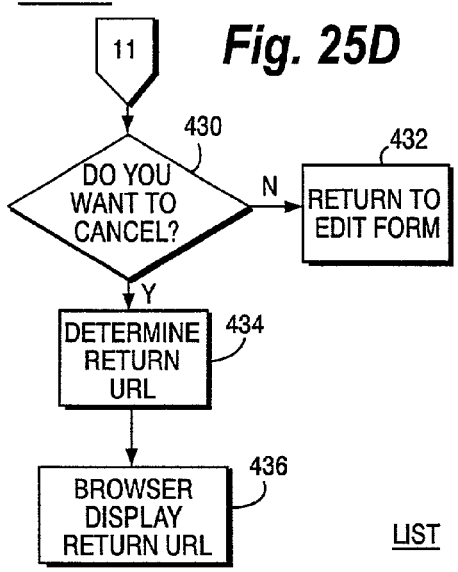
Fig. 25D CANCEL
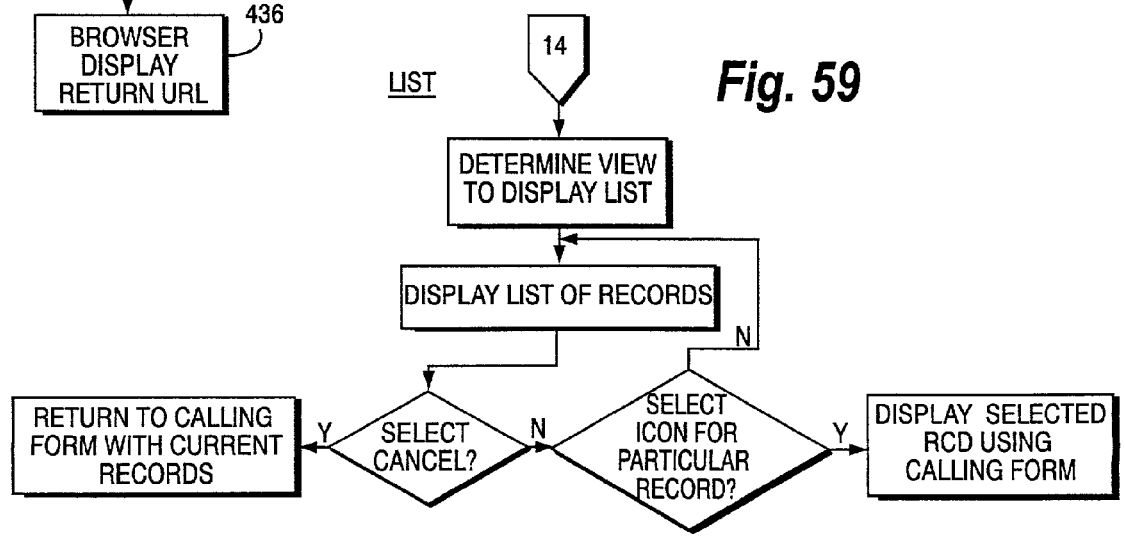
Fig. 59 LIST

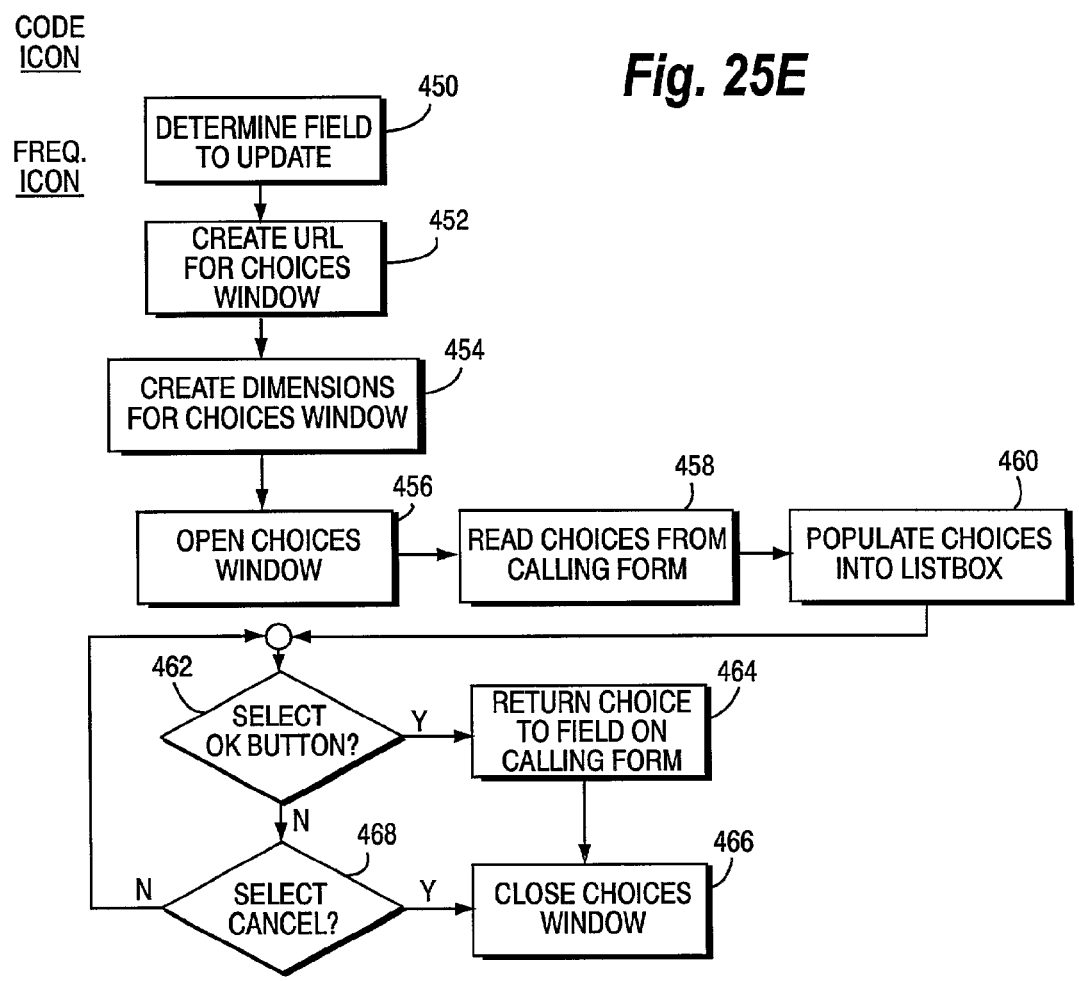
Fig. 25E
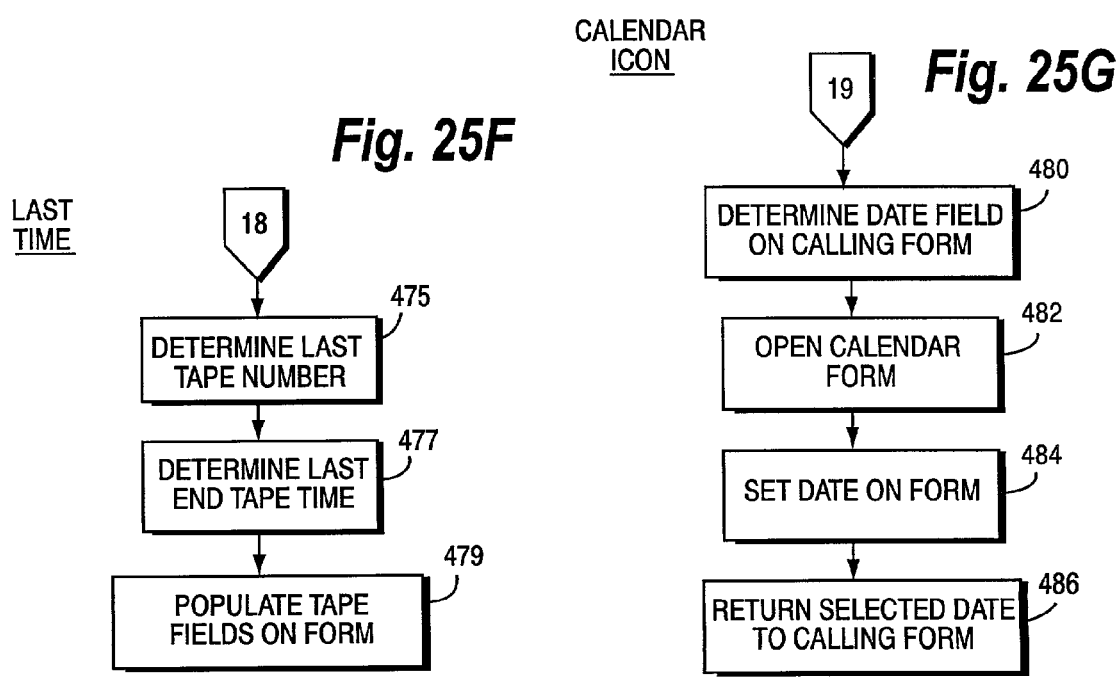
Fig. 25F
Fig. 25G

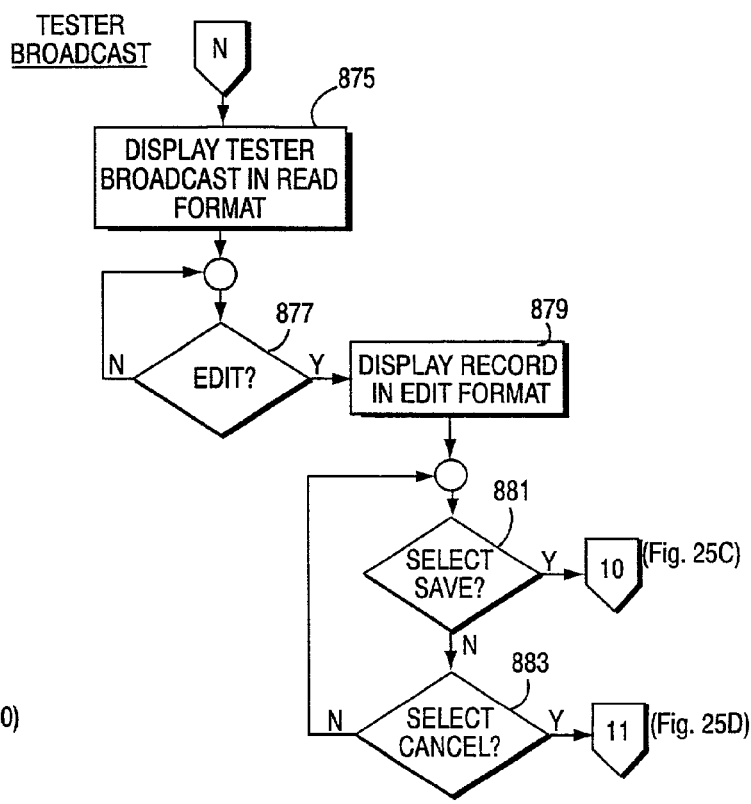
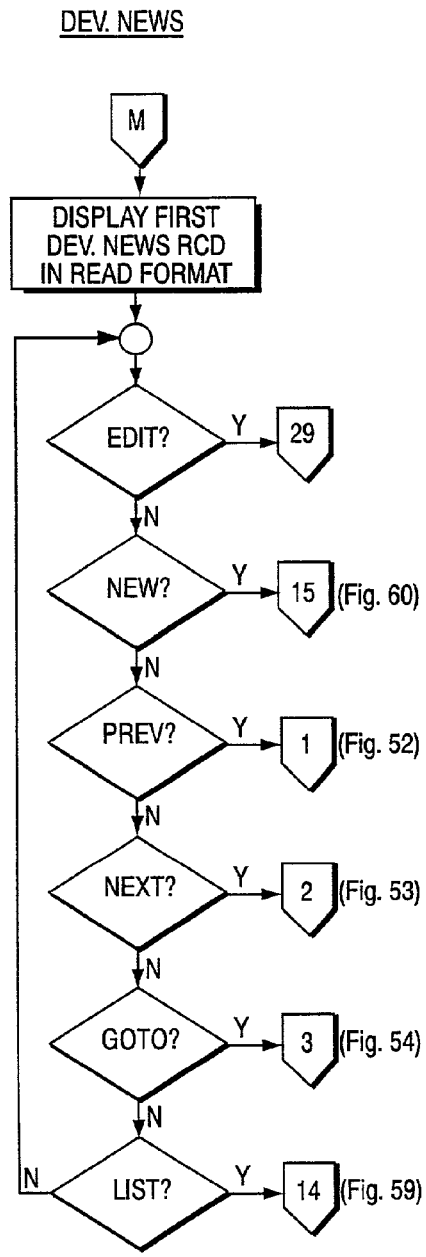
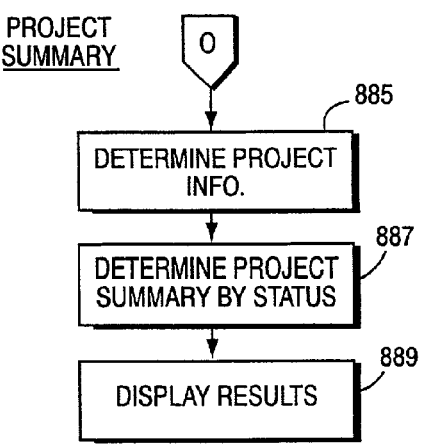

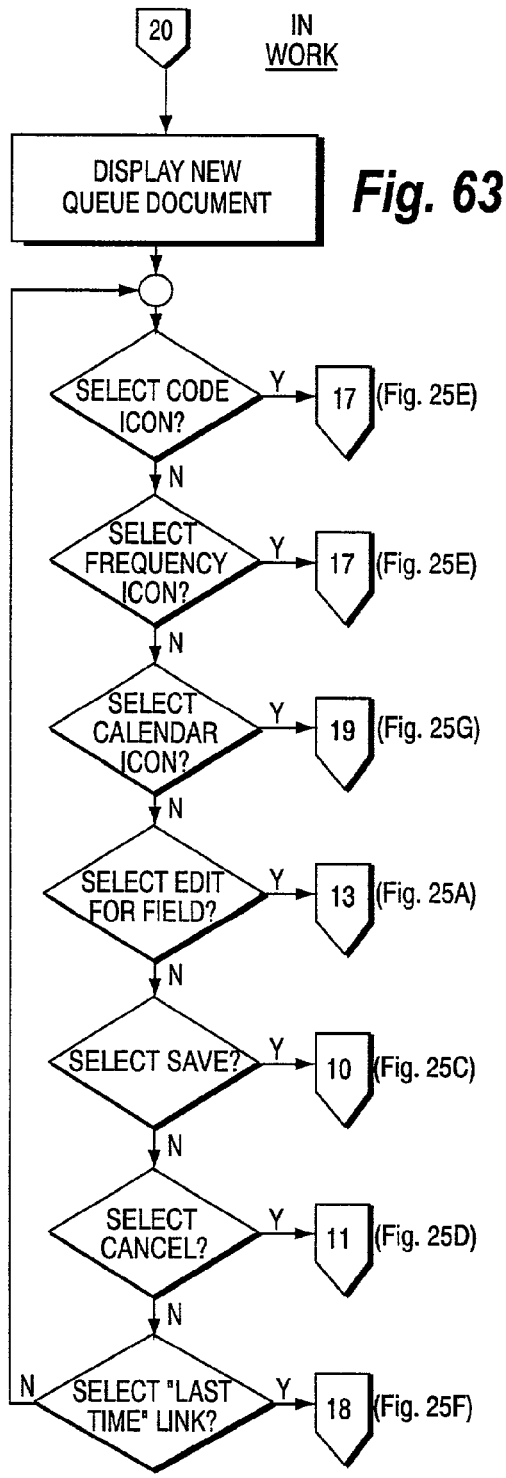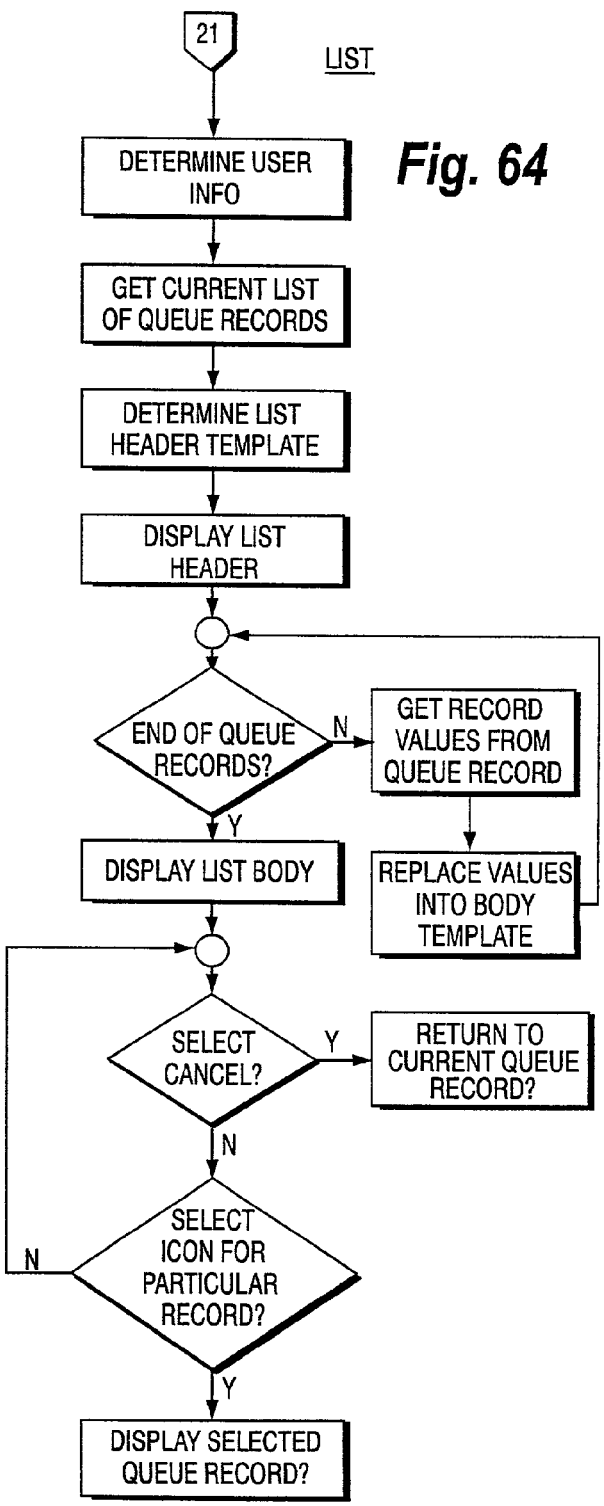

PRODUCT TESTING AND BUG TRACKING SYSTEM

CROSS-REFERENCE TO RELATED APPLICATION

This application claims the benefit of U.S. provisional application No. 60/242,075, filed Oct. 23, 2000, the entire content of which is hereby incorporated by reference in this application.

FIELD OF THE INVENTION

The invention generally relates to a method and apparatus for tracking errors in a complex product under development. More specifically, the present invention relates to a product testing and bug tracking communications system which provides real time, virtually instantaneous, communication between a product developer, a product tester and others involved in getting a complex product to market. For example, the present invention is particularly useful to software developers, software testers, project coordinators and others involved in finalizing a complex video graphics software package, such as a 3D based video game. Through the use of the system and methodology described herein, product bugs may be efficiently processed, monitored, and corrected.

BACKGROUND AND SUMMARY OF THE INVENTION

Present day video games, particularly those which display many moving objects in a virtual three-dimensional world, are exceedingly complex. Video game developers may require years to design, develop, and perfect such complex video games.

Prior to release, high quality video games are exhaustively tested by many game testers who attempt to recreate all possible game sequences during the testing process. Inevitably, such testing results in the discovery of actual game bugs, suspected game bugs, and game design deficiencies which require analysis and correction.

In a typical prior approach to monitoring and analyzing such program bugs, a video game tester, upon playing a game under test and noting a bug, would document on a "problem description" form, a description of the detected error in game play. Additionally, the tester may associate a tester recorded sequence of game screen displays to provide a visual depiction of the error sequence. The tester, in such a typical prior art approach, would then transport his or her problem description form, together with an error documenting tape, to a project coordinator. The project coordinator would likewise be the recipient of problem description forms and associated tapes from each of the other testers testing the game under test.

The project coordinator would then enter all the bug data from the product descriptions form into a data base. The coordinator would also associate any video tape segments the coordinator thought necessary to document the bug to generate a master tape record for the game.

A copy of the project coordinator's compiled listing of game bugs which, for example, might include 100 identified bugs, would typically be transmitted to a game developer via facsimile. The game developer who, for example, may be located in the United Kingdom or Japan, due to the time zone differential would often not be present to receive such a facsimile transmission. The developer often would be unable to immediately address any of the bugs in question.

In accordance with the illustrative embodiments of the present invention, a product testing and bug tracking apparatus is described which advantageously permits a twenty-four hour a day, seven days a week, communication capability between game testers, project coordinators, game developers and others involved in the testing and debugging process. In accordance with an exemplary embodiment of the present invention, an Internet-based, secure communications system is utilized for enabling communications between a video game tester, project coordinator and others with a game developer.

In the illustrative embodiments described herein, a master bug log which compiles all uncovered bugs is accessible by a game developer and other authorized system users via a web server, which stores bug tracking system applications programs and associated data bases. Such a master bug log includes a file attachment capability permitting a digitized image file replicating a video game display screen sequence depicting the bug, to be attached for downloading to, for example, a game developer.

Advantageously, the illustrative embodiments provide the game developer with the capability of performing a wide range of bug sorting operations so that bugs can be analyzed from many different vantage points at an authorized user's discretion. Bugs may be sorted, for example, so that a game developer can retrieve only those bugs having a digitized file attachment. Sorting may take placed based on any of a large number of fields entered in the master bug log, as will be explained in detail herein. The present exemplary embodiments permit customized fields to be added and used as sort criteria. For example, in a racing game, bugs may be categorized and sorted based upon involvement with a particular vehicle or driver.

Game and debugging related messages may be exchanged between testers, project coordinators, and corporate contacts. If the game developer normally communicates in, for example, Japanese, e-mail type format messages are translated so that significant game related messages may be promptly analyzed by all parties involved.

The game developer and other authorized users are provided with a wide range of information about the hardware and software utilized during the testing process including, for example, whether a particular player controller, video game platform, and/or whether particular debugging software was utilized by a tester (which may itself be a source of introduced bugs).

An editing function is advantageously utilized to permit, for example, a tester to enter a bug description and a project coordinator to edit the tester's description to place it in a form better for analysis by a game developer and to add helpful comments for resolving the identified problem. The present exemplary embodiments permit a translator to provide a translation of a bug description, for example, entered by a tester to permit a foreign developer to immediately substantively address downloaded bug related information.

The illustrative embodiments of the present invention advantageously use multiple security layers to preclude one developer from accessing information related to a game under test developed by another developer. The present exemplary embodiments utilize, for example, encryption to encrypt transmissions over the Internet so that a clear text transmission cannot be retrieved by unintended recipients. Additionally, a user's password and/or name are encrypted to assist in precluding an unauthorized party from access to a bug related database.

Although the present invention is illustrated herein in the context of tracking errors in video game software, the present invention also may be used to track bugs in a wide array of other software packages, particularly where prompt communication between remotely located team members is important.

These and other objects, features, aspects and advantages of the exemplary embodiments of the present invention will become more apparent from the following detailed description of the present invention when taken in conjunction with the accompanying drawings.

BRIEF DESCRIPTION OF THE DRAWINGS

FIG. 5 is an exemplary screen display for a master bug log;

FIG. 10 is a screen display showing an exemplary test plan outline that a tester may access from the master bug log as shown in FIG. 4;

FIG. 18 shows an exemplary bug sort menu;

FIG. 25B is a flowchart of an illustrative file attachment process;

FIG. 25C is a flowchart of an illustrative "save" function process;

FIG. 25D is a flowchart of an illustrative sequence of operations involved in cancel processing;

FIG. 25E is a flowchart of an illustrative sequence of operations performed when the "code" icon or the "frequency" icon have been selected;

FIG. 25F is a flowchart of an illustrative sequence of operations performed in the "last time" function processing;

FIG. 25G is a flowchart of an illustrative sequence of operations for calendar function processing;

FIG. 36 is a flowchart of an illustrative sequence of operations involved in developer news processing;

FIG. 37 is a flowchart of an illustrative sequence of operations involved in tester broadcast processing;

FIG. 38 is a flowchart of illustrative project summary processing;

FIG. 59 is a flowchart illustrating a "list" function.

FIG. 63 is a flowchart illustrating an "in work" function selectable by a tester from the queue menu.

FIG. 64 is a flowchart illustrating a "list" function selectable by certain authorized users.

DETAILED DESCRIPTION OF THE EXEMPLARY EMBODIMENTS

Figure 1:
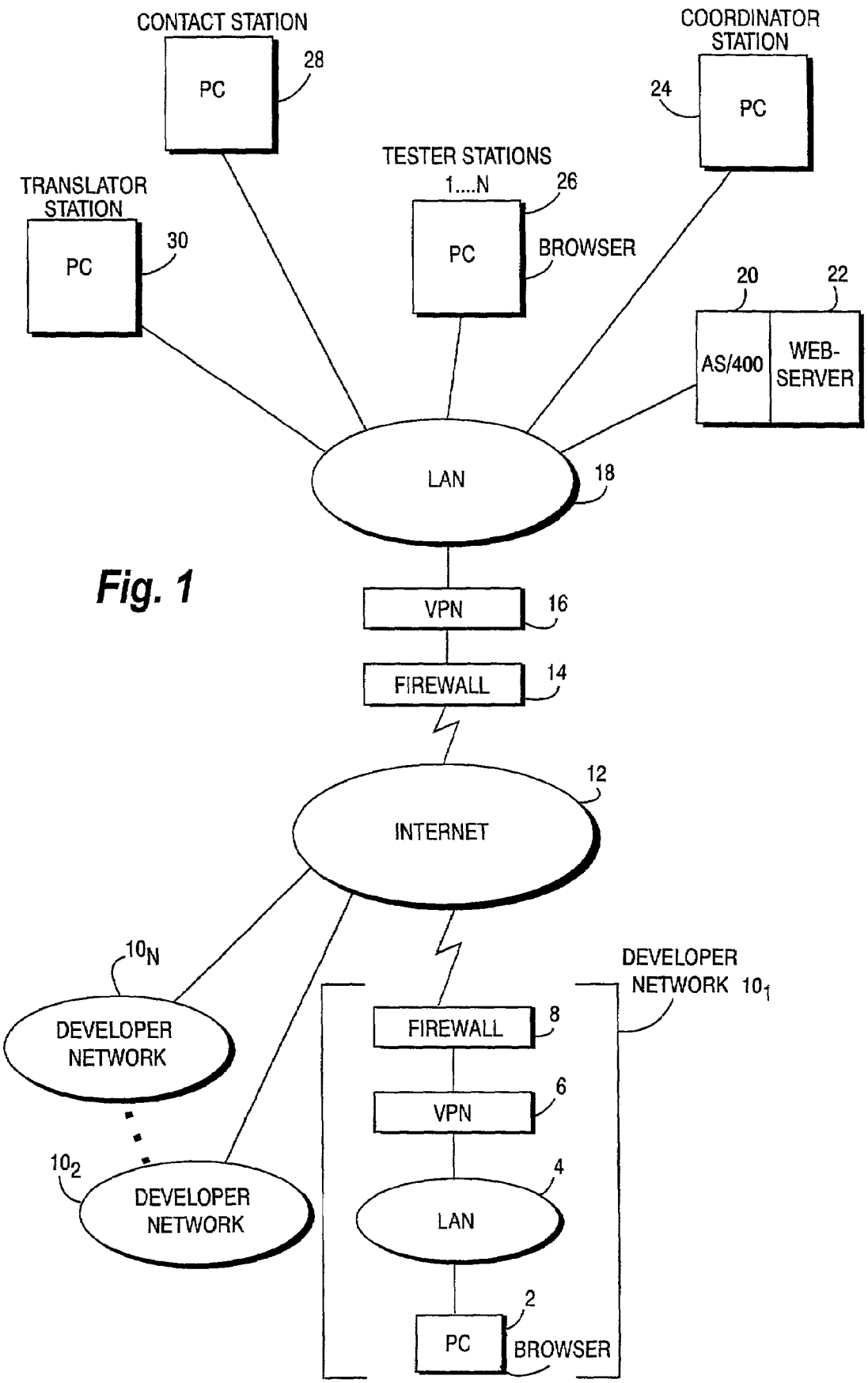
FIG. 1 is a block diagram showing the Internet-based bug tracking communications system in accordance with an exemplary embodiment of the present invention.

FIG. 1 is block diagram of an illustrative Internet-based computer system for implementing the bug processing and tracking system in accordance with an exemplary embodiment of the present invention. Turning first to the hardware utilized by developers $10_1$, $10_2$ to $10_N$ use to communicate with other bug tracking team members, communications between a developer and other team members typically take place over the Internet 12. It should be understood that intradeveloper computer systems may vary widely. In the exemplary embodiment shown in FIG. 1, the developer's computer system includes various personal computers (PC) 2 (only one shown) interconnected via a local area network (LAN) 4.

The PCs 2 communicate via the Internet 12 through the developer's firewall 8 and a virtual private network (VPN) 6. VPN 6 recognizes transmissions requests which are directed to a web server 20, which, in the illustrative embodiments, controls the bug tracking system to provide system access to the access to the developers $10_1$, $10_2$ to $10_N$, the project coordinator PC 24, the tester PCs 26, the corporate contact PC 28, and the translator PC 30. Upon recognizing one of the above-identified computers being addressed, the VPN 6 encrypts the communication. The communication is then transmitted via the Internet 12 through, for example, a corporate firewall 14, which is coupled to a VPN 16. The VPN 16 recognizes the communication as originating from one of the authorized developers $10_1$, $10_2$, . . . $10_N$, and decrypts the communication which is then routed through a corporate LAN 18 to web server 22 which may, for example, be running on an AS 400 (20).

AS 400 (20) is, for example, a main frame computer, which executes many corporate application programs, including a "Domino" web server 22. The web server 22 communicates with the browser executing at PC 2 using conventional HTTP protocol. The web server 22 is coupled via LAN 18 to a project coordinator's PC 24, testers' PC 26, corporate contact's PC 28, and translator's PC 30. Each of the above-identified PCs execute a web browser and communicate with the web server. Since, in this example, all corporate communications take place behind the corporate firewall 12, intracorporate communications need not be encrypted. However, when, for example, a project coordinator at PC 24, communicates with a developer via web server 22 and LAN 18, communications are encrypted via VPN 16, prior to being forwarded to the developer at PC 2.

Figure 2:
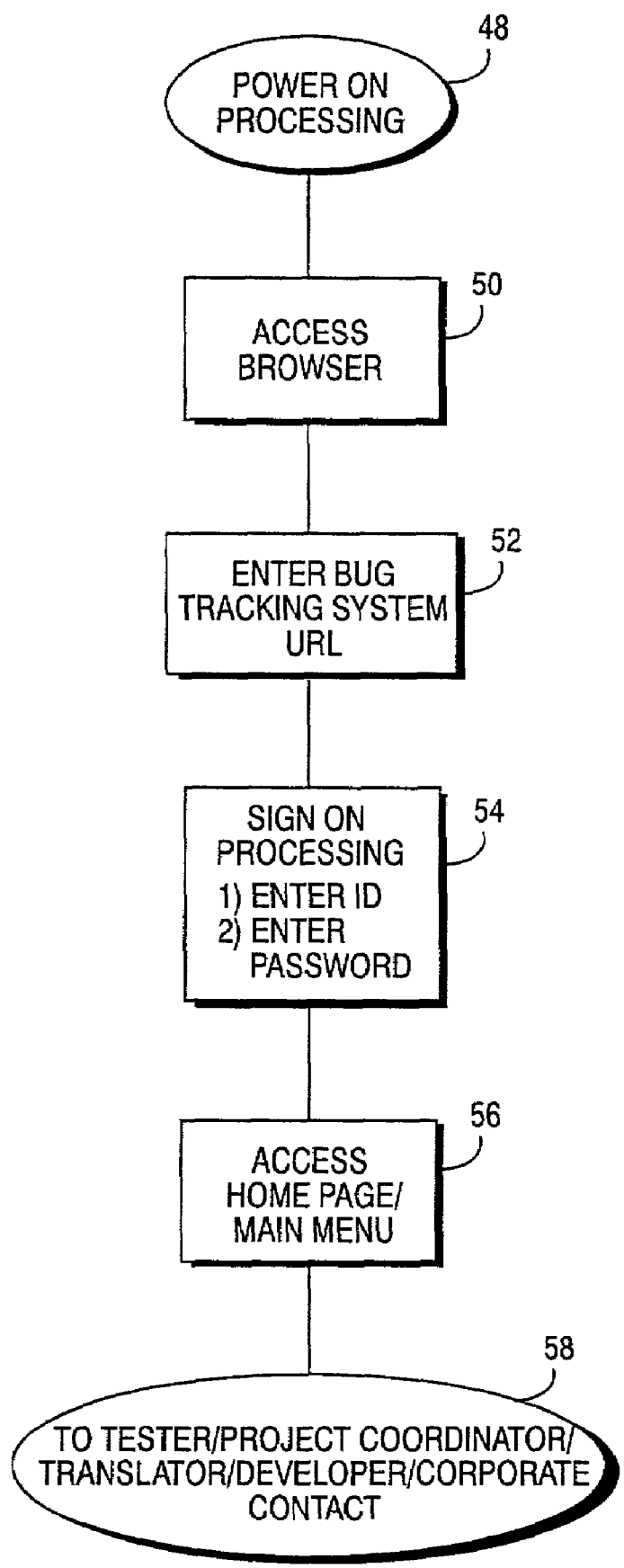
FIG. 2 is a flowchart showing the initial processing operations which occur when processing operations at various user stations.

FIG. 2 is a flowchart show exemplary initial processing operations occurring at testers' computers 26, a project coordinator's computer 24, a translator's computer 30, a developer's computer 2 or a cooperate contact's computer 28. After initial power ON processing (48) performed by any of the PC's shown in FIG. 1, a user "clicks" on an icon resulting in accessing an Internet browser, such as Netscape (50). As will be appreciated by those skilled in the art, other browsers may be utilized, such as for example, the Internet Explorer.

Upon accessing the Internet browser, in an exemplary embodiment of the present invention, a user enters the bug tracking system uniform resource locator (URL) (52). In the exemplary embodiment, a sign on screen display is then generated (54) which prompts the user to enter the user's assigned ID and password. Based upon the entered user's ID and password, a database is then accessed which results in the display of a home page/main menu tailored to the specific user's task in the software generation process. For example, the displayed home page identifies the user as being a tester, project coordinator, translator, developer, or corporate contact.

In accordance with the illustrative embodiments, each of the user selectable task descriptors include an associated level of access to the system permitting variable access to a limited number of bug tracking subsystems of the entire spectrum of bug tracking subsystems as will be explained further below. After the home page is accessed, based upon information entered by the user, the system performs the appropriate tester, project coordinator, translator, developer or corporate contact processing as will be described in detail below (58).

Figure 3:
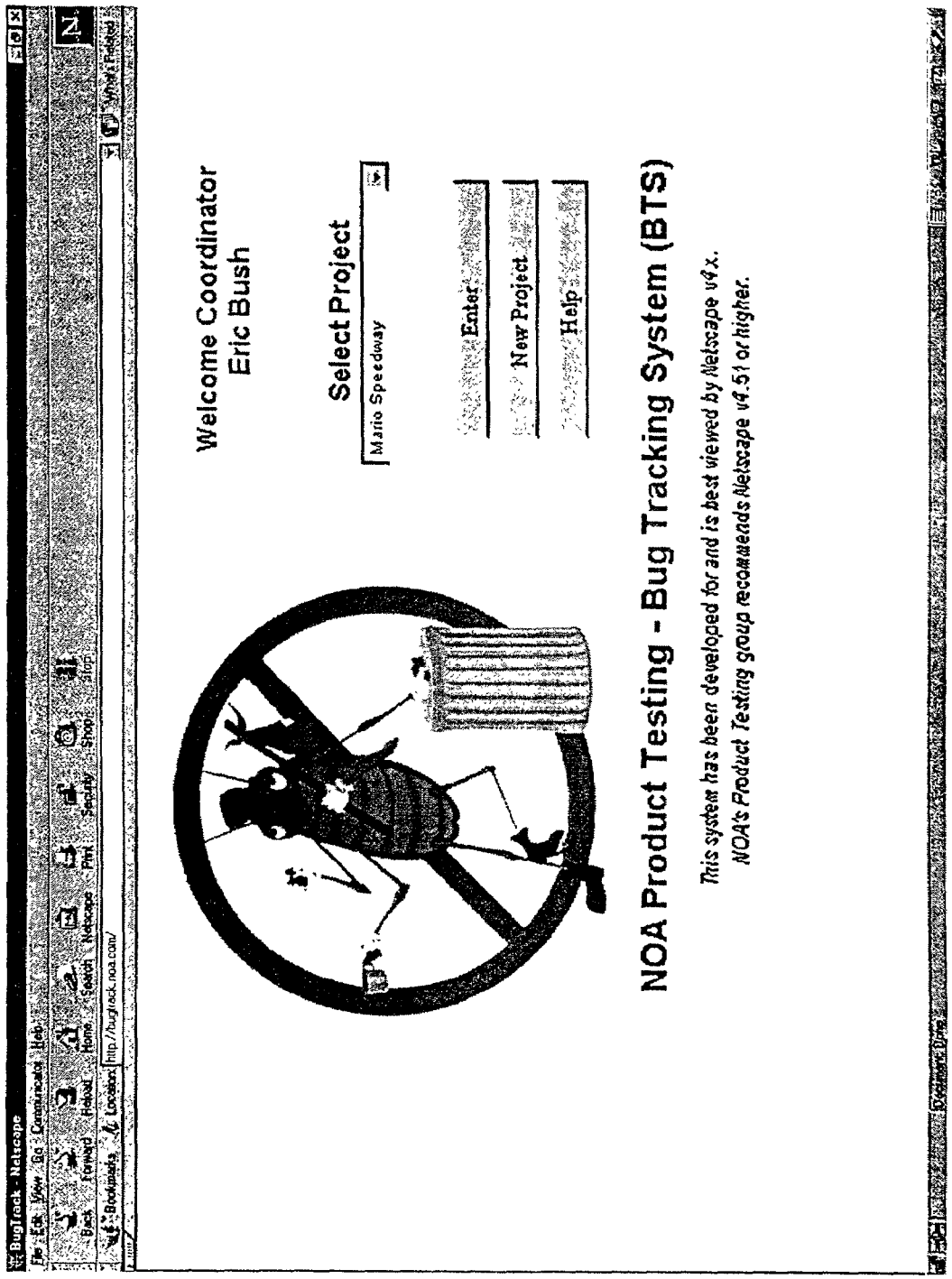
FIG. 3 is an illustrative bug tracking system home.

FIG. 3 is an illustrative bug tracking system home page which, in the present example, identifies the applicants' assignee Nintendo of America Inc. (NOA). The homepage in the example shown in FIG. 3 illustrates a screen display where the entered ID and password was that of a project coordinator. The home page includes a "select project" pull down menu. The contents of the pull down menu is likewise determined by accessing a database which uses the entered ID and password to access a set of projects with which the user is working. The system precludes, for example, a developer involved in developing one set of video games from accessing information relating to, for example, the video games under development by another developer. Alternatively, or after a user selects one of the projects, a project coordinator has the option of setting up a new project, or alternatively, accessing a help screen by clicking on the appropriate function bar. The new project function is only available to a project coordinator in accordance with the illustrative embodiment of the present invention.

Presuming that a tester entered his or her ID and password, a main menu screen of the type shown in FIG. 3 would be accessed, except that a tester would be identified and no new project function would be available in accordance with the present exemplary embodiment.

Figure 4:
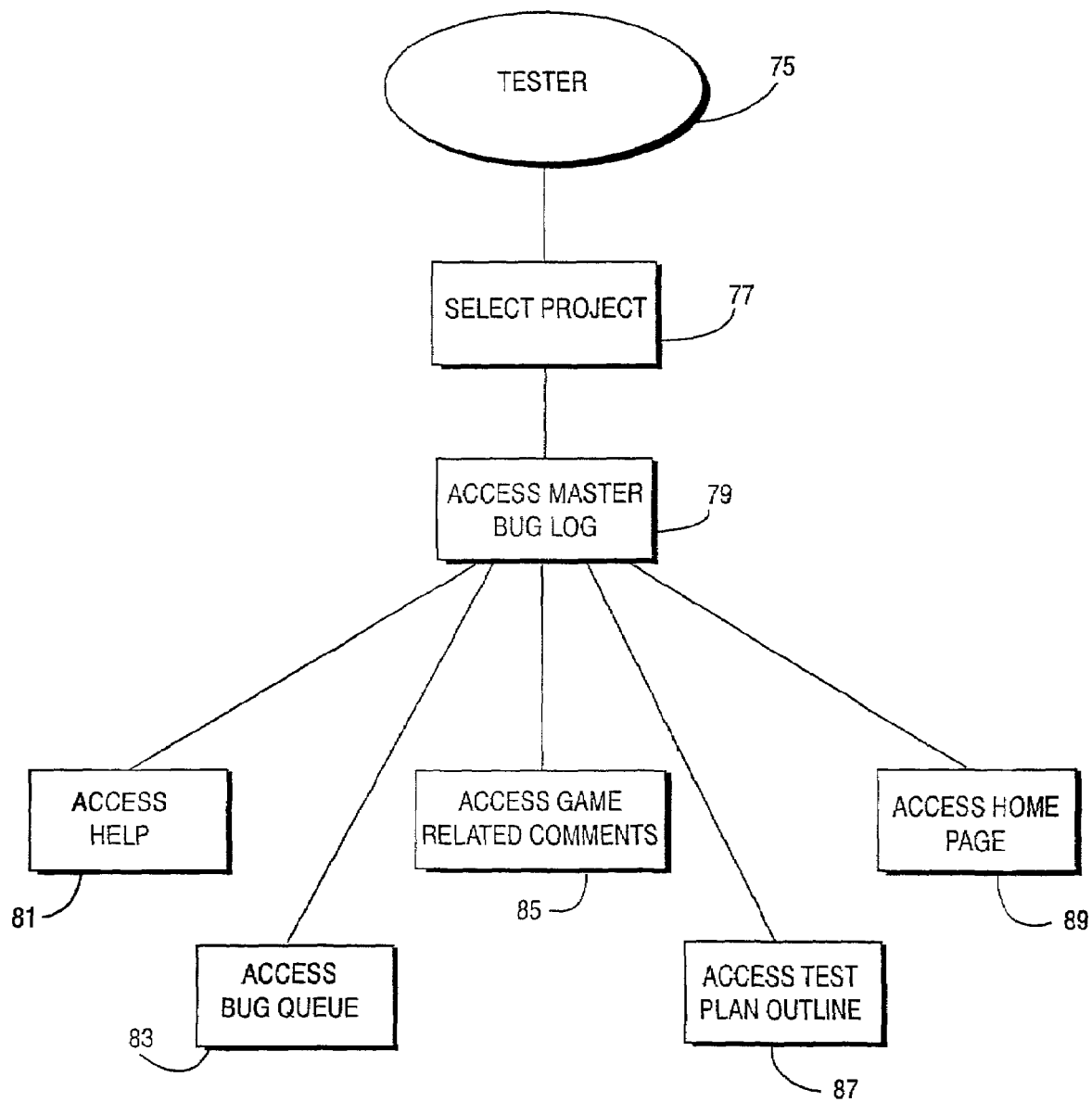
FIG. 4 is a flowchart which illustrates the sequence of operations performed when a tester accesses the bug tracking system in accordance with an exemplary embodiment of the present invention.

FIG. 4 is a flowchart which illustrates the sequence of operations performed when a tester accesses the bug tracking system. After a tester accesses the home page (75) and selects a project (77), in accordance with an exemplary embodiment of the present invention, a master bug log (79) is accessed. In the illustrative embodiment, the master bug log is a database including a list of every bug which has been published for viewing for game developers. As shown in FIG. 4, a tester is able to access a limited subset of the possible available bug tracking systems menus/functions accessible through the master bug log. In the illustrative embodiment, a tester can access help menu (81), a bug queue (83), a game related comments menu (85), a test plan outline (87) or the home page (89). The tester would typically access the help function for guidance in using the bug tracking system. By accessing the help menu, all functions that may be selected are explained in terms of what they are, and how they are to be used.

The tester would access the bug queue in order to enter specific information as will be detailed below with respect to discovered bugs. After a project coordinator reviews the bug queue and decides to "publish" bugs for viewing by developers, such a bug may be entered into the master bug log. A tester may utilize the game related comments section for identifying an aspect of the game which may not amount to actually being a "bug", but which may be helpful for a corporate contact or game developer or project coordinator for consideration as to whether to modify a game to improve game play.

A tester also may access a test plan which sets forth in outline form, the methodology that a tester should be using in order to test the software project, e.g., a video game. The tester is informed as to precisely what tasks needs to be performed on a real time daily basis. The tester may go back to the home page to, for example, shift from working on one project to another.

Figure 5:
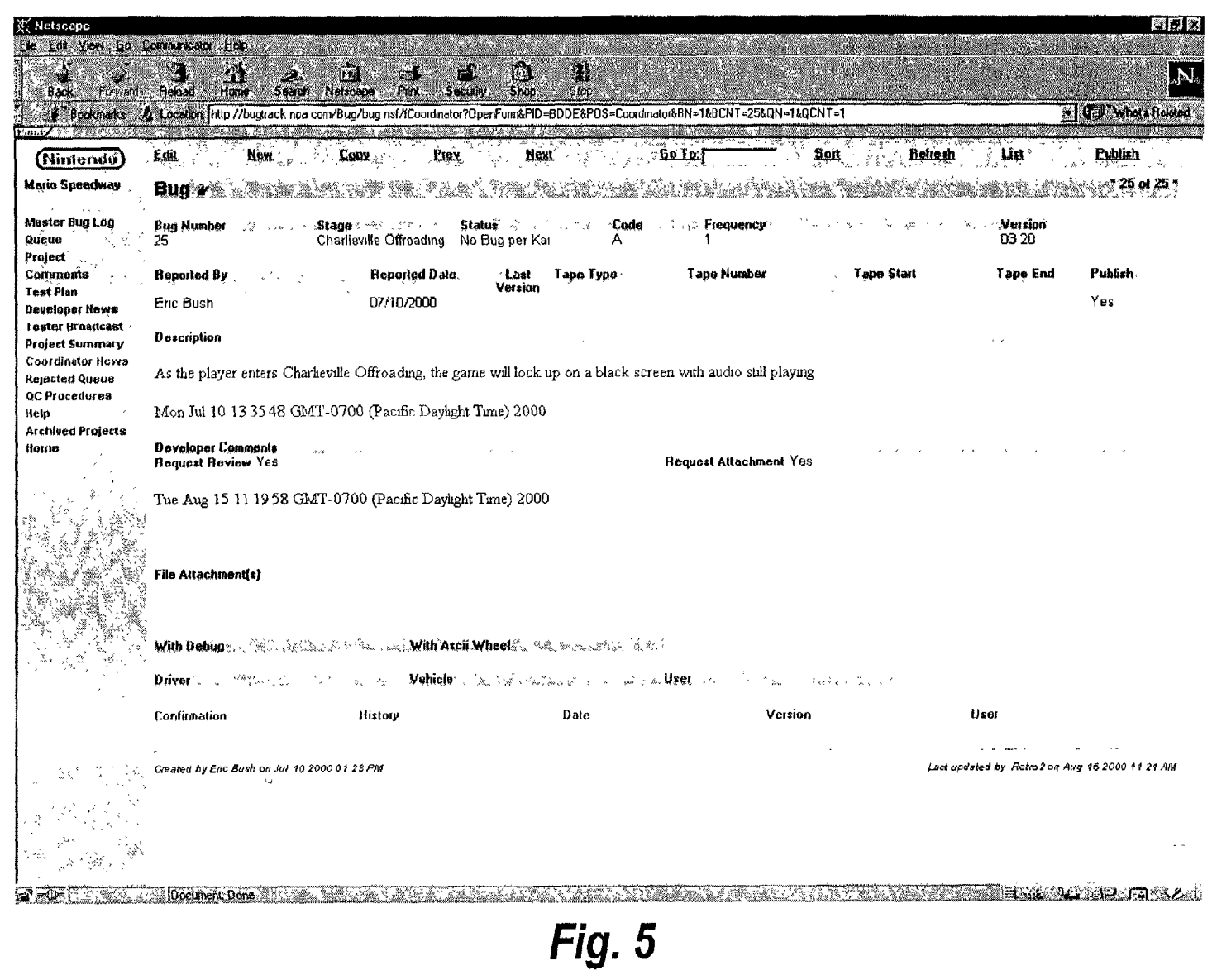

FIG. 5 is an exemplary screen display from the master bug log, which is an up to date collection of all bugs for a project that have been entered. As noted above, the master bug log includes only those bugs that have been accepted after being placed in a bug queue. The project coordinator views bugs in the queue, then modifies and/or accepts them and the bugs are then placed into the master bug log. FIG. 5 shows a master bug log screen display for identified bug number 25.

In the left hand column of FIG. 5, the project "Mario Speedway" is identified, below which is a list of all selectable menus/tracking features in the illustrative embodiments. Only the subset of those menus which are identified in FIG. 4 are accessible by a tester. In the illustrative implementation, each of these selectable menus/tracking features are accessible by a project coordinator. In a master bug log accessible by a tester, it may be desirable to only display menus corresponding to menus 81, 83, 85, 87 and 89 shown in FIG. 4. By clicking on any one of 81, 83, 85, 87 and 89, a tester may branch to a different screen display menu for accessing a different bug tracking subsystem such as, for example, the bug queue 83.

Also associated with the master bug log and other menus described herein after, are a set of user functions associated with the menu. With respect to the master bug log, as shown in FIG. 5, the following functions are accessible "edit", "new", "copy", "previous", "next", "go to", "sort", "refresh", "list", and "publish".

Figure 6:
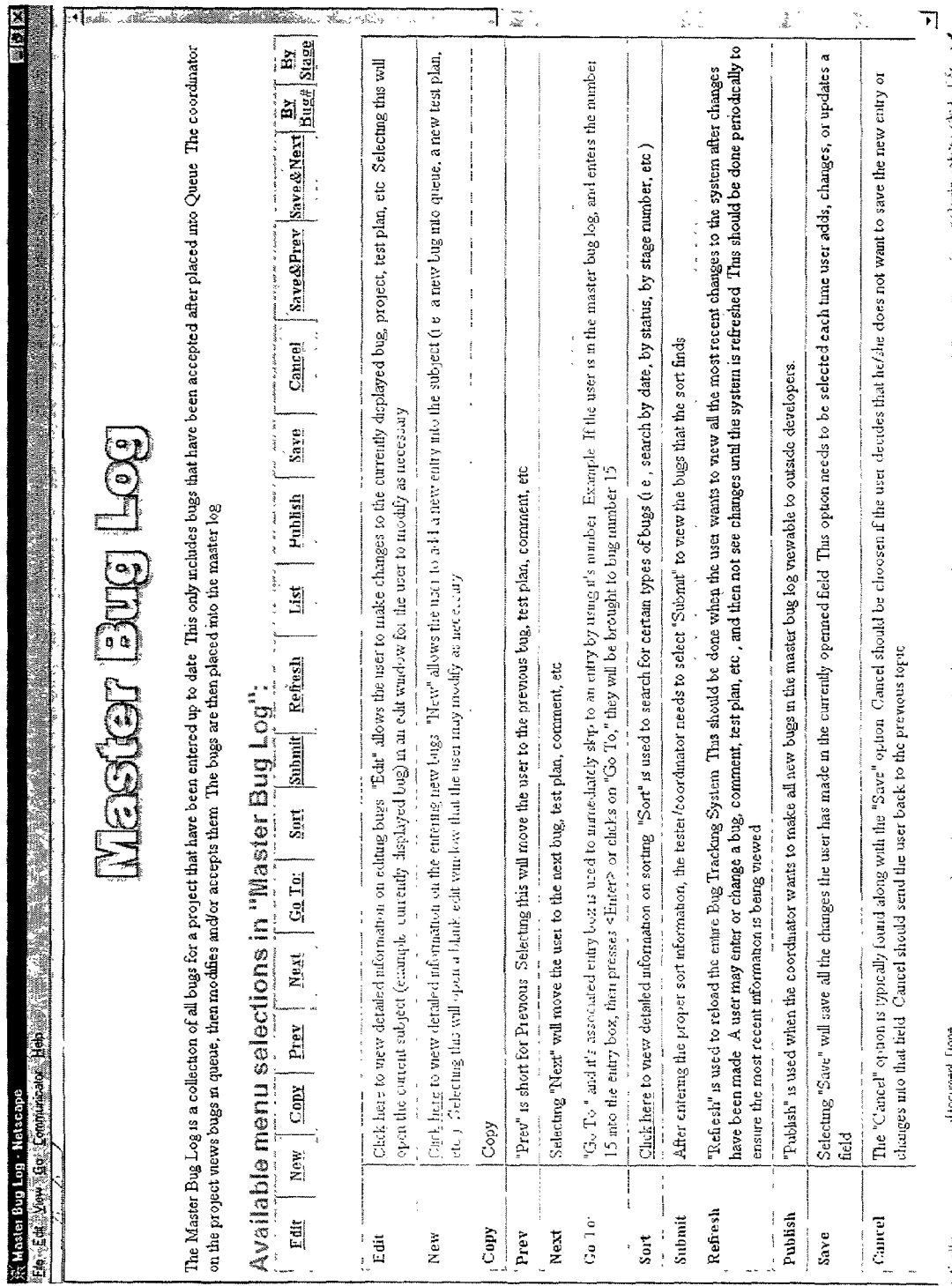
FIG. 6 is an exemplary screen display which explains the functions provided in conjunction with the master bug log.

FIG. 6 is an exemplary screen display which explains the functions provided in conjunction with the master bug log. For example, with respect to the edit function, this function permits the editing of any bug within the master bug log itself. By clicking on the edit function, an edit screen is accessed where appropriate editorial changes may be made to the master bug log depending upon the authority to make such changes delegated to the individual using the system. The "new" function permits new bugs to be entered into the master bug log. This functionality is only available to project coordinators and permits the project coordinator to utilize the master bug log directly, instead of first having to go through the bug queue. The "copy", "previous", "next" and "go to" functions shown in FIG. 6 include a self explanatory description of these functions. With respect to "go to" function, in the exemplary embodiment of the present invention, this function permits jumping to a bug as identified by a current sort parameter. For example, if the sort is being performed based upon the number of the bug, then as indicated in FIG. 6, entry of the number 15 results in accessing bug number 15.

The sort function provided in accordance with an exemplary embodiment of the present invention, permits sorting bugs based upon a wide variety of criteria. For example, turning to FIG. 5, the present exemplary sorting function permits sorting by bug number, stage, status, code, frequency version, etc. Sorting is available based upon any data entry field in the master bug log.

The "submit" function permits a particular bug to be submitted for entry to the master bug log or be submitted for publication to a developer. The refresh function permits reloading the entire bug tracking system so as to update the bug log based upon the most recently entered bugs. The "publish" function opens the bug for reviewing by developers based upon, for example, a project coordinator's decision to do so. The "save" feature permits saving changes the user had made in the currently open field for saving a bug. A "cancel" function permits the cancellation of a new entry or edited change. The "save previous" and "save next" functions are used by coordinators to quickly make changes and proceed to the previous or next record. The "list" function places all entries in a list format to allow quick review of multiple entries rather than reviewing them one at a time. A list may be generated based upon bug number or stage or other criteria.

Turning back to FIG. 5, a "description" field is shown in which a particular bug is described. In the example shown, the bug is described by stating that "[a]s the player enters Charlieville Off-roading, the game will lock up on a black screen with the audio still playing." The date the coordinator published the bug is indicated by a time stamp.

The master bug log includes a "developer comments" section in which a developer may add comments, and/or request an attachment such as a digital file which provides the developer with screen displays of the bug so that the developer will fully understand the nature of the bug. With respect to the attachment, a wide variety of files may be attachable, including an Excel file, a Word file, an AVI file, etc. A game tester will have access to a video tape of screen displays showing the bug. The tape of screen displays may be digitized and placed in, for example, an AVI format for attachment and transmission to a requesting party. In accordance with an exemplary embodiment, a developer may request that the project coordinator review the bug.

Although not shown expressly in FIG. 5, if a video game developer is Japanese and the project game is a Japanese title, a translator operating, for example, on the FIG. 1 PC 30 would include a translation of the entries shown in FIG. 5.

At the bottom of FIG. 5, various custom fields are shown which are tailored to the exemplary driving game "Mario Speedway". For example, fields have been added relating to the driving game identifying a vehicle steering wheel, driver or vehicle. Such fields, for example, permit bugs to be identified relating to a specified one of many drivers or one of many vehicles identified in the game.

The "with debug" field relates to whether the game under development includes associated debugging software which can, under certain circumstances, be the source of bugs. The confirmation field may be used, for example, as a demonstration that the bug has been confirmed from one version to the next. The history field may indicate how long ago the confirmation was made. The date, version, and user fields may be used to identify the date, the associated version, and the user who made the confirmation.

Figure 7:
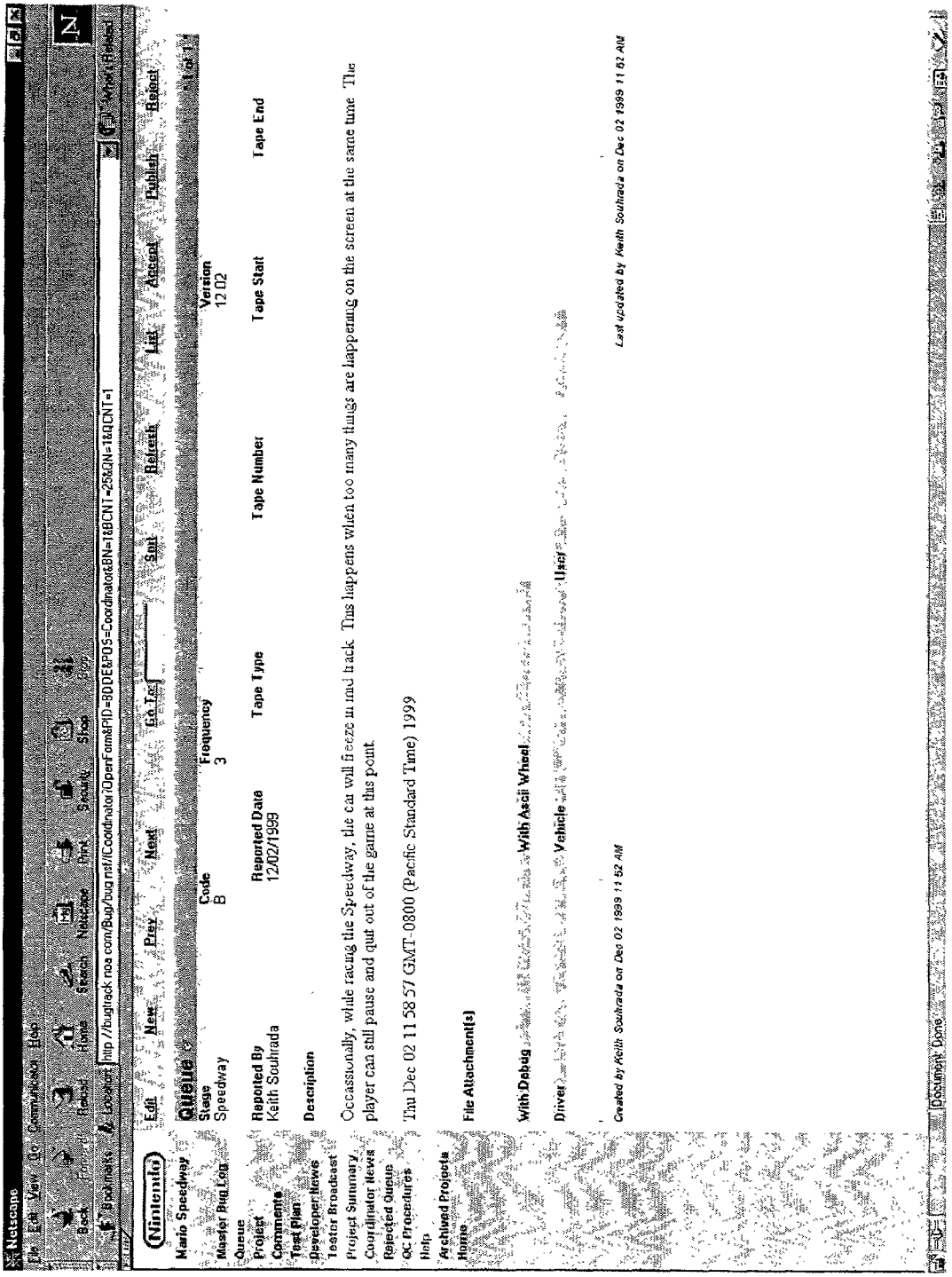
FIG. 7 shows an illustrative bug queue.

Turning back to FIG. 4, from the master bug log accessed at step 79, a tester is permitted to access the bug queue by selecting the "queue" menu on the left hand portion of the master bug log. An exemplary bug queue is shown in FIG. 7. In the exemplary embodiment of the present invention, testers are restricted to entering bugs via the bug queue. Unlike testers, in the exemplary embodiment, project coordinators can enter bugs from the master bug log. If a tester selects the "new" function in the top row of the menu, the bug tracking system permits the tester to enter information with respect to a new bug. Alternatively, in accordance with an exemplary embodiment of the present invention, a work in progress function (not shown) may be selected by a tester to permit entry of information relating to a suspected bug and save that information until analysis is completed. Upon clicking on the "new function, a screen is displayed lacking the descriptions shown in FIG. 7. FIG. 7 depicts a completed queue screen display. The tester will, for example, enter for the game "Mario Speedway", the game stage, a code field, the frequency and the version the bug was discovered in. The "reported by" and "reported date" fields are preferably automatically completed based upon sign on ID and date data. If the bug was recorded on a screen display video tape, the tape type, tape number, tape start and tape end will be identified. The tester will then write a brief description of the bug and a date and time stamp will be entered. The various entries are preferably filled in by the use of drop down menus set up by the project coordinator to minimize data entry by the tester. A save function is also available which appears if the edit function is accessed, and results in the entry into the bug queue of the tester's noted bug. Although a tester is permitted to view the bug queue, an individual tester is only permitted to edit his or her own entered bugs. In this fashion, the system is protected from one tester rendering another tester's bug description less accurate. When a tester accesses the bug queue, the accept, publish, and reject functions shown in the top row of FIG. 7 are not shown since these functions are used by project coordinators to accept bug for the master bug log, publish the bug for developers or reject the bug entered by an individual tester.

Figure 8:
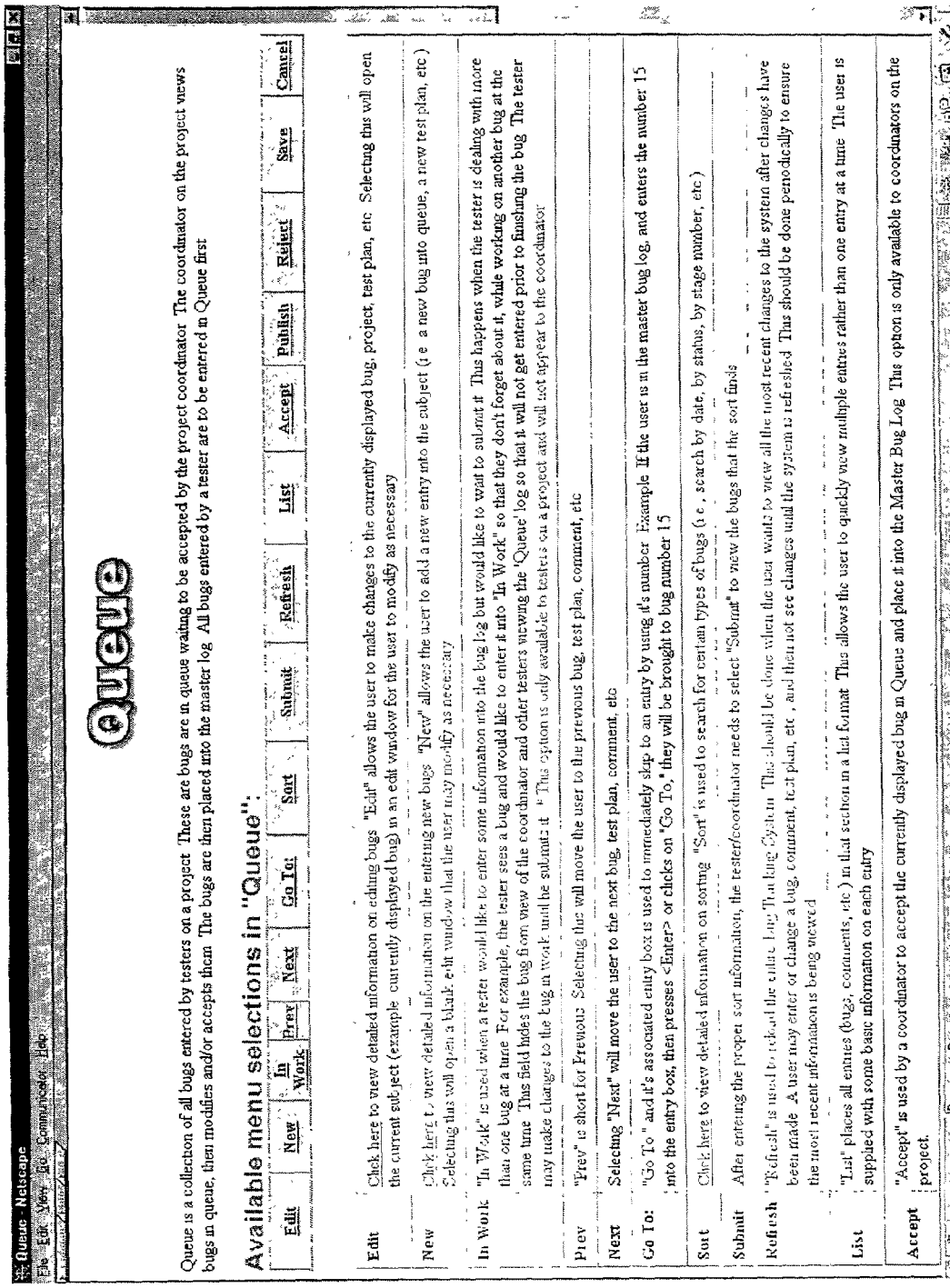
FIG. 8 is an exemplary explanation of functions selectable via the bug queue.

FIG. 8 is a self-explanatory explanation of the functions selectable via top row of the bug queue shown in FIG. 7.

Figure 9:
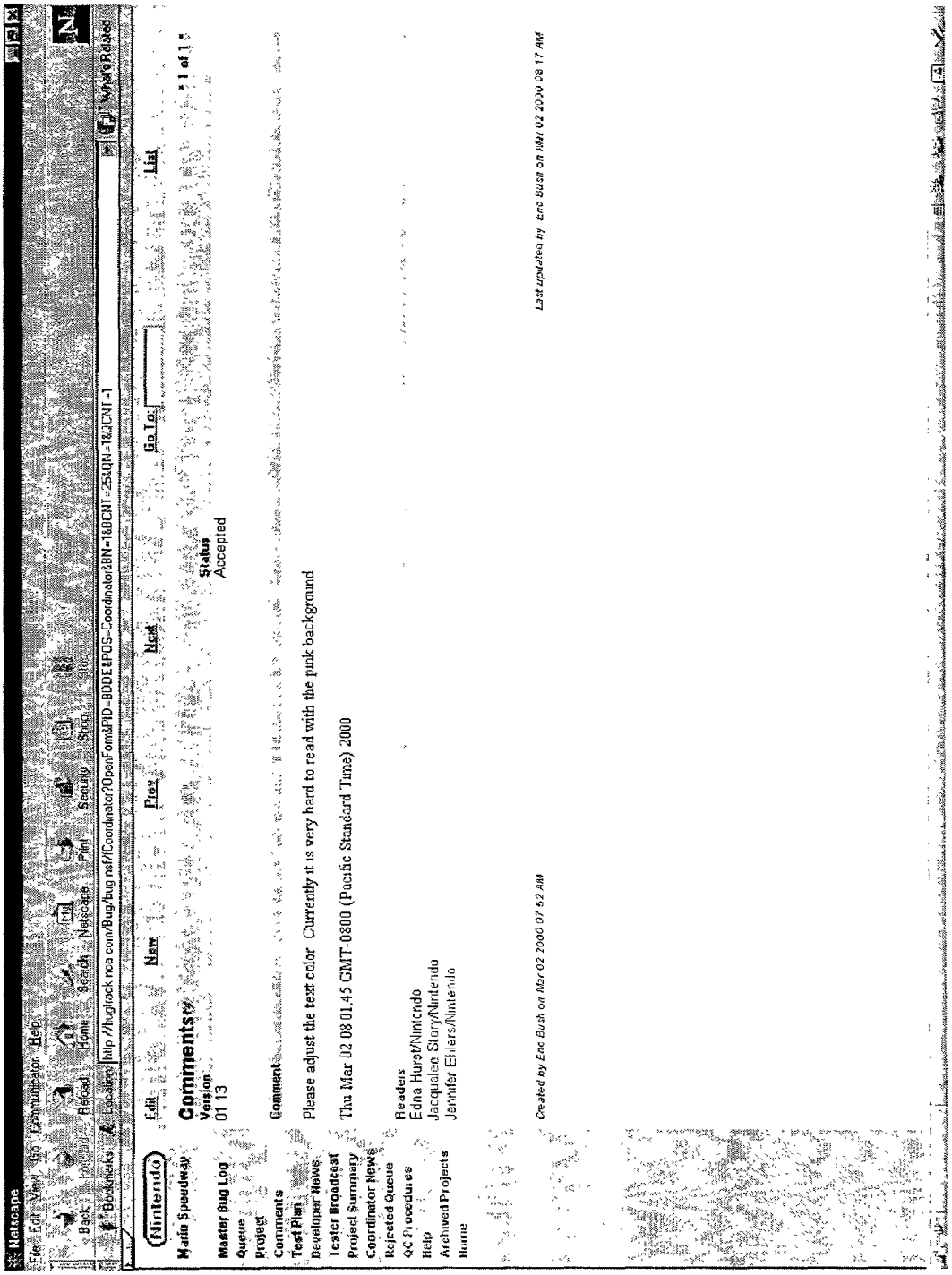
FIG. 9 is an exemplary screen display for a game related comments menu shown in FIG. 4.

FIG. 9 is an exemplary screen display of the game related comments menu 85 shown in FIG. 4. A comment entered by, for example, a game developer, may reflect any aspect of the game that the developer desires the tester to test. A tester may enter, for example, comments relating to features that the tester believes would be worthy of adding to the game, such as particular special effects. Such comments, however, are not considered to be a "bug" in the game. With respect to the "new" function shown at the top of FIG. 9, a user is able to enter new comments via this function. The "edit" function permits the user to edit existing comments which that particular user entered. The "previous", "next" and "go to" functions permit a user to access the indicated comment and the "list" function provides a list of comments. The "go to" function permits going to a comment in accordance with a user's indicated sort parameter. In accordance with an illustrative embodiment of the present invention, the comments by a tester are subject to review by a corporate contact and are typically transmitted to a developer by facsimile, although such comments could, if desired, be transmitted by a tester to a developer.

Figure 10:
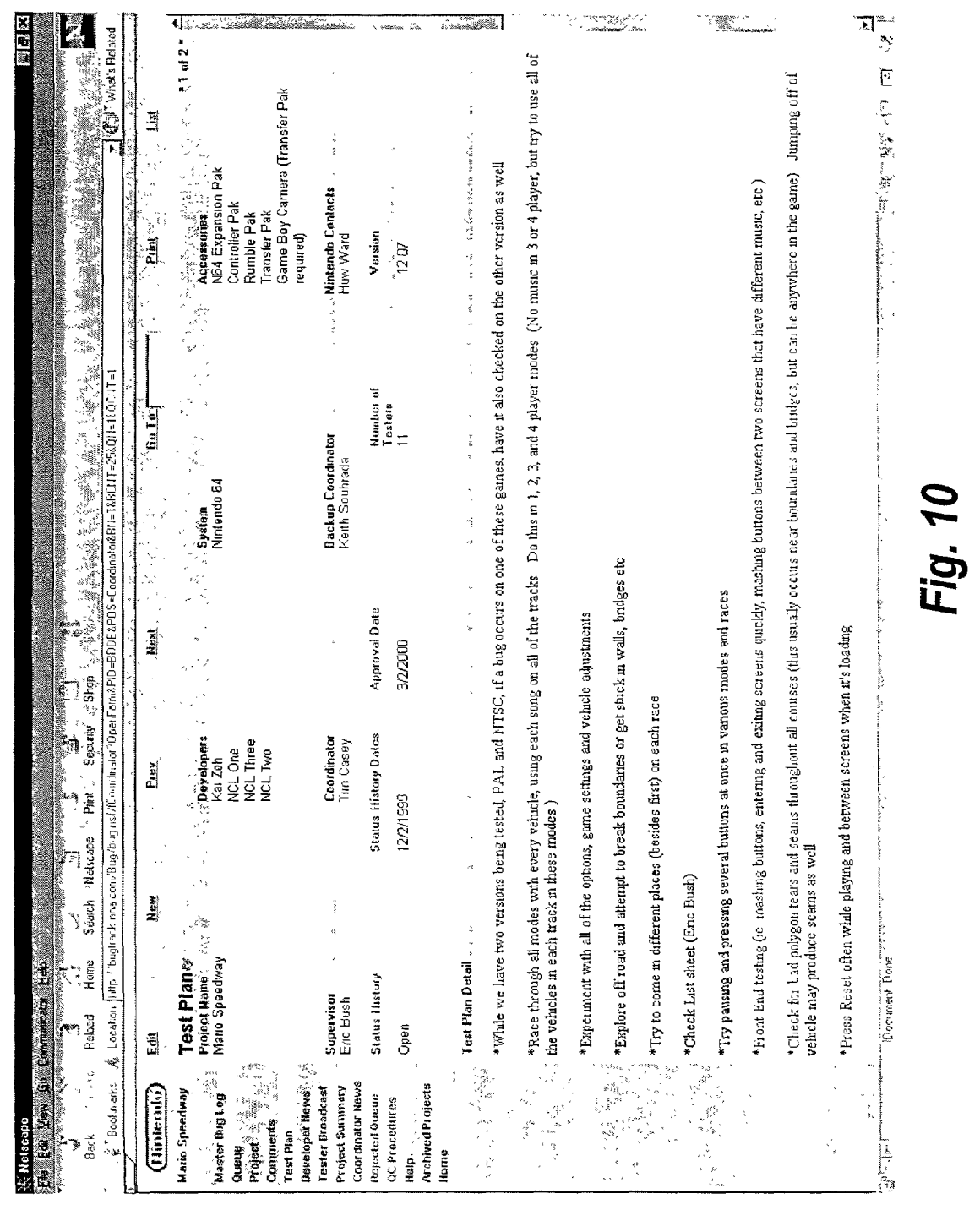

FIG. 10 is a screen display showing an exemplary test plan outline 87 that a tester may access from the master bug log as shown in FIG. 4. The test plan is preferably prepared by a project coordinator at the very beginning of a project. The test plan is contemplated as being a dynamic plan that may be updated throughout the project. It sets forth a step-by-step methodology of what must be done during testing. The test plan fields "project name", "developers", "system", "accessories", "supervisor", "coordinator", "back-up coordinator", "corporate contacts", "status history", "status history dates", "approval date", "number of testers", and "version number" are automatically provided to the test plan menu based upon entries in a "project" menu that project coordinators enter. It should be recognized that the test plan detail, shown in FIG. 10, is provided by way of example only. The test plan detail may vary greatly from an essentially one page plan to ten to twenty or more pages. The test plan defines on a day-to-day basis what a tester should be doing.

The functions provided on the test plan menu, i.e., edit, new, previous, next, go to, print and list are in the presently preferred embodiment only available to project coordinators. Testers are limited to only viewing the test plan.

Figure 11:
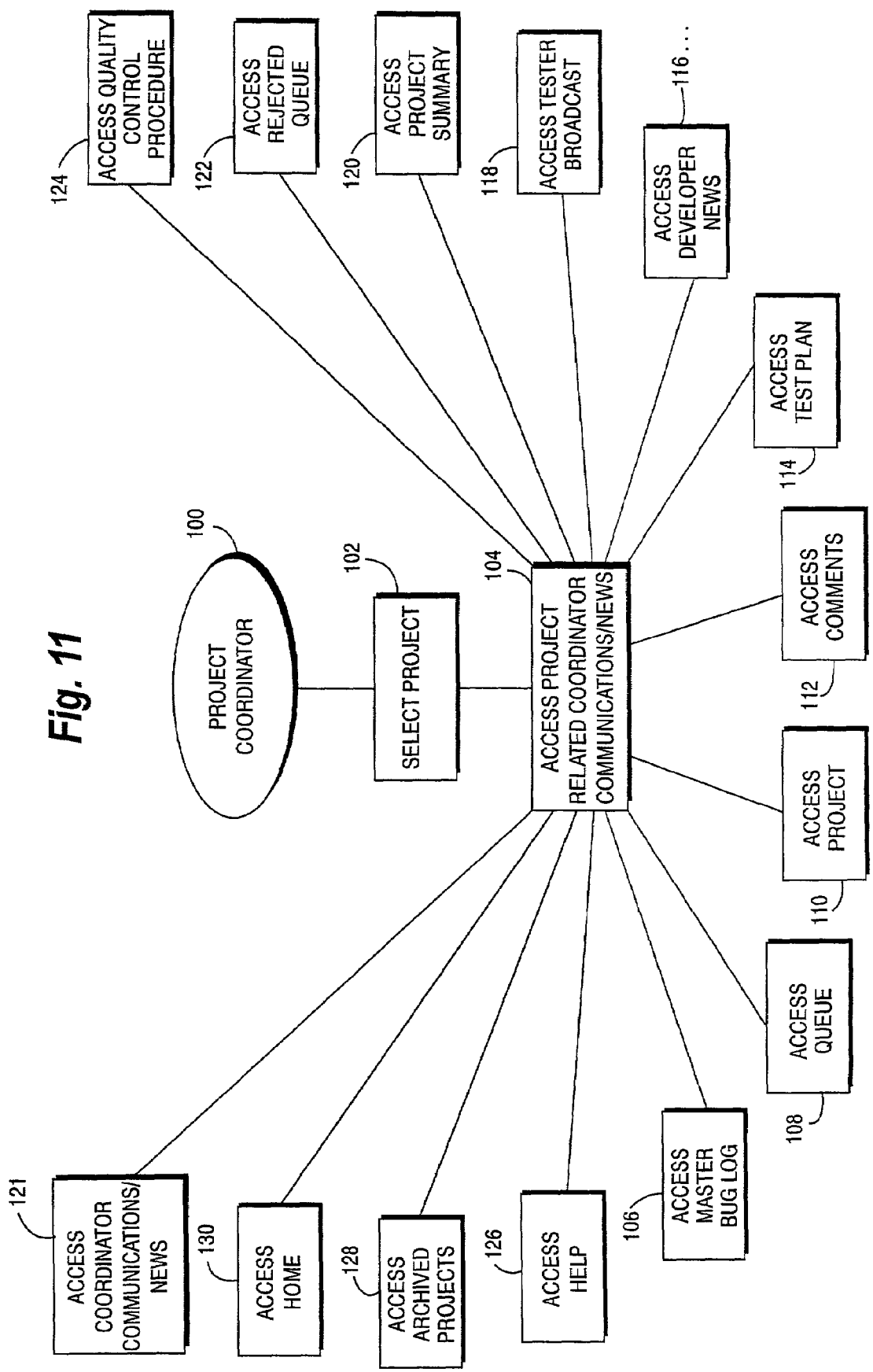
FIG. 11 is a flowchart showing the sequence of operations performed after the accessing of a home page by a project coordinator.

FIG. 11 is a flowchart showing the sequence of operations performed after the accessing of a home page by a project coordinator (100). The project coordinator, from the home page, selects a project (102). After selecting a project, in accordance with an exemplary implementation of the present invention, a project related coordinator communications menu is accessed (104). The coordinator communications/news includes communications from the developer relating to the latest information regarding the particular selected project. Such information will indicate, for example, whether a particular bug has been fixed, whether a developer needs more information and a wide range of other project related information or questions.

Figure 12:
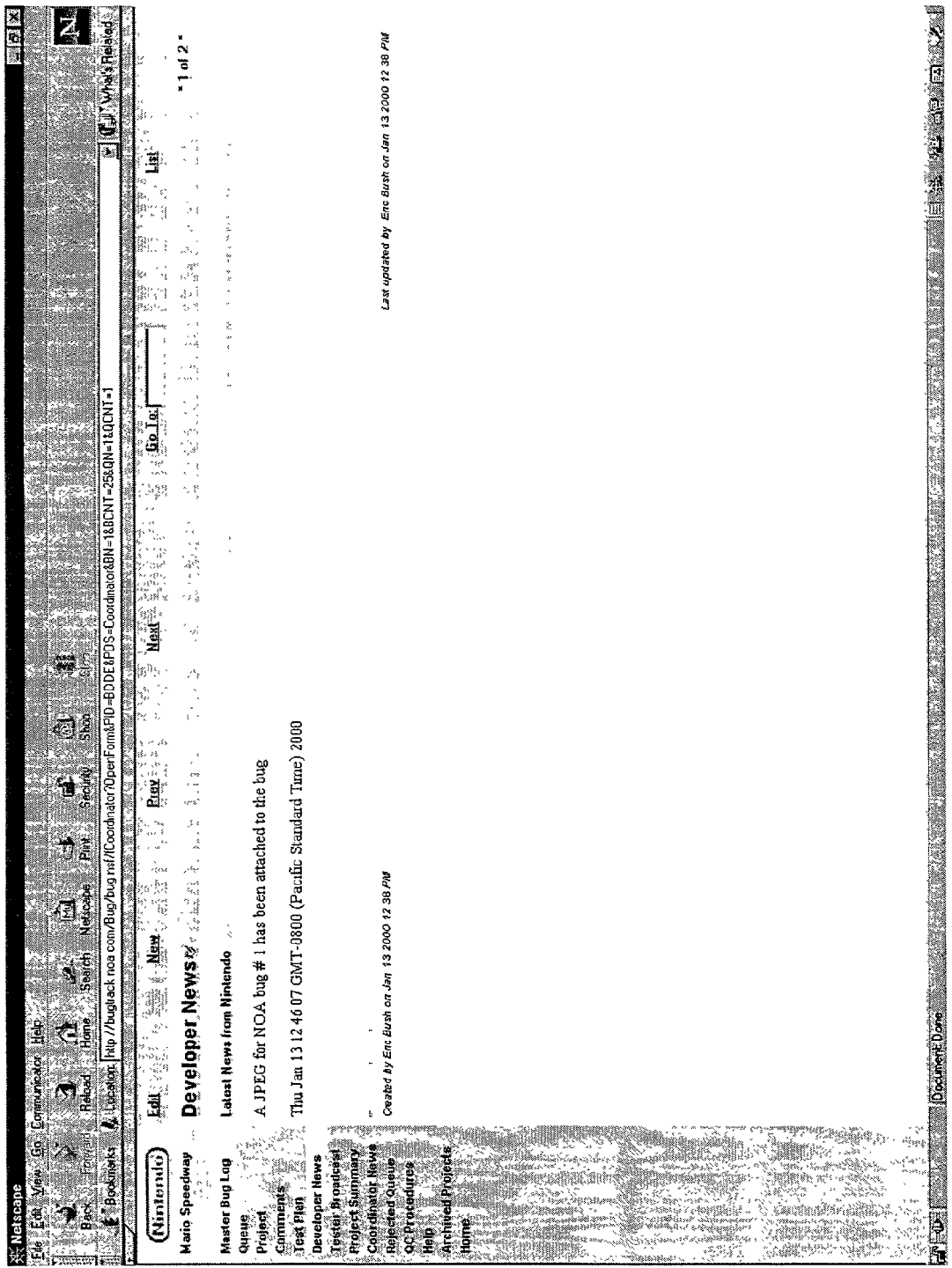
FIG. 12 shows an exemplary news/communications menu.

FIG. 12 shows an exemplary news/communications menu. Although FIG. 12 is entitled "developer news", the coordinator news is displayed in a similar menu entitled "coordinator news" having a subheading "latest news from developer X". Rather than specifying that a JPEG file for an identified bug has been attached to the bug, a developer may, for example, include a communication such as "please attach a video file for a specified bug". The developer may request a telephone call at a specified time. As represented in FIG. 11, the project coordinator has access to all the menu options provided in the left hand column of FIG. 12 under Mario Speedway.

Upon accessing the master bug log by clicking on the first entry under Mario Speedway, the project coordinator is able to access any of the functions identified therein, including editing existing entries on the master bug log, and adding new entries to the master bug log (an option limited to the project coordinator in the present exemplary embodiment).

When the project coordinator accesses the bug queue menu previously described in conjunction with FIG. 7, the project coordinator is able to edit any of the bugs in the queue. After the project coordinator edits a bug in the queue, the project coordinator may accept the bug for entry into the master bug log. The acceptance of the bug by the project coordinator does not permit a project developer to view the bug until the project coordinator utilizes the "publish" function. The publish function operates to both accept the bug for placement in the master bug queue and open the bug for viewing by the publisher. The project coordinator may choose to reject a bug which removes the bug from the bug queue and places it in a rejected queue. The project coordinator sequences through all the bugs in the bug queue and either accepts, publishes or rejects each bug.

A project coordinator is responsible for creating and editing projects. This is accomplished as indicated in FIG. 11 by the project coordinator accessing the project menu (110).

Figure 13A:
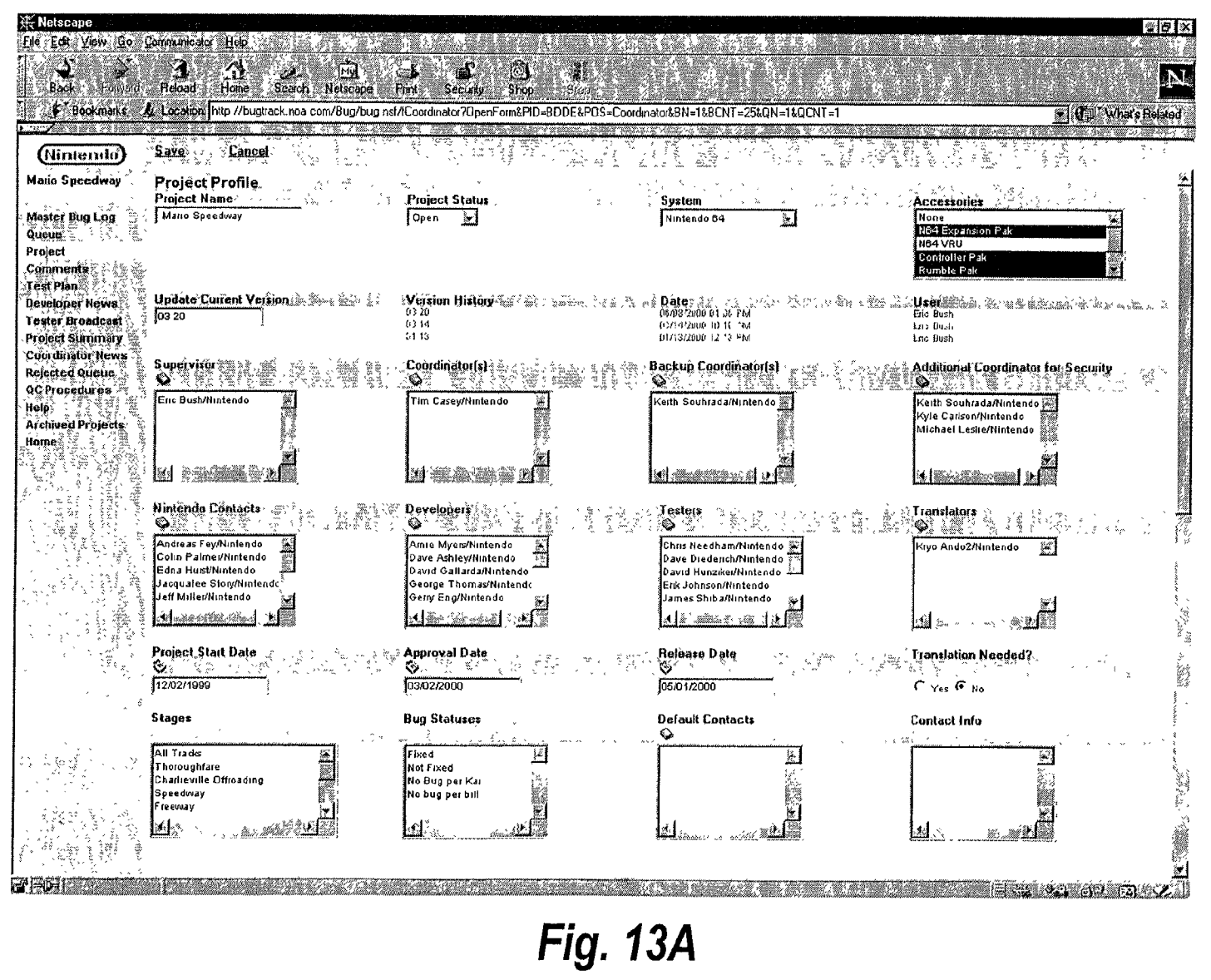
Figure 13B:
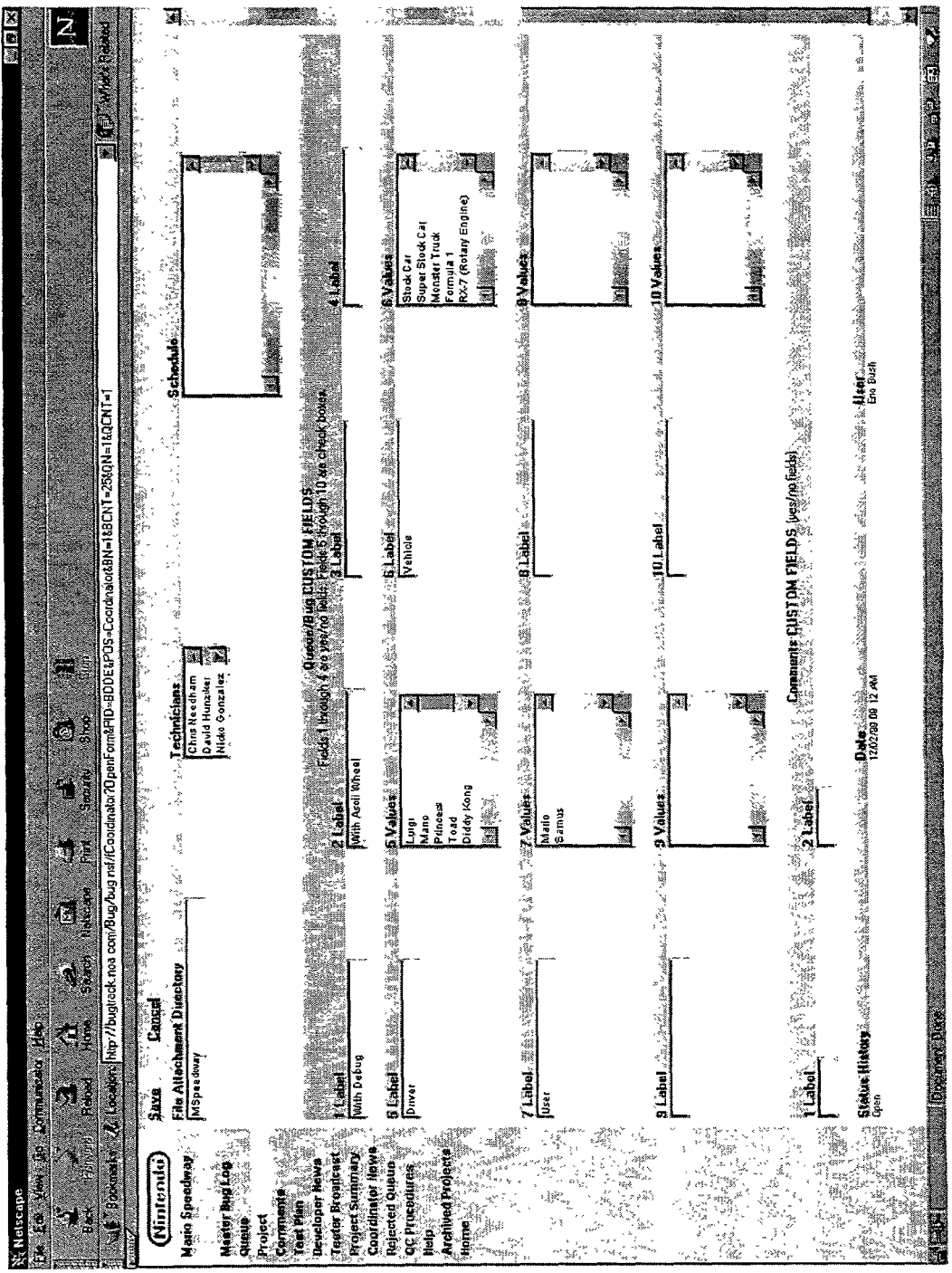
FIG. 13 shows an exemplary projects menu.

FIGS. 13A and 13B show an exemplary project menu. The project menu permits a project coordinator to set up a new project. The project coordinator may also access this menu from the home page "new" project icon. A project coordinator enters the name of the project, such as Mario Speedway, as shown in FIG. 13. The project coordinator then accesses a series of pull down menus for entering information with respect to the project. The project status is entered, such as for example, by indicating that the project status is open, closed or, for example, on hold. The system to which the project relates is identified by entering, for example, the Nintendo 64 hardware platform, GameBoy, etc. Depending upon the system selected, a list of available accessories may be identified as shown in FIG. 13. The accessories provide an indication to, for example, a game developer, of the accessories which were used to find a bug. Entries are made as to the date the current version of the game was updated and a version history identifies the dates various versions became available. The "date" field reflects dates of editing the project profile. The "user" entry identifies the user who edited the project profile. Thereafter, various project staffing entries are made to identify the supervisor, coordinators, backup coordinators, additional coordinators, corporate contacts, developers, testers and translators. Once a project coordinator enters a user's name in the appropriate category, the user has an associated set of rights to access the system as discussed herein, depending upon the job title identified. Thereafter, the project start date is identified and data is entered for other fields including approximate approval date, approximate release date, whether a translation is needed or not, project/game stages, the status of bugs in each associated stage, and default contacts with associated contact information (such as e-mail addresses, etc.).

As indicated in FIG. 13B, a file attachment directory field is shown video files associated with a bug. The technicians working on the project, and a work schedule (e.g., 8:30-6:00) entry field for the project are identified. The project menu includes, by way of example only, ten custom fields which may be set forth in any desired order. Fields 1-4 are "Yes/No" response custom fields. Fields 5-10 identify both a label and a value allowing a user to identify, for example, a driver label and a specific driver name as shown in FIG. 13B. Similarly, a vehicle label may be identified together with values for vehicle names. A user field is also identified together with variables indicating user names. Thus, through such custom labels, an indication may be provided as to which vehicle was utilized by a tester when a bug was detected. Additionally, various custom fields are available for the comment menu where, for example, an indication may be made as to a game being too hard or too easy during a particularly identified game mode. Finally, status history, date, and user fields are provided.

Turning back to FIG. 11, a coordinator may access the comments menu (112) resulting in the FIG. 9 menu being accessed. A project coordinator is permitted to both add new comments as a tester is able to do, and additionally edit the comments. A coordinator is able to edit comments made by any system user. In accordance with an exemplary embodiment, the status function shown in FIG. 9 may be accessed by a project coordinator to permit the project coordinator to accept a comment permitting the comment to be viewed by one of the other users of the system, such as, for example, a corporate contact.

As shown in FIG. 11, a project coordinator can also access the test plan menu (114) which is shown in FIG. 10. In accordance with an exemplary embodiment of the present invention, the project coordinator is authorized to edit the test plan to, for example, provide updated guidance to testers on a daily basis, if desired.

A project coordinator additionally has the option of accessing the developer news menu (116) shown in FIG. 12. Through the developer news menu, the project coordinator reports information to the developer. The coordinator may, for example, indicate to the developer that testers have added 10 new bugs as a result of testing done on the date time stamped. Alternatively, as shown in FIG. 12, a coordinator may, for example, add a note indicating that a JPEG file for a particular bug has been attached.

Figure 14:
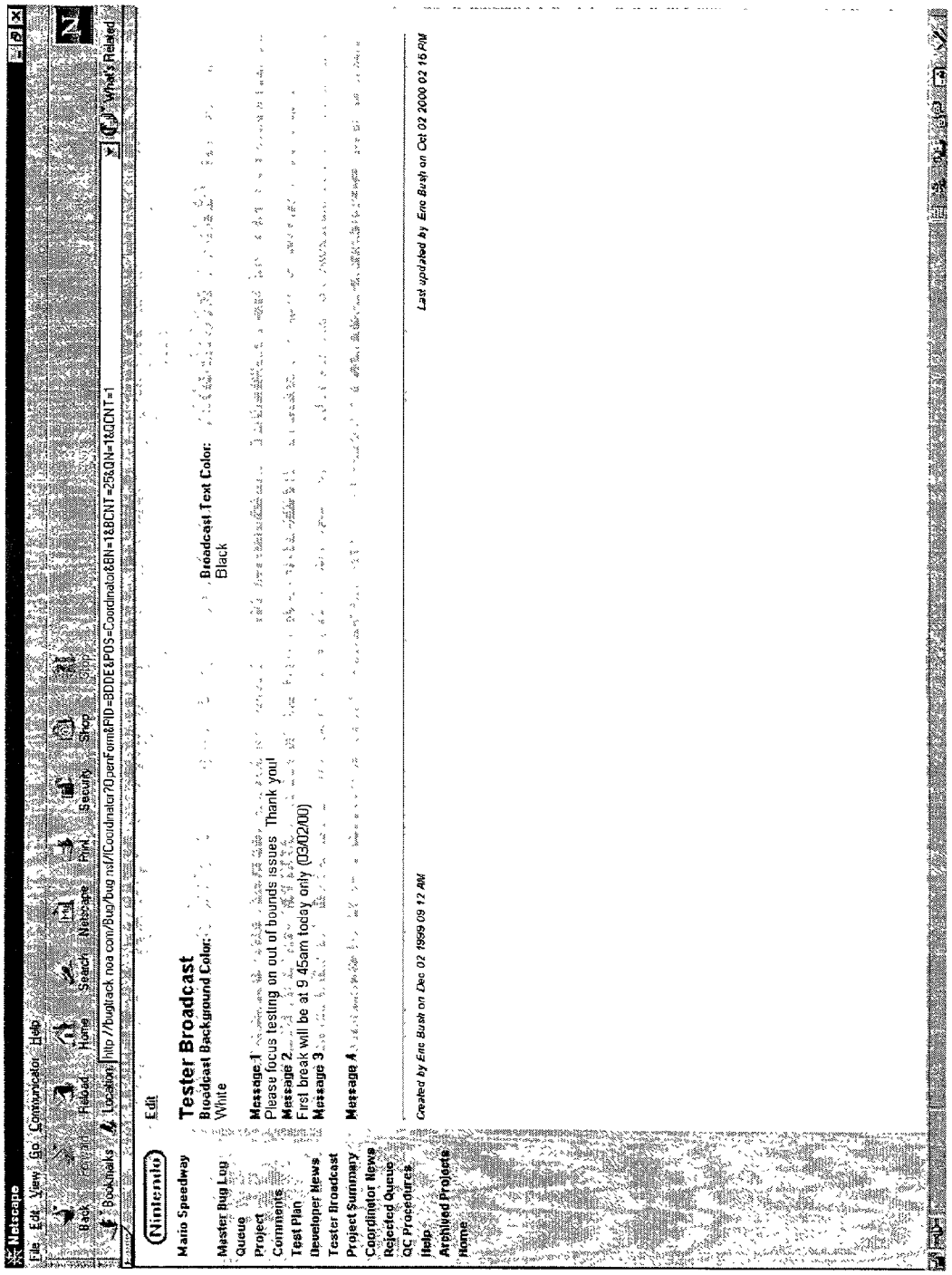
FIG. 14 shows an exemplary tester broadcast menu.

Turning back to FIG. 11, the project coordinator may access a tester broadcast menu (118). An exemplary tester broadcast menu is shown in FIG. 14. The tester broadcast menu permits a project coordinator to broadcast messages to testers relating to an identified project. In accordance with an exemplary embodiment of the present invention, such broadcasts are only available for transmission by a project coordinator. If desired, such message broadcasting functions may be provided to other parties.

Figure 15:
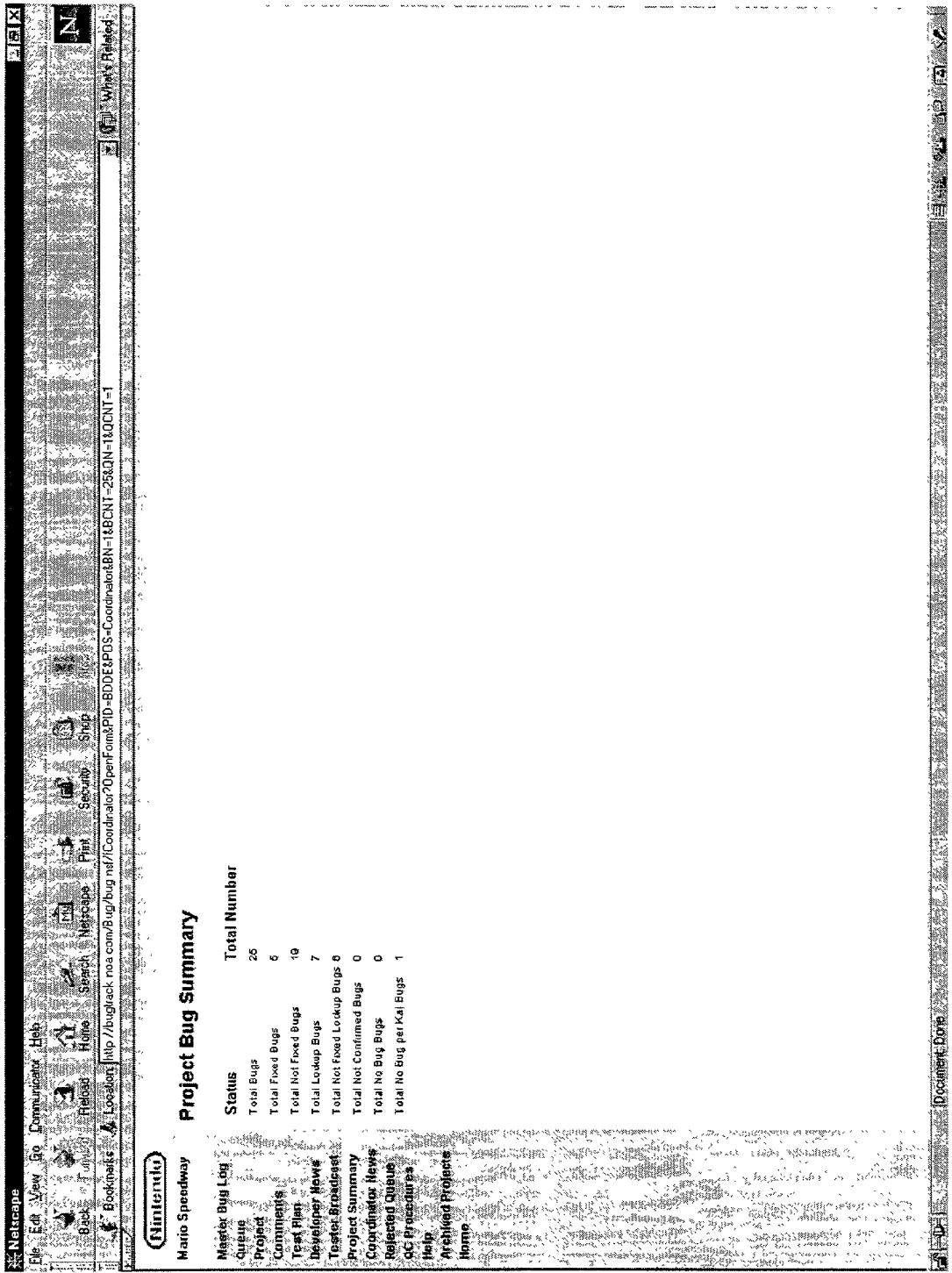
FIG. 15 shows an exemplary project summary menu.

A project coordinator may additionally access a project summary menu 120 as indicated in FIG. 11. FIG. 15 shows an exemplary project summary menu. The project summary menu is a condensed report identifying bug related statistics for categories relating to the contents of the master bug log. As shown in FIG. 15, for an identified project such as "Mario Speedway", statistics are presented relating the projects' total bugs, total fixed bugs, total not fixed bugs, total lock up bugs, total not fixed lock up bugs, total not confirmed bugs, total no bug bugs and total no bugs per an identified individual working on the project.

Turning back to FIG. 11, the project coordinator may return to the project coordinator communication/news menu (104) at any time as indicated by the access coordinator communication/news 121 option.

Figure 16:
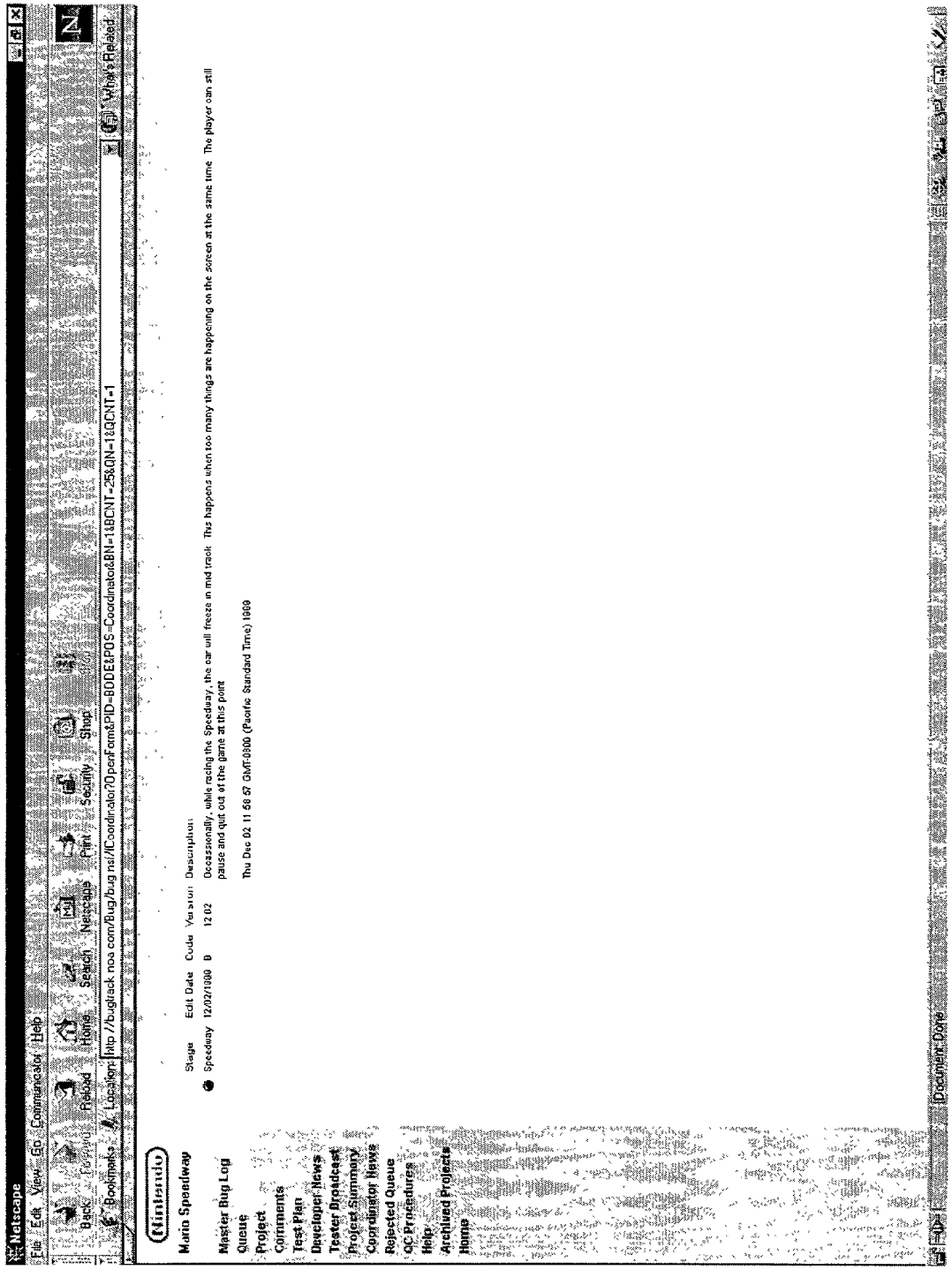
FIG. 16 shows an exemplary rejected queue for an exemplary project.

Additionally, a project coordinator may access a rejected queue menu 122. FIG. 16 shows an exemplary rejected queue for the project "Mario Speedway". The rejected queue is intended, in the present exemplary embodiment, to list the bugs from the bug queue which have been rejected by a project coordinator since the inception of the project.

Figure 17:
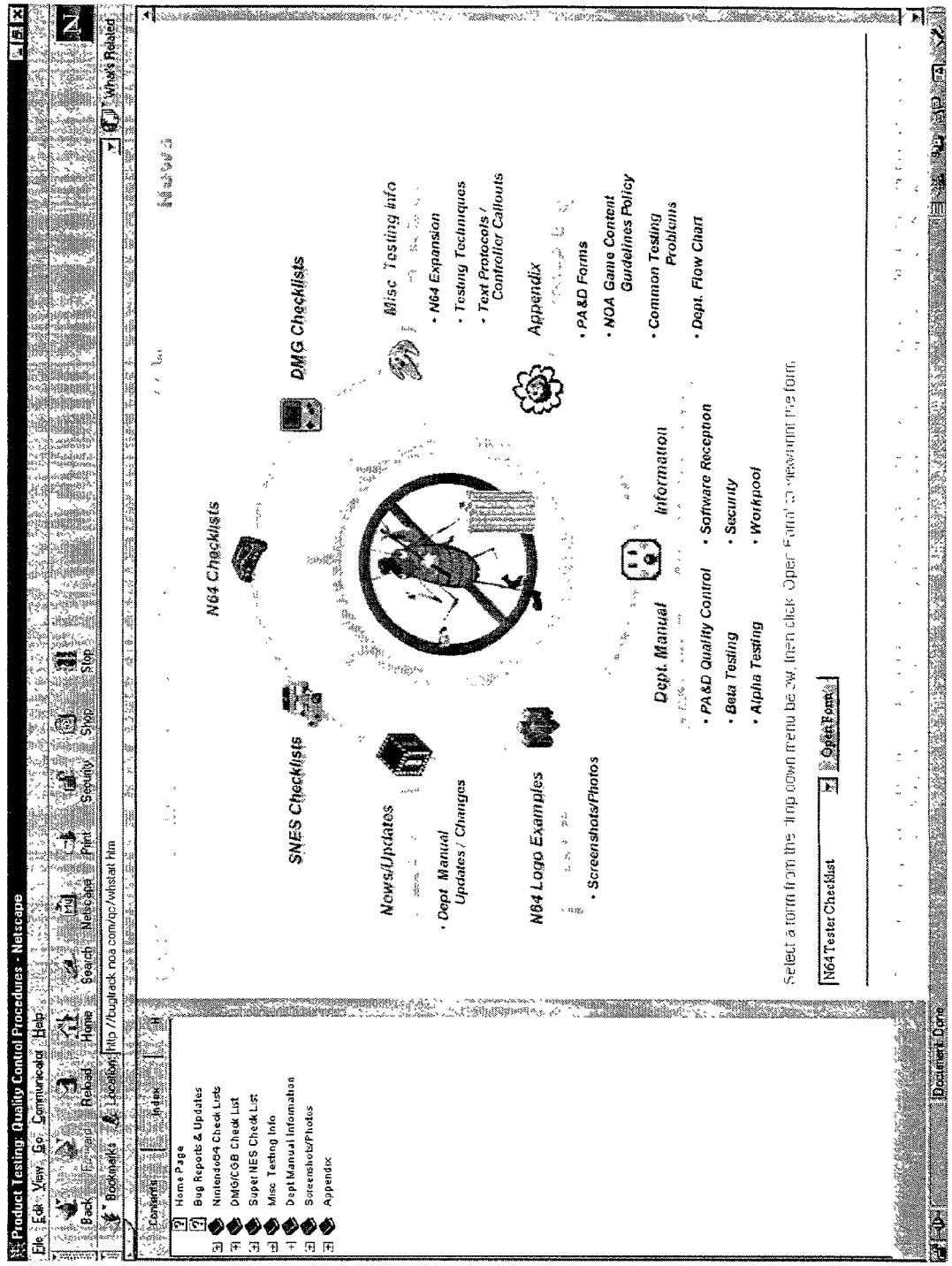
FIG. 17 shown an exemplary quality controls procedure menu.

As indicated in FIG. 11, a project coordinator may also access a quality control/testing procedures menu (124). An exemplary quality control/testing procedure menu is shown in FIG. 17. In accordance with the present exemplary embodiment of the bug tracking system described herein, the quality control/testing procedure menu shown in FIG. 17 provides access to a database that expands on a wide variety of test procedures relating to every software product on every platform sold by a particular corporation. In the present exemplary embodiment, the quality control/testing procedures menu shows, for example, checklists for the SNES, N64, and GameBoy products commercially sold by the applicants' assignee. The menu provides access to all the testing forms that may be required during testing. Thus, the FIG. 17 menu shows multiple video game platforms with access to testing methodologies for each of the platforms. It is contemplated that a wide range of useful bug related information such as an identification of exemplary bugs, how to fix such exemplary bugs and other such useful information would be accessible through the FIG. 17 menu. A wide range of additional valuable information may be accessible as indicated in FIG. 17, such as personnel related information, policy guidelines for game content, etc.

Turning back to FIG. 11, a project coordinator also has access to a help file for helping users utilize the present bug tracking system (126). Additionally, a project coordinator can access to an archived project menu (128). It is contemplated, for example, that, after a particular project has been tested, the project will be archived for future reference. A project coordinator can likewise access the home page (130).

As previously mentioned, the bug tracking system, in accordance with an exemplary embodiment of the present invention, advantageously utilizes a sorting function. The project coordinator may utilize this sorting function from, for example, the master bug log as previously described in conjunction with FIG. 5. The sorting function permits sorting by any variable identified in the master bug log, as previously described.

Figure 18:
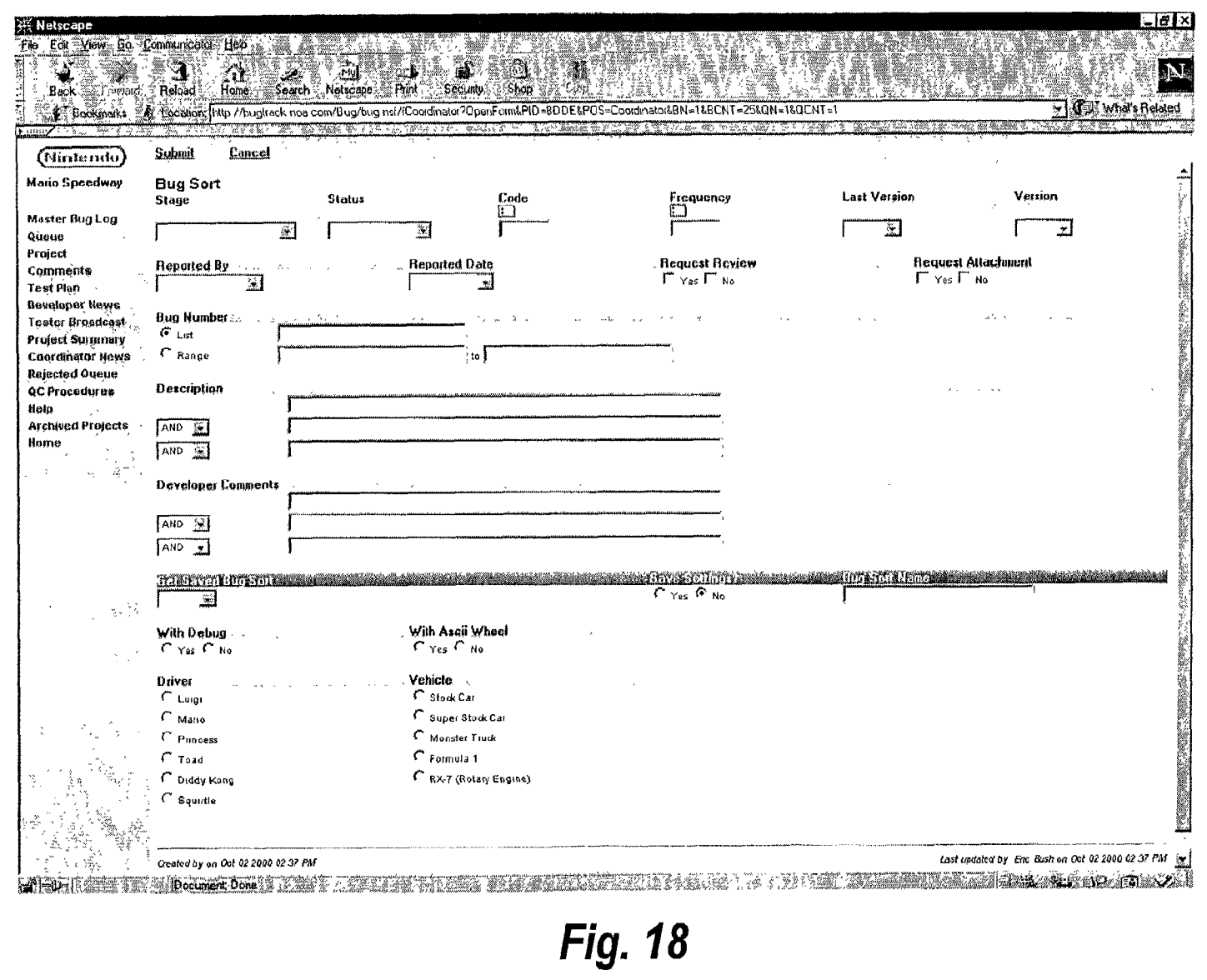

FIG. 18 shows an exemplary bug sort menu for the project "Mario Speedway". The sort options permit sorting by any single variable identified in the master bug log as shown in FIG. 18. For example, sorting may take place based on stage, status, code, frequency, the last version, any identified version, the party reporting the bug, the reported date. The codes A through L are used to specifically identify the type of bug identified. In this illustrative embodiment such codes may represent the following bugs:

A. Hard Lockup

This bug occurs when the screen freezes, turns black or becomes corrupted during or after power up on your system. You cannot continue gameplay by pressing any of the buttons on the controller. The only way to resume gameplay is by turning the power off or by resetting the system ("soft reset" on the Game Boy).

B. Soft Lockup

A related problem is getting your character "stuck" somewhere with no possible recourse beyond pressing RESET. An example would be entering an empty, windowless room with only one door, but not being able to exit through the same door. Your character cannot die because there are no enemies present or life-threatening hazards . . . , you are forced to spend the rest of your gaming life in this one room.

C. Graphic/Texture Bugs

1. Corrupted Graphics: By definition, corrupted graphics are graphics that look different from how they were intended to look. Normally, it will look like scrambled pieces of existing graphics (e.g., his/her head being attached to his/her left hand or distorted shapes that are not part of the normal game). It can also appear as a flash on your TV screen (corrupted graphics can appear between frames of animation—impossible for your eye to define without the aid of your VCR's frame-by-frame pause capabilities). If you see a "flash" on your screen, it is typically the result of between-frame, corrupted graphics.

2. Palette Color Bug: In "the real world," a palette is a wooden board that a painter uses to mix his/her paint. Programmers use a similar tool to create and mix colors for video games. The palette tool is programmed into the system hardware by Nintendo. The N64 palette is capable of supporting 2.1 million colors. A Palette Bug deals with incorrect or misplaced colors. For example, if you see a landscape that has red grass, a blue barn, a green sun, and a yellow sky . . . and you know it should be a red barn in a field of green grass with a yellow sun in a blue sky, this is a palette bug.

3. Missing Textures: A Missing Texture Bug is when all or a portion of a polygon object is missing its surface (i.e., texture). A good example would be if Mario's face in SMW64 was missing the skin on either his whole face or just a small portion of his face. The polygon object is still created but missing the surface, resulting in the player seeing through Mario's face.

4. Incorrect Textures: An incorrect texture is similar to a missing texture except that instead of missing the texture or "skin" altogether, the wrong texture has been placed on the polygon. Let's use the Mario face again to explain—Incorrect Texture Bug would be if Mario's hat had a "grass texture" on it instead of a plain red texture.

D. Polygon Bugs

1. Polygon Seams: The N64 is a polygon-based system. Instead of drawing two-dimensional cartoon figures on-screen, the programmers can create realistic three-dimensional objects by building them out of polygons (a good analogy is comparing a crayon drawing to a building block or Lego structure). A polygon seam is a place where the edges of two polygons don't match up exactly, leaving a very small gap between the two. This is typically visible as a blue or white line or dot that appears on-screen.

2. Polygon Dropout: Related to Polygon Seams. Dropout occurs when the game player approaches or views a polygon-based structure from an unexpected angle. The programmer will purposefully omit textures from some sides of polygons or neglect to even build a particular part of a structure (see Out-of Bounds roof example). By not adding these elements, the programmer saves memory space for future use and increases the game's running speed. As a tester, you will need to find these areas. Polygon Dropout usually has two different forms: the "now you see it, now you don't" type, where a texture/polygon is visible from angle 90, but moving slightly to angle 90.001 causes it to vanish; and the "blue field" type, where a patch of blue geometry is present in your environment.

3. Z-Buffering and Masking: These are technical terms for a really ugly N64 bug. Basically, these can occur when two or more items occupy the same space. One item should have a higher priority than the others and appear first or "on top" of the others. Watch for background objects appearing in the foreground, such as Mt. Rainier suddenly showing up on the corner of $4^{th}$ and Stewart in downtown Seattle. That's a Masking problem. If Safeco Field zaps in and out (similar to electrical interference) and you can see parts of Mt. Rainier through it, then Safeco Field and Mt. Rainier are fighting over the same space. That's a Z-Buffering problem.

4. P-Clipping: Let's say you are playing SMW64, and you are looking at the entire castle. When you turn Mario's head to the right, half of the castle should scroll off the screen if the P-clipping is working properly. Now, when you turn Mario's head back to the left, the portion of the castle that couldn't be seen should be back into view. If the N64 does not redraw the castle properly, you will only see half of the castle. This is a P-Clipping Bug. This problem can happen within just one frame of animation, or it can stay on the screen until the player moves Mario's head right and left a few times.

E. Camera Bugs

On the N64, the camera is defined as the perspective from which the game player sees the environment/action.

1. The camera penetrates an object or wall and gets stuck, which inhibits the game player from being able to progress.

2. The camera gets stuck behind an object, preventing the game player from seeing the character/action, yet the character is still able to move around on-screen.

3. The wrong camera perspective (angle) is selected by the CPU, resulting in the game player not being able to follow the action or character on-screen.

4. On games that are designed to allow the game player to manipulate the camera angles with the use of buttons, the player is unable to do so.

F. Out-of-Bounds/Environment Bugs

This occurs when the programmer does not build enough polygons to completely cover the object being created. For example, the roof of a house may be represented by four polygons . . . two to create the slanted top part and two to cap the vertical ends. If the programmer forgets to put one of the vertical end cap polygons in, then this will allow the game player to see (or move) inside the roof (if approached from the proper angle). Since the roof interior was never meant to be accessed, there won't be any textures or system support for getting inside. The game will oftentimes crash at this point. Large Polygon Seams and areas of Polygon Dropout are excellent "exit points" for going Out-of-Bounds.

G. Hit Detection Bugs

Hit Detection deals with the distance(s) between multiple objects. If your character punches an enemy, but no damage or reaction is registered, then the hit has not been detected. Hit Detection also extends to how characters interact with their environment (water hazards, mountain precipices, a baseball strike zone, conversation/speech auto triggers, menu button cursor selection, etc.). Hit Detection distances should remain consistent throughout the game. Extreme distance (either too close or too far) is also considered a bug.

H. Saving Bugs

Pay close attention to your saved game data. If the game doesn't save all applicable information (e.g., scores, statistics, items, weapons, experience points, etc.), there is a Saving Problem. The most common occurrence of Saving Bugs would be missing data. Saving Bugs could also impact the information saved to a Controller Pak.

I. Rules and Scoring Bugs

1. Rules: Rules are put in sports and racing games to maintain the integrity and authenticity of the sport. Should those rules be breached by the game player or omitted by the developer, this is a Rules Bug.

2. Scoring: Scoring bugs consist of several different types of bugs (too many to list all the examples). These bugs can range from not receiving enough hit points for beating an enemy, or not receiving the appropriate amount of money/gold for selling an item, to not being able to score enough points to complete a stage or level. For example, let's say you're playing Wave Race 64, and after finishing the first race in last place, the software awards you 7 points (the number of points awarded for first place). This is a Scoring Bug.

J. Audio Bugs

These bugs will most likely sound like pops, crackles or static distortion in either the right or left channel of your headphones. The majority of these bugs occur on power up or when the screen changes or when an action is registered during gameplay. It is important that you test while wearing headphones, as most audio bugs have a very short running time and are sometimes masked by sound effects. Additionally, audio bugs can sometimes be a precursor to a lockup. Timing is also a potential problem area. If your character shoots an enemy, the sound effect or audio sample should trigger at the time of the explosion, not before or after.

K. Text and Grammar Bugs

All game text, menus, credits and on-screen information needs to be checked for proper spelling, word usage, grammar and punctuation.

L. Legal

Any bugs involving U.S. Trademark and Copyright information are considered Legal Bugs.

Any bugs, anomalies or problems that cannot be categorized under any of the above described problems are considered Miscellaneous Bugs (e.g., Control Stick doesn't calibrate properly, Rumble Pak functions don't work, etc.).

M. Corporate Game Context Guidelines Re Violence, Sexual Content, Drugs, Profanity Turning back to FIG. 18, the request review and request attachment fields permit sorting, for example, based on whether review has been requested or whether an attachment file exists for a bug. Sorting may also take place based upon a list of bug numbers or range of bug numbers or descriptions of the bugs based on various logical search queries, either from the bug description field or the developer comments field. The FIG. 18 menu also permits a user to save bug sorting parameters. As previously discussed, the sort option also includes sorting by various customized fields (e.g., "with debug", "with ASCII wheel", "by driver", "by vehicle", etc). The customized fields just identified are, of course, specific to the driving based Mario Speedway project and are in no way intended to limit the range of customized fields possible.

Figure 19:
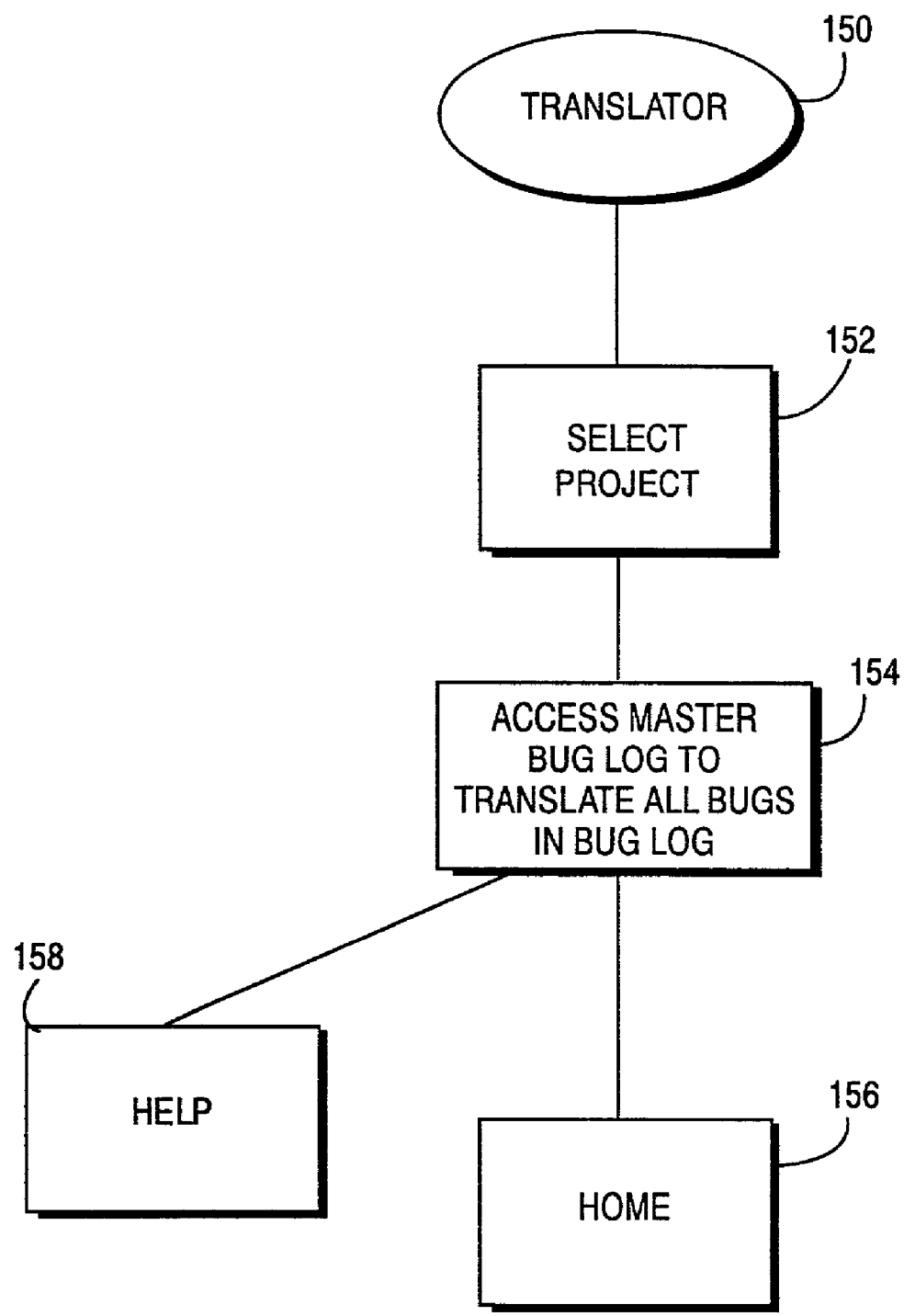
FIG. 19 is a flowchart showing the sequence of operations performed after an individual recognized as being a translator, accesses a bug tracking system home page.

FIG. 19 is a flowchart showing the sequence of operations performed after an individual recognized as being a translator, accesses a home page as indicated at block 56 in FIG. 2 (150). A translator selects a project (152) for translation. Upon selecting a project, the master bug log is accessed to permit the translator to translate information relating to all bugs in the bug log (154). The translator enters a translation by utilizing the edit function. The translator then translates various portions, such as the description and developer comments for each of the bugs in the bug log. The use of such translation methodology permits very efficient analysis of bugs without requiring either an English speaking or, for example, a Japanese speaking game developer to hire a translator under circumstances where a translator would typically be required. Using the translation feature, bug related communications may be virtually instantaneously analyzed by an individual speaking a different language than the language originator. Translators are preferably trained with respect nature and type of bugs involved so that the translations are accurate technologically.

A translator has only limited access to the bug tracking system in the exemplary embodiments of the present invention. For example, the translator from the master bug log is only permitted to access the home page (156) or the help menu (158).

Figure 20:
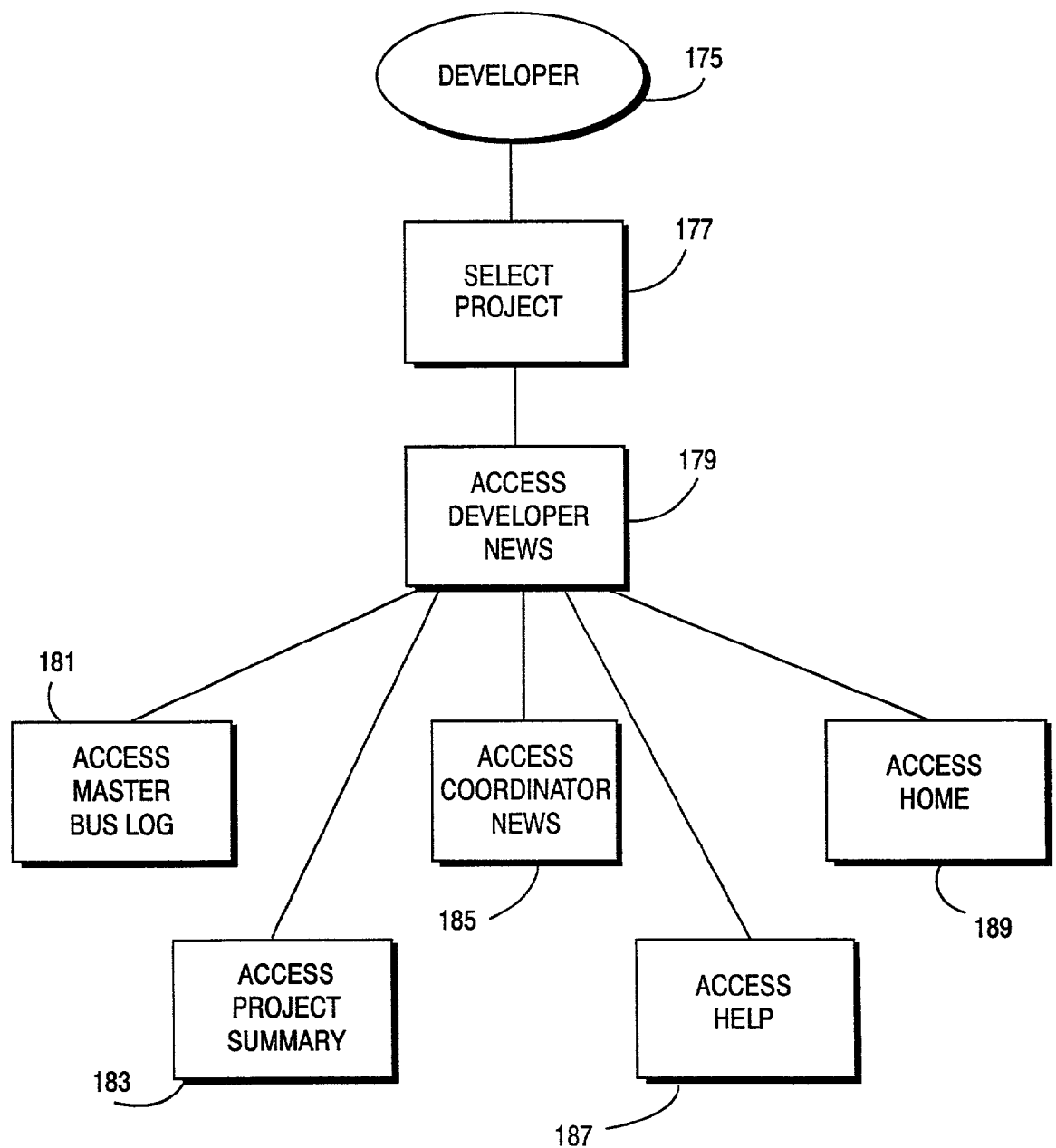
FIG. 20 is a flowchart indicating the sequence of operations performed after a developer access a bug tracking system home page.

FIG. 20 is a flowchart indicating the sequence of operations performed after a developer accesses the home page at 56 in FIG. 2. The developer accesses the bug tracking system to enable viewing of bugs in the game being developed 24 hours a day, 7 days a week. In this fashion, the developer is kept apprised of precisely what is happening on the project at all times. Once the developer goes into the home page (175), the developer selects a project under development (177). After selecting a project the developer accesses a menu entitled "Developer News" which provides the developer with the latest news from the coordinator, such as has been described in conjunction with FIG. 12. Having accessed the developer news, the developer may reply back to the coordinator by accessing the coordinator news (185). Typically, a developer will choose to access the master bug log (181), which has been previously described in conjunction with FIG. 5. When in the master bug log, although a developer is able to utilize the edit function, developers are permitted only to edit the developer's comments section, shown in FIG. 5. The developer is able, in the developer comments section, to request review or to request a file attachment. The developer may provide a comment such as, for example, by indicating that an identified bug has been fixed. When a developer has requested review of a bug, an indicator will flag this selection. For example, the icon next to "bug" on the master bug log in FIG. 5 indicates that a developer has requested review of the bug. A developer will also be able to access the sorting functions described above and available via, for example, the master bug log.

A developer may alternatively access the project summary menu (183) to see the project summary shown, and previously described, with respect to FIG. 15. A developer may additionally access the help menu (187) or go back to the home page (189).

Figure 21:
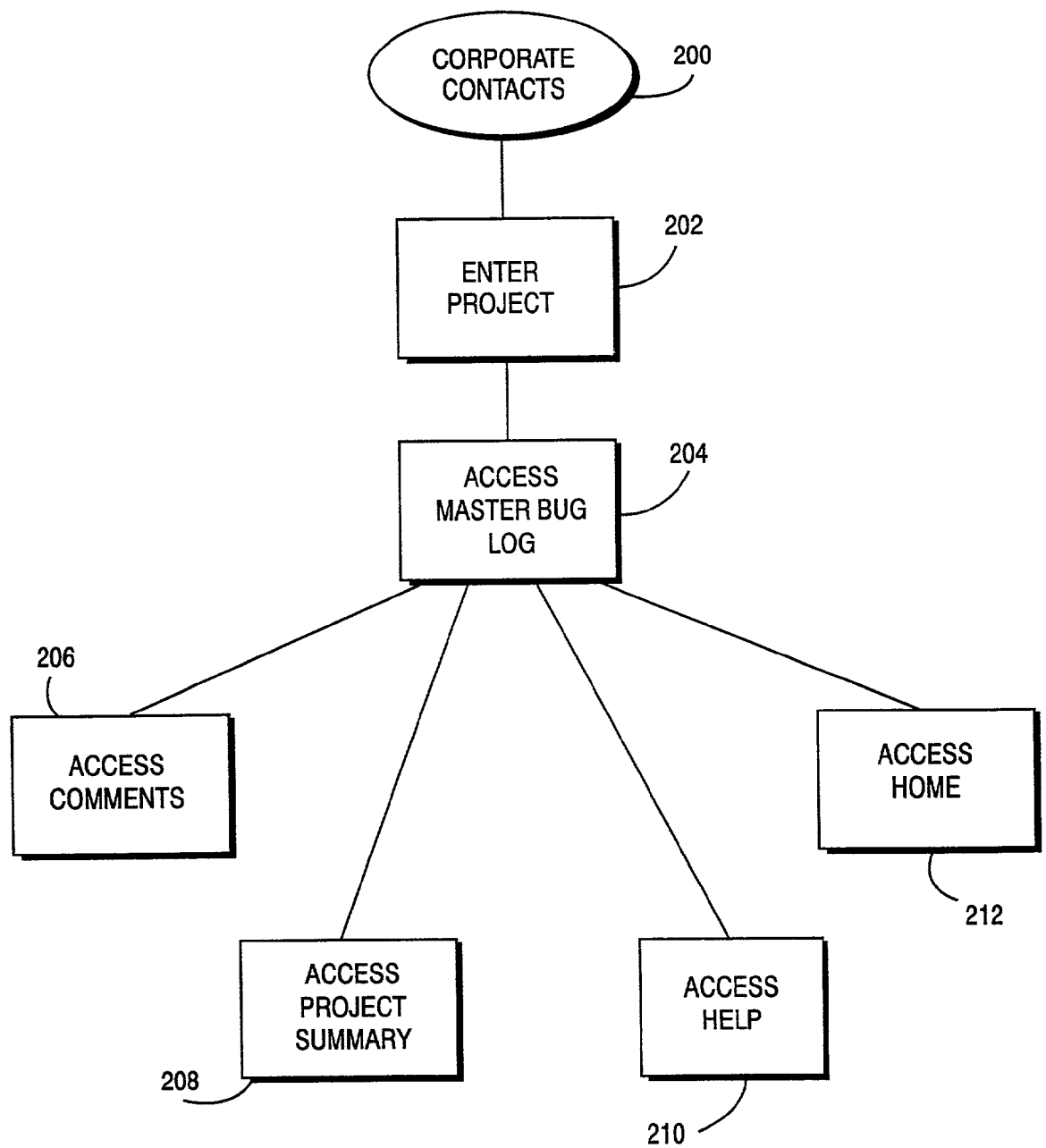
FIG. 21 is a flowchart delineating the sequence of operations performed by the bug tracking system after a corporate contact accesses a bug tracking system home page.

FIG. 21 is a flowchart delineating the sequence of operations performed by the bug tracking system after a corporate contact accesses the home page as shown at 56 in FIG. 2. The corporate contact is able to utilize the bug tracking system to keep track of how game development is progressing. The corporate contact's entry to the bug tracking system permits, for example, a senior executive or a member of the corporate legal staff to review bugs associated with the system. In the illustrative embodiments, the corporate contact is not permitted to edit fields in the bug tracking system, but rather is only able to view the indicated display menus. From the home page, a corporate contact (200) enters a project identification number (202). After entering the project, the corporate contact accesses the master bug log (204) with respect to the entered project. From the master bug log, the corporate contact is able to access the comments menu for viewing the comments from the various testers in the project (206). If desired, the corporate contact is able print out a copy of the comments and, for example, send by facsimile transmission such comments to a developer. A corporate contact may also access the project summary, described below in conjunction with FIG. 19, to access detailed statistics objectively indicating how the project is progressing. Finally, the corporate contact in the exemplary embodiment of the present invention is able to access help information (210) and access the home page (212).

As will be appreciated by those skilled in the art, a wide variety of computer programs may be used to generate screen displays of the nature described above. Based upon the methodology set forth in the above-described flowcharts when viewed in light of many screen displays and the description of system operation previously set forth, significant direction has already been given to persons skilled in the art as to how such programs may be generated.

The flowcharts which follow provide an illustration of further details with respect to an exemplary implementation of software which may be used to generate the screen displays and control the functionality described above.

Figure 22A:
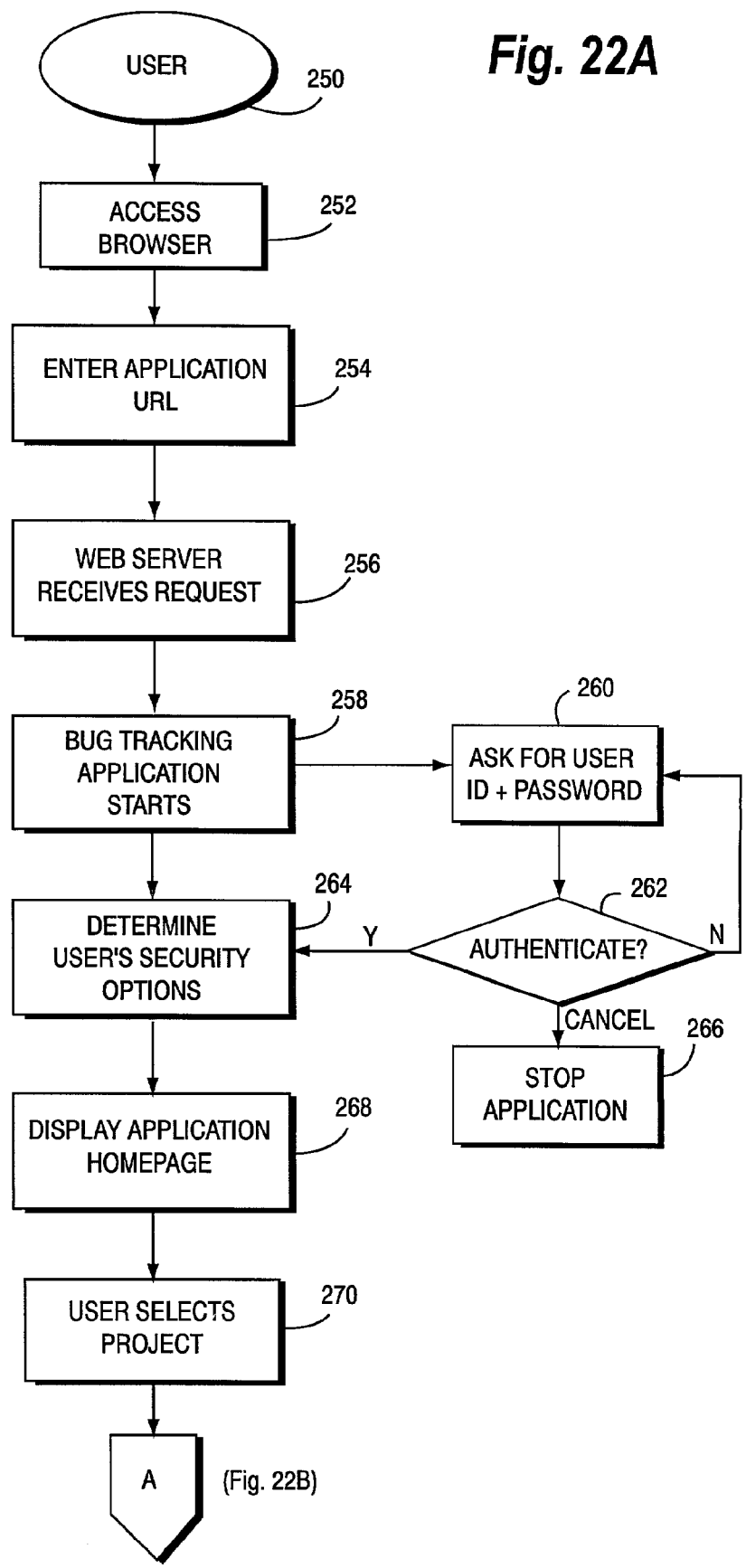
FIG. 22A and FIG. 22B are an illustrative flowchart of further programming details with respect to user sign on processing.
Figure 22B:
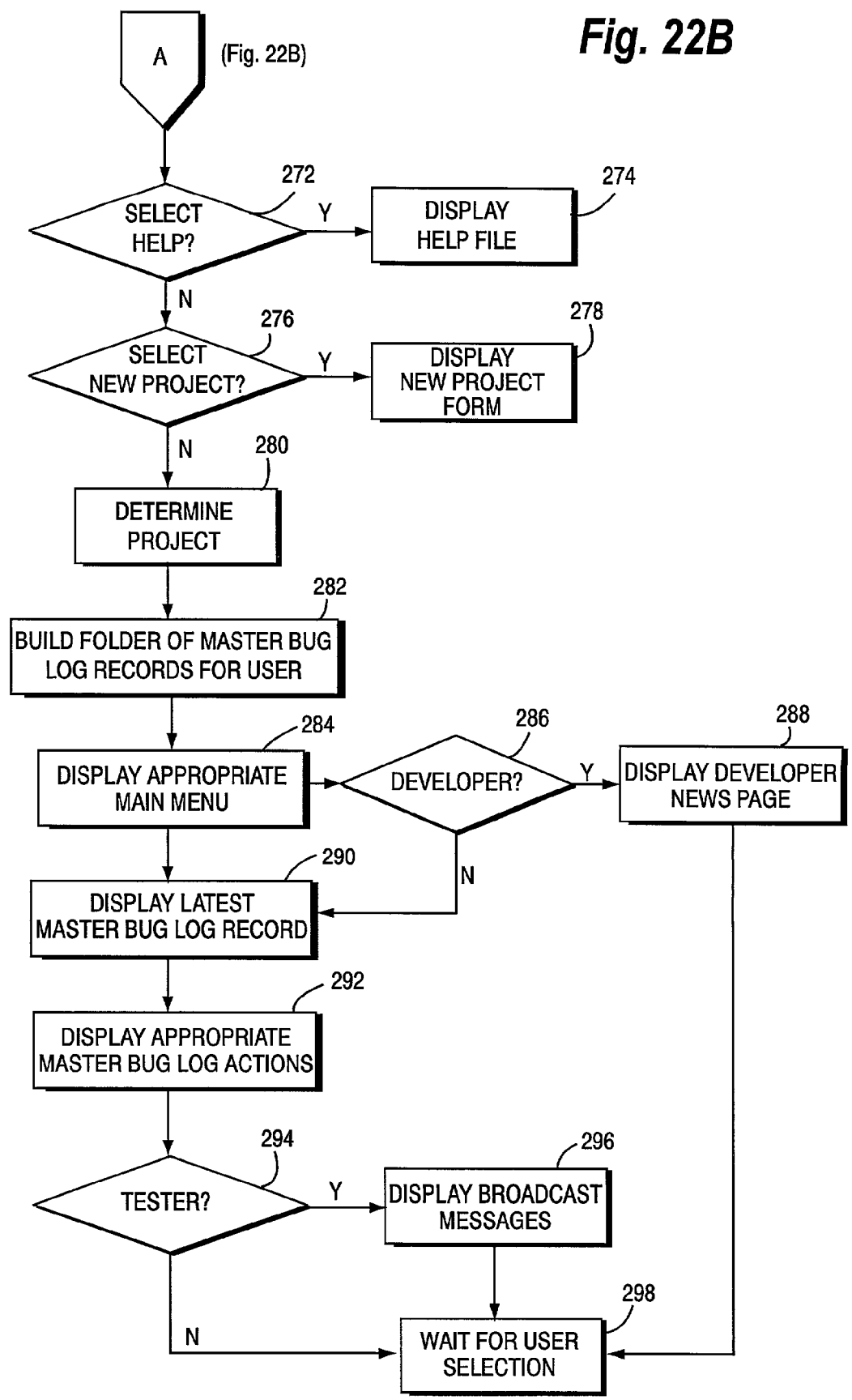

FIGS. 22A and 22B depict a flowchart of further programming details with respect to user sign on processing. As shown in FIG. 22A, when a user begins system operation (250), an Internet browser is accessed (252). After accessing an Internet browser, the user then enters the bug tracking system application program URL to access the previously described web server 22 shown in FIG. 1.

After entry of the appropriate URL, the web server 22 receives and is notified of a request for access (256). The bug tracking application program then begins executing (258) on a AS 400 (20) computer in the illustrative embodiment. As previously described above, a user is prompted to enter an ID and password (260). As indicated at block 262, the system then authenticates the user based on the ID and password entry. If the user is not authenticated at 262, the routine branches back to block 260 to request reentry of the ID and password. If the user cannot be authenticated, the bug tracking system application will stop executing (266).

If the user's ID and password are authenticated, the user's security options are determined (264) to define those aspects of the system the user is entitled to access based upon the user's role as a game developer, project coordinator, tester, translator and/or corporate contact. Once the security options have been determined for a user, the system displays the home page shown in FIG. 3 (268). The user then selects a project (270).

As shown in FIG. 22B, a check is then made to determine whether the user has selected the "help" function shown in FIG. 3 (272) and, if so, the help file is displayed (274). If the user has not selected the "help" function, a check is made to determine whether the user is a project coordinator and has selected a new project (276). If so, a new project form is displayed (278). If not, then a determination is made as to what project has been entered (280).

After determining which project has been entered and depending upon the user's role in game development, an appropriate folder is built of the master bug log records for the user (282). Depending upon the particular user's role, all appropriate bug related documents that match the project are built into the user's folder and an appropriate main menu is then displayed for the user (284).

A check is then made at block 286 to determine whether the user is a developer. If the check at 286 indicates that the user is developer, then the system displays the previously described developer news page (288). After the display of the developer news page, the routine branches to block 298 to wait for a user selection. If the check at 286 reveals that the user is not a developer, then the latest master bug log record is displayed (290). In so doing, the system will display the appropriate bug log options for the particular user (292).

A check is then made at block 294 to determine whether the user is a tester. If the user is a tester, then the system displays tester broadcast messages. After displaying tester broadcast messages at 296 or if the user is not a tester, the routine sequences to block 298 to wait for a user selection.

Figure 23:
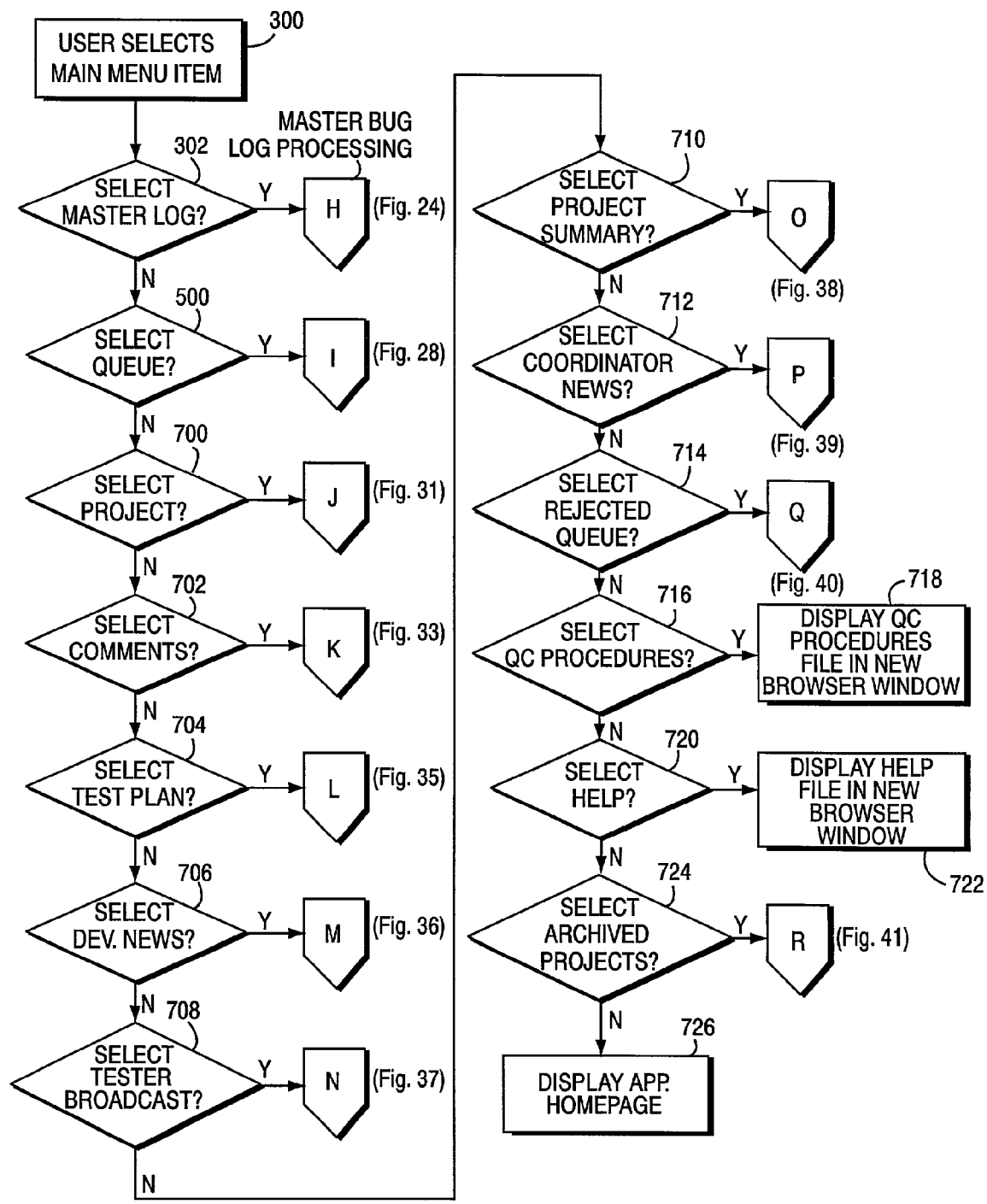
FIG. 23 is an illustrative flowchart depicting further details regarding the sequence of processing operations performed when a project coordinator accesses the system and selects a main menu item.

FIG. 23 is a flowchart depicting further details regarding the sequence of processing operations performed when a project coordinator accesses the system and selects a main menu item (300). As previously described, the project coordinator has the most comprehensive, widest range of access of any of the user's described in the illustrative embodiments of the present invention. The processing operations involving the coordinator are explained in detail herein. The processing operations performed by other system users will either involve a subset of the operations performed by the project coordinator or a variation of such processing operations.

After the user selects the main menu item, a check is made to determine whether the coordinator has selected the master bug log (302). If the coordinator has selected the master bug log, then a sequence of master bug log processing operations take place. Although not represented in the flowcharts, where there are a string of decision blocks in a flowchart such as in FIG. 23, after master bug log, or other menu (or function) processing has been completed, the routines described herein, sequence to the next shown decision block. For example, after the master bug log processing occurs, the routine shown in FIG. 23 continues to the next decision block 500.

Figure 24:
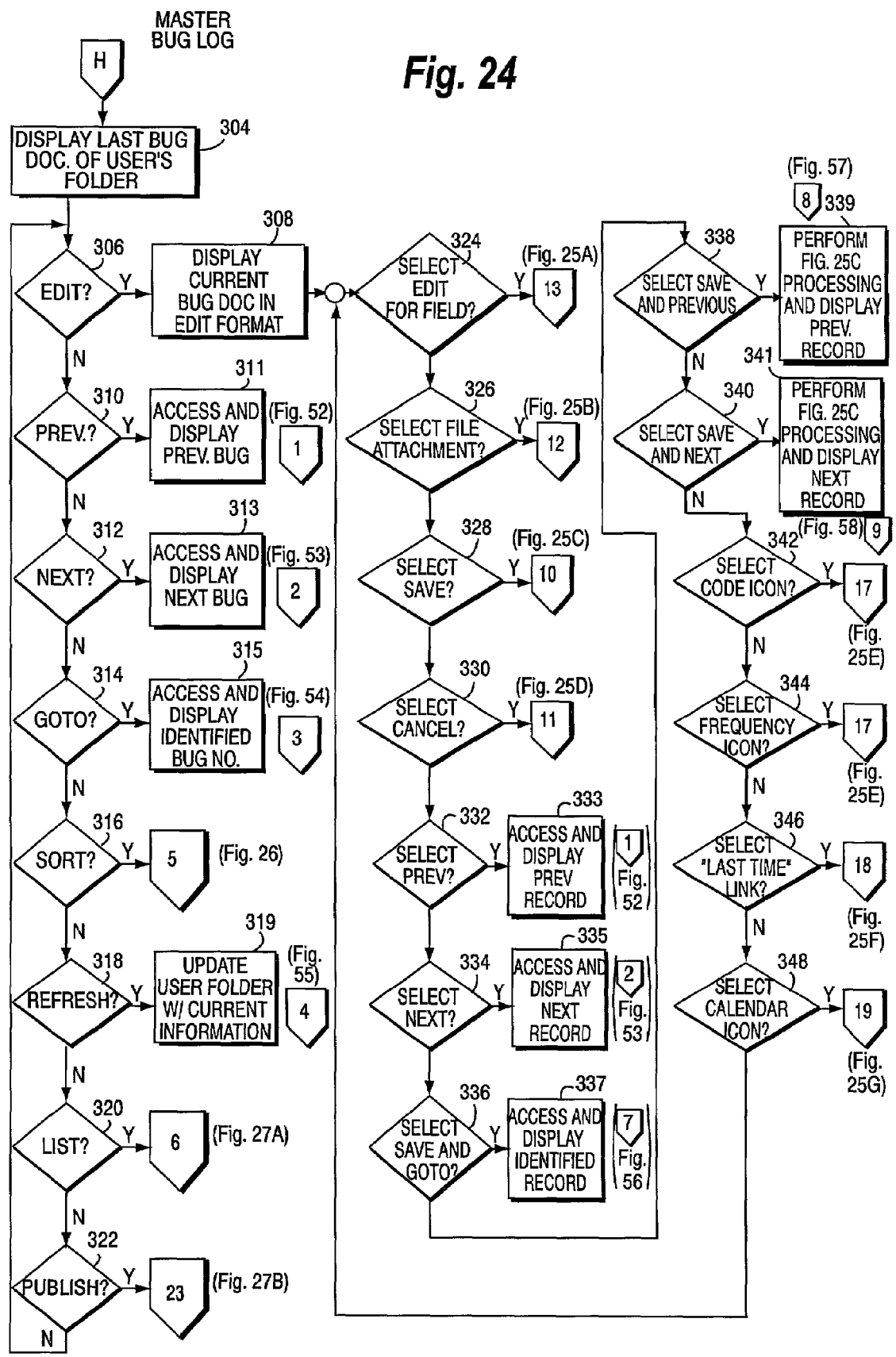
FIG. 24 depicts an illustrative sequence of operations performed during coordinator master bug log processing.

FIG. 24 depicts an illustrative sequence of operations performed during coordinator master bug log processing. As shown in FIG. 24, the system displays the latest bug document in the project coordinator folder (304). What follows is master bug log function processing which checks to determine whether a particular function has been selected by a coordinator, followed by the appropriate function processing. A check is made at block 306 to determine whether an "edit" function has been selected. If an "edit" function has been selected, then the current bug related document is displayed in edit mode (308). After displaying the current bug document in edit mode, a check is made to determine whether the coordinator selected "edit for a field" (324).

Figure 25A:
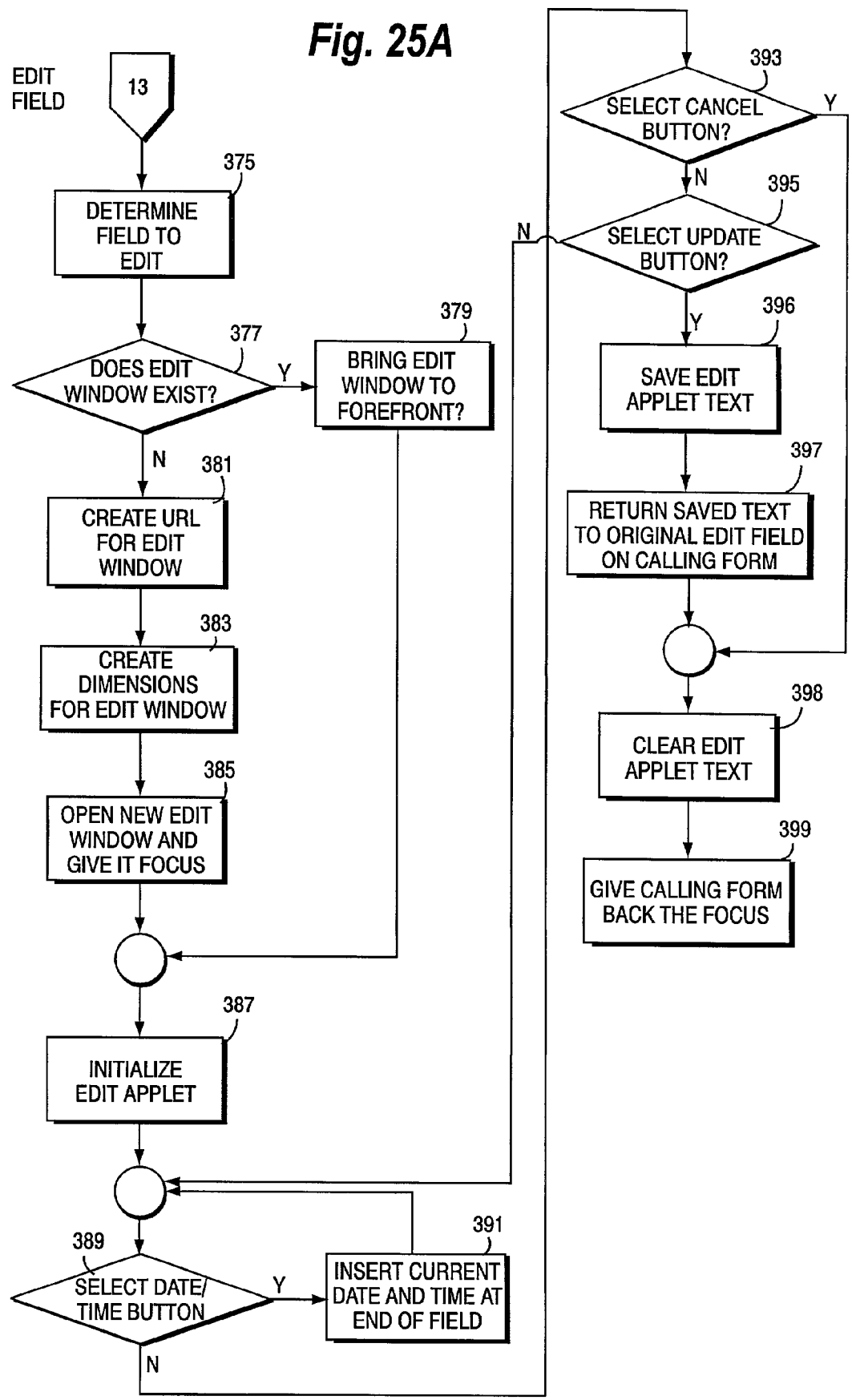
FIG. 25A is a flowchart of an illustrative sequence of processing operations involved in edit field processing.

FIGS. 25A-25G show various processing routines involved in edit processing. FIG. 25A, for example, shows the sequence of processing operations involved in edit field processing. Initially, it is determined which field is to be edited (375). A check is then made to determine whether an edit window presently exists (377). If an edit window does presently exist then, as indicated at block 379, the edit window is brought to the forefront so that the edit window may be viewed. After bringing the edit window into the viewing forefront, the routine branches to block 387.

If an edit window does not exist, then a URL is generated for the edit window (381). Thereafter, the physical dimensions of the edit window are created (383), and a new edit window is opened and brought into the viewing forefront (385).

After the processing at 385 or 379, an edit APPLET is initialized (387). An edit applet includes code sent by the server for controlling editing operations. After the editing applet has been initialized at 387, a check is made to determine whether the date/time button has been selected by the user (389). If so, then the current date and time is inserted (391) and the routine branches back to block 389.

If the check at block 389 indicates that the date/time button has not been selected, then the routine sequences to block 393 where a check is made to determine whether the cancel button has been selected. If the cancel button has been selected, the routine branches to block 398, where the edit applet text is cleared.

If the user did not select the cancel button, a check is made to determine whether the user selected the update button (395). If the "update" function had not been selected, the routine branches to block 389 to continue checking as to which "edit" function has been selected. If the update button had been selected by the project coordinator, as indicated at 395, then the text the coordinator entered is saved (396) and the saved text is returned to the calling form (397) (e.g., the master bug log). Thereafter, the edit applet text is cleared (398) and the routine displays the calling form (399).

Turning back to FIG. 24, if the edit for a field selection was not made at block 324, a check is made at block (326) to determine whether the coordinator has selected a file attachment function. If the coordinator has selected file attachment function, the routine branches to file attachment processing.

FIG. 25B illustrates the file attachment process. As indicated in FIG. 25B, the browser treats an indicated file link (to, for example, a video file depicting a screen display showing a bug) as a normal URL link. Using, for example, conventional browser technology, the browser displays the attached file (404).

If the check at block 326 indicates that the file attachment function has not been selected, then a check is made at block 328 to determine whether a "save" function has been selected.

FIG. 25C illustrates "save" function processing. A check is first made as indicated at block 410 if there is any edit routine. If there is an edit routine, as indicated at block 412, the edits are performed. A check is then made to determine whether the system 110 has passed the edit processing. If the system cannot perform the edit processing, then an error message is displayed (416). If the check at block 414 indicates that edit processing has been successfully performed, then the edited record is saved to a database (418), after which the edited record is displayed in a read format (420). If there is no edit routine as indicated at block 410, the record being operated by the coordinator is saved to the database (418) and displayed in read format (420).

If the check at block 328 in FIG. 24 indicates that a "select" function has not been selected, then a check is made to determine whether a "cancel" function has been selected. If the "cancel" function has been selected, then cancel processing is performed.

FIG. 25D illustrates the sequence of operations involved in cancel processing. As indicated in FIG. 25D, a check is initially made to confirm that the user wants to initiate a cancel operation (430). If the answer is NO, then the routine branches to the edit form and redisplays, for example, the master bug log screen display from which the "cancel" function was called. If it is confirmed that the user wishes to cancel, as indicated at block 434, the system determines the return URL and the browser generates a display based upon the return URL (436).

If the check at block 330 indicates that a "cancel" function was not selected, a check is made to determine whether the "previous" function has been selected. If the "previous" function has been selected, then the system accesses and displays the previous record (333).

If the previous has not been selected, then a check is made to determine whether the "next" function has been selected (343). If the "next" function has been selected, then the next record is accessed and displayed (335). If the check at block 334 indicates that the "next" function has not been selected, a check is made at block 336 to determine whether the "save and go to" function has been selected.

If the "save and go to" function has been selected, then the system accesses, saves and displays an identified record, for example, based upon an entered bug number. If the check at block 336 indicates that a "save and go to" function has not been selected, then a check at block 338 is made to determine whether a "save and previous" function has been selected. If so, then, as indicated in block 339, the save processing previously explained in conjunction with FIG. 25C is performed and the previous record is displayed, resulting in a combined "save" function and "previous" function.

If the check at block 338 indicates that a "save and previous" function has not been selected, then a check is made at block 340 to determine whether a "save and next" function has been selected. If so, as indicated at block 341, the FIG. 25C save processing is performed and the next record is displayed. If the check at block 340 is negative, then a check is made to determine whether the code icon has been selected (342). If so, the routine branches to perform processing operations as set forth in FIG. 25E.

FIG. 25E illustrates the sequence of operations performed whether the "code" icon or the "frequency" icon has been selected. Either selection results in building a pull-down menu from which various choices are selected by a user. Initially, the routine determines the field to update (e.g., the code icon field or the frequency icon field). Thereafter, a URL is created for the "choices" window (452). The dimensions are created for the "choices" window (454) and the window is opened (456). Thereafter, the choices are read from the calling form (458) and the choices are read into a list box. After the choices are read into the list box, the routine sequences to block 462 which determines if the OK button has been selected by a user. If so, the choice is returned to the appropriate field in the calling form (464) and the choices window is closed (466).

If the check at block 462 indicates that the OK button was not selected, a check is made at block 468 to determine whether the user has selected the "cancel" function. If the "cancel" function has not been selected, then the routine branches back to block 462. If the cancel button has been selected, then the "choices" window is closed (466).

Turning back to FIG. 24, if the code icon was not selected, then a check is made at block 344 to determine whether the frequency icon has been selected. If so, the identical processing described above in FIG. 25E takes place.

If the check at block 344 indicates that the frequency icon was not selected, then a check is made at block 346 to determine whether the "last time" link has been selected. If the "last time" link has been selected, then the routine branches to the routine shown in FIG. 25F.

FIG. 25F illustrates the sequence of operations performed in the "last time" routine. As shown in FIG. 25F, initially the last tape number is determined (475). Thereafter, the last end of tape time is determined (477). The last tape number and last end of tape time are then loaded in the tapes fields in the master bug form, as previously referenced in conjunction with FIG. 5.

Turning back to FIG. 24, if the check at block 346 indicates that the "last time" function was not selected, then a check is made to determine whether the calendar icon has been selected. If the calendar icon has been selected, then the routine branches to FIG. 25G.

FIG. 25G illustrates the sequence of operations in the exemplary calendar processing routine. Initially, the date field is determined on the calling form (480). The calendar form is opened (482). The date is set on the calendar form. Thereafter, the selected date is returned to the calling form (486).

Turning back to FIG. 24, if the select calendar icon was not selected at block 348, then the processing branches back to block 324.

Now that the explanation of the "edit" processing has been completed, presume that the check at block 306 indicates that the "edit" function had not been selected. A check is then made at block 310 to indicate whether the "previous" function has been selected. If the "previous" function has been selected, then the system accesses and displays the previous bug from the master bug log (311).

If the check at block 310 indicates that the "previous" function had not been selected, then a check is made at 312 to determine whether the "next" function has been selected. If the "next" function has been selected, then the system accesses and displays the next bug information on the master bug log for the next bug number.

If the check at block 312 indicates that the "next" function was not selected, a check is made to determine whether the "go to" function has been selected (314). If the "go to" function has been selected, then the system access and displays the identified bug number to which the coordinator requested to go (315).

If the check at block 314 indicates that a "go to" function was not selected, then a check is made at block 316 to determine whether a "sort" function has been entered. If a "sort" function has been entered, then the sort processing set forth in FIG. 26 is performed.

Figure 26:
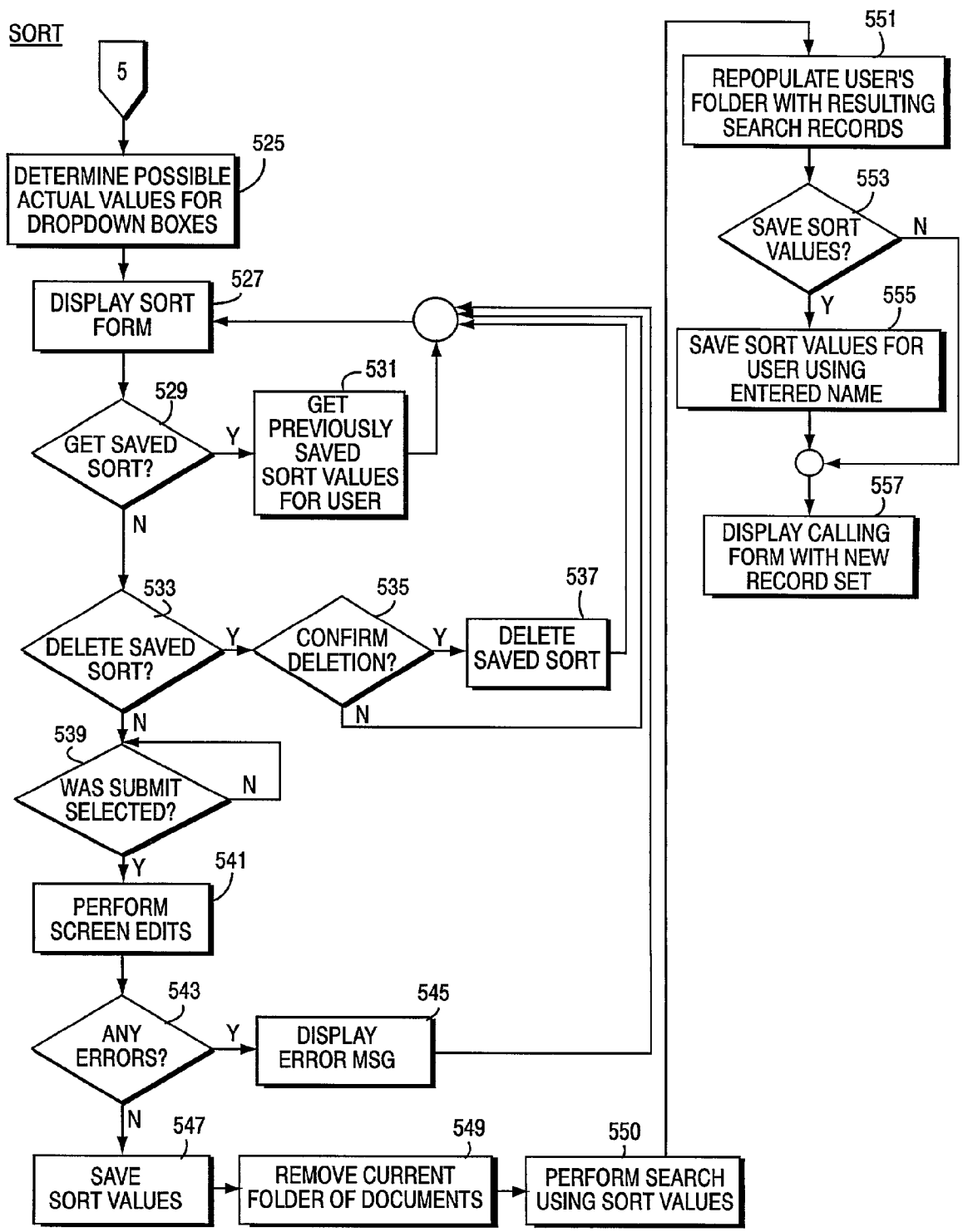
FIG. 26 is an illustrative flowchart indicating the sequence of operations performed during sort function processing.

FIG. 26 is a flow diagram indicating the sequence of operations performed during sort operation processing. As shown in FIG. 26, initially all the possible actual values for the drop down menu are determined (525). Thereafter, the sort form is displayed with the appropriate drop down box values (527). A check is then made at block 529 to determine whether the user has requested a saved sort. If so, previously saved sort values are retrieved for the user (531) and the routine branches back to block 527 to display the sort form with the retrieved values.

If a check at block 529 indicates that saved sort values were not requested, a check is made to determine whether the user selected deleting the saved sort values. If so, then a check is made to confirm the user's desire to delete such values (535). If the user confirms the "deletion" operation, the saved sort is deleted (537) and the routine branches back to block 527. If the check at block 535 indicates that the user did not confirm deletion of the saved sort, then the routine branches back to display the sort form.

If the check at block 533 indicates that the user did not select deleting the saved sort, then a check is made to determine whether the "submit" function was selected (539). If the "submit" function was not selected by a user, then the routine branches back to block 539 to continually check to see whether the submit function had been entered by the user.

Upon entry of the "submit" function by the user, the routine performs the screen edits entered by the user (541). A check is then made at block 543 to see if any errors occurred in the screen edits. If so, an error message is displayed (545) and the routine branches back to block 527. If no errors were detected, then the sort values are saved (547) and the documents are removed out of the user's current folder of documents (549).

A search is then performed using the sort values selected by the user (550). After determining the matches for the sort values in the search performed at block 550, the user's folder is repopulated with the resulting search records in the order determined by the sort criteria (551). Thereafter, a check is made to determine whether the user had selected to save the sort values (553). If the user elected not to save the sort values, the calling form is displayed with a new record set (557). If the user elected to save the sort values, then the sort values are saved for the user using the user's entered name (555) and the routine thereafter displays the calling form with the new record set (557).

Turning back to FIG. 24, if the check at block 316 indicates that a "sort" function was not entered, then a check is made to determine whether a "refresh" function has been initiated. If a refresh operation has been entered then, as indicated at block 319, the user's folder is updated with current information. This is accomplished by removing outdated documents from the user's folder to determine appropriate current user information and the user's folder is repopulated with current documents. Based upon the user's ID and password, the system is able to determine what documents the user is able to access, these documents are then accessed and used to repopulate the folder with current documents.

If the check at block 318 indicates that the refresh function was not selected, then a check is made at block 320 to determine whether a list function has been selected.

Figure 27A:
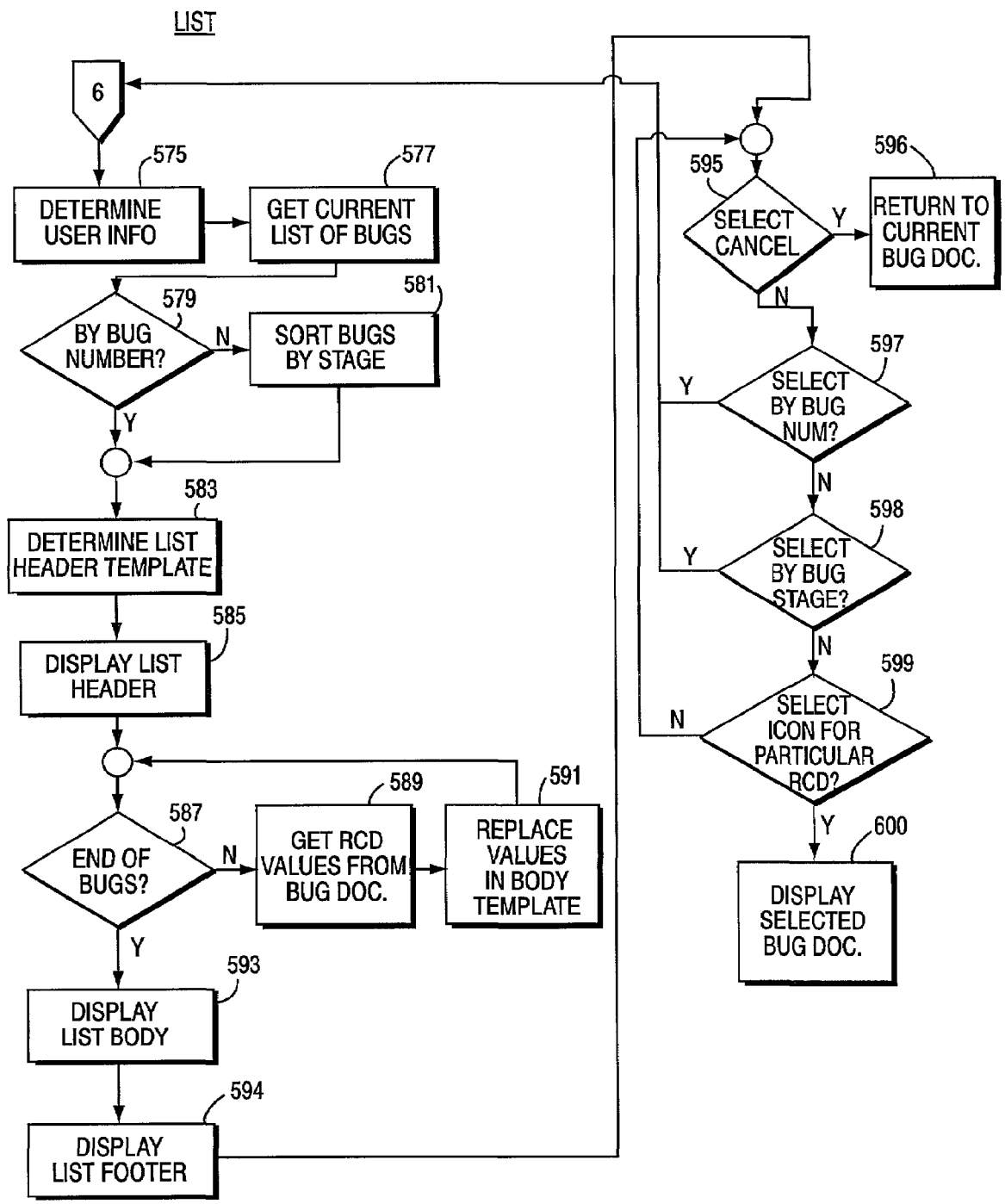
FIG. 27A is a flowchart illustrating the sequence of operations performed during list processing.

If a list function is selected, then master bug log list function processing is initiated. FIG. 27A is a flowchart indicating the sequence of operations performed during list processing. Initially, user information is analyzed to determine the user identity (575). Thereafter, the current list of bugs is accessed (575). A check is then made to determine whether the list should be sorted by bug number (579), which is the default selection. If sorting is not to be by bug number, then the bugs are sorted by stage (581).

If sorting is take place by bug number or after the sort by stage, the list's header template is determined (583). The list is defined by a header, a body and a footer. Thereafter, the header is displayed (585). A check is then made at block 587 to determine whether the entire list of bugs has been sequenced through. If not, then the record values from the bug document are retrieved (589), the retrieved values are placed in the body template for the list, and the routine branches back to block 587 to determine whether the end of bugs has been reached. Thereafter, the list body is displayed (593). After the list body is displayed, the list footer is displayed (594).

After the list of bugs is displayed, the user has the option of selecting a cancel function (595). If the cancel function is selected, then the user returns to the current bug document, which displays the bug as it was previously shown in the edit mode. If the cancel function has not been selected, then a check is made at block 597 to determine whether the user has selected a list by bug number. If no, a check is made at block 598 to determine whether the user has selected a list by bug stage (598). If the user has selected either a list by bug number of by bug stage, then the routine branches back to block 575 to sequence through the list loop.

If the check at block 598 indicates that the user did not select a list by bug stage, then a check is made to determine whether the user selected an icon for a particular record (599). If so, the selected record is displayed (600). If the check at block 599 indicates that an icon for a particular record has not been selected, then the routine branches to block 595 to determine whether the cancel function has been selected.

Figure 27B:
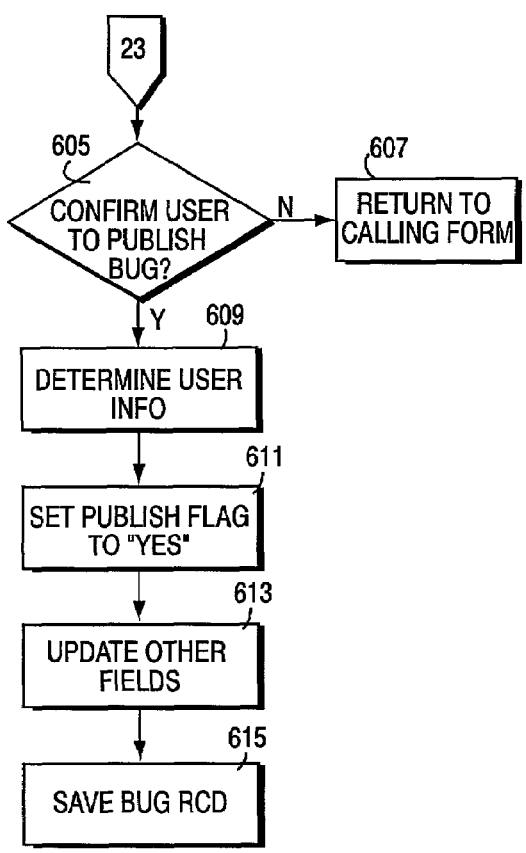
FIG. 27B is a flowchart illustrating the sequence of operations performed when a publish function is selected.

Turning back to FIG. 24, if the user did not select a list function at block 320, then a check is made to determine whether the "publish" function has been selected as indicated at block 322. FIG. 27B is a flowchart indicating the sequence of operations performed when a publish function is selected. Initially, as indicated at block 605, a check is made to determine whether a user wants to publish a bug. If the user does not confirm election to publish the bug, then the routine returns to the calling form (607). If the user does confirm a desire to publish the bug, then the user information is determined to confirm publishing authority (609) and a publish flag is turned on (or set to a "1" or "YES" state) (611). After setting the publish flag, other fields are updated (613) and a published bug record is saved with the updated information (618).

After performing the publish function or if the check at block 322 has indicated that the publish function was not selected, then the routine branches to block 306 to determine whether the edit function has been selected.

Turning back to FIG. 23, if the check at block 302 indicates that the coordinator did not select the master bug log, then a check is made to determine whether the coordinator selected the bug queue (500).

Figure 28:
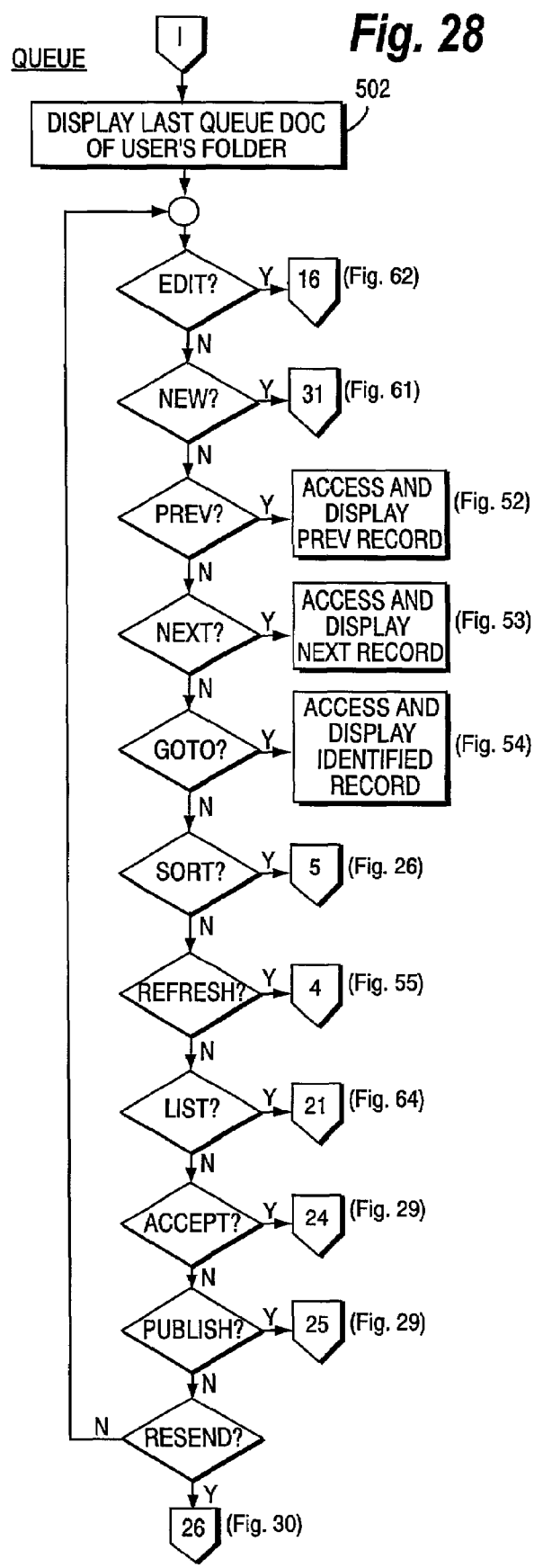
FIG. 28 is a flowchart delineating an illustrative sequence of operations performed when a coordinator accesses the bug queue.

FIG. 28 is a flowchart delineating the sequence of operations when a coordinator accesses the bug queue. As shown in FIG. 28, initially, the last queue document in the user's folder is displayed (502). Thereafter, as indicated in FIG. 28, the routine sequences through the indicated decision blocks to check to determine which function options the coordinator has selected. For most of the decision blocks, a description of the same or similar functions have been previously described in conjunction with the master bug log and will not be repeated. Reference may be made to the referenced figure for a flowchart relating to each function.

Figure 29:
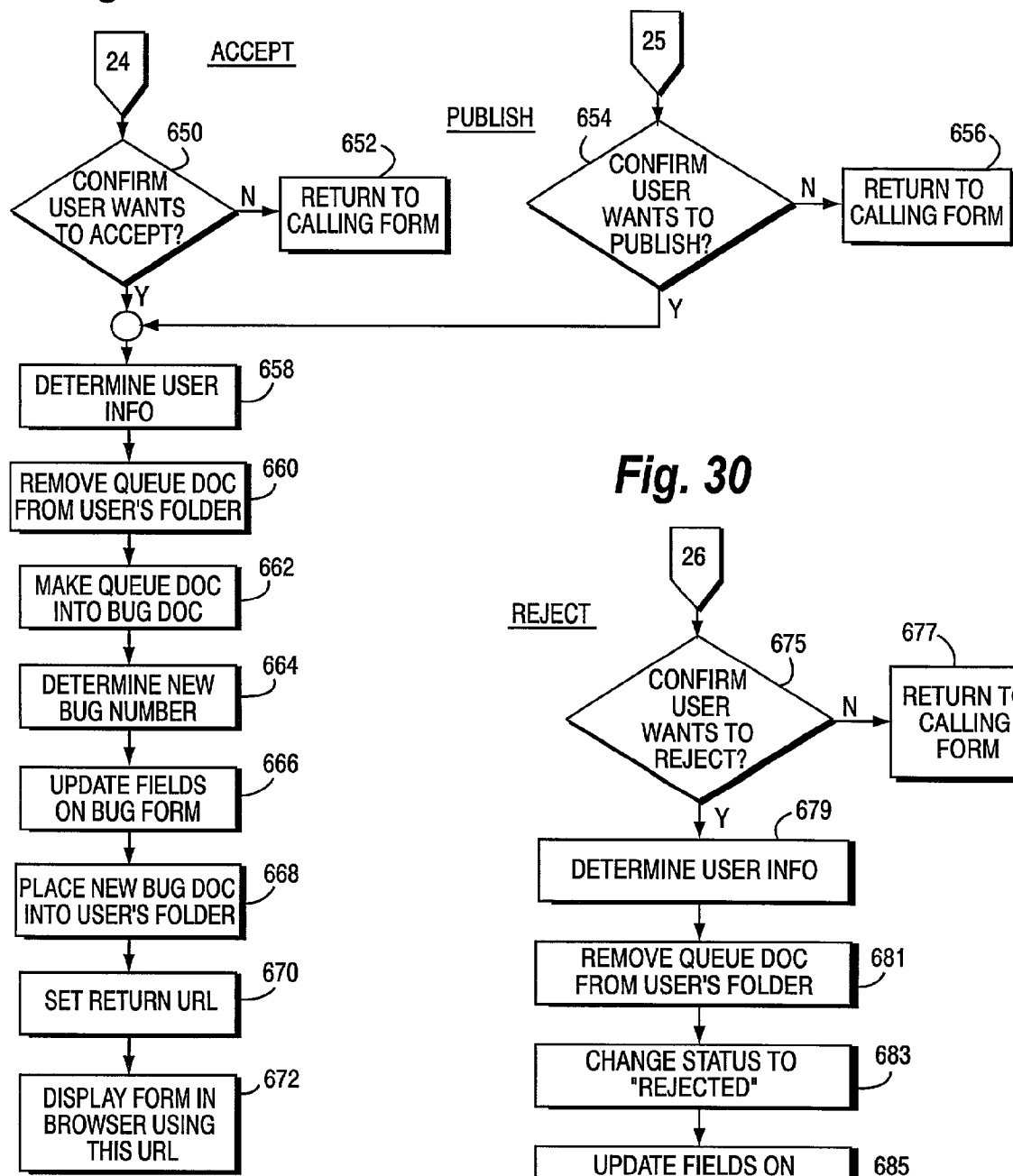
FIG. 29 is a flowchart of an illustrative sequence of operations performed in conjunction with the publish and accept function shown in FIG. 28.

FIG. 29 delineates the sequence of operations performed in conjunction with the publish and accept functions shown in FIG. 28. With respect to the accept and publish functions shown in FIG. 29, a project coordinator is accepting bugs to be transferred from the bug queue to the master bug log and/or authorizing publication of the bug.

With respect to accept processing, a check is made at block 650 to confirm that a user wants to accept, if not, the routine returns to the calling form (652). If the user confirms wanting to accept the bug, the user information is determined (658). The queue document is removed from the user's folder (660) and the queue document is converted into a master bug log document (662). Thereafter, a new bug number is assigned (664). Fields are then updated and the new bug document is placed into the user's folder (668). Thereafter, a return URL is set (670) and the form is displayed in the browser using the URL (672).

With respect to "publish" processing, the routine is the same except a user is asked to confirm whether publishing is to be chosen (654). If so, the routine branches to block 658 for entry into the previously described processing steps 658 to 672. If not, return is made to the calling form (656).

Figure 30:
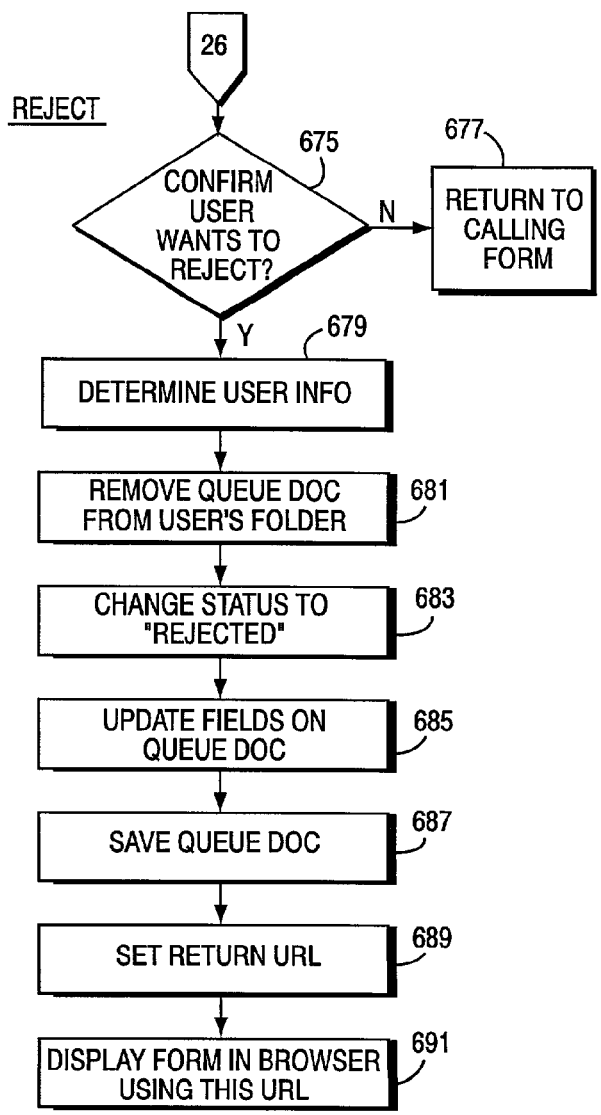
FIG. 30 is a flowchart of illustrative reject function processing, which is executed if the "reject" function is selected by a coordinator in the FIG. 28 queue menu processing.

FIG. 30 shows the reject processing, which is executed if the "reject" function is selected by a coordinator in the FIG. 28 queue menu processing. Initially, a check is made to determine whether the user wants to reject a bug (675). If no, the routine returns to the calling form (677). If yes, then the user information is determined (679) and the queue document is removed from the user's folder (681). The status of the bug is then changed to "rejected" (683). Fields in the queue document are then updated (685) and the queue document is saved (687). Thereafter, the return URL is set (689) and the form is displayed in the browser using the return URL (691).

Turning back to FIG. 23, if a coordinator did not select the queue menu, a check is made to determine whether the project menu has been selected (700). If the project menu was selected, project processing is initiated.

Figure 31:
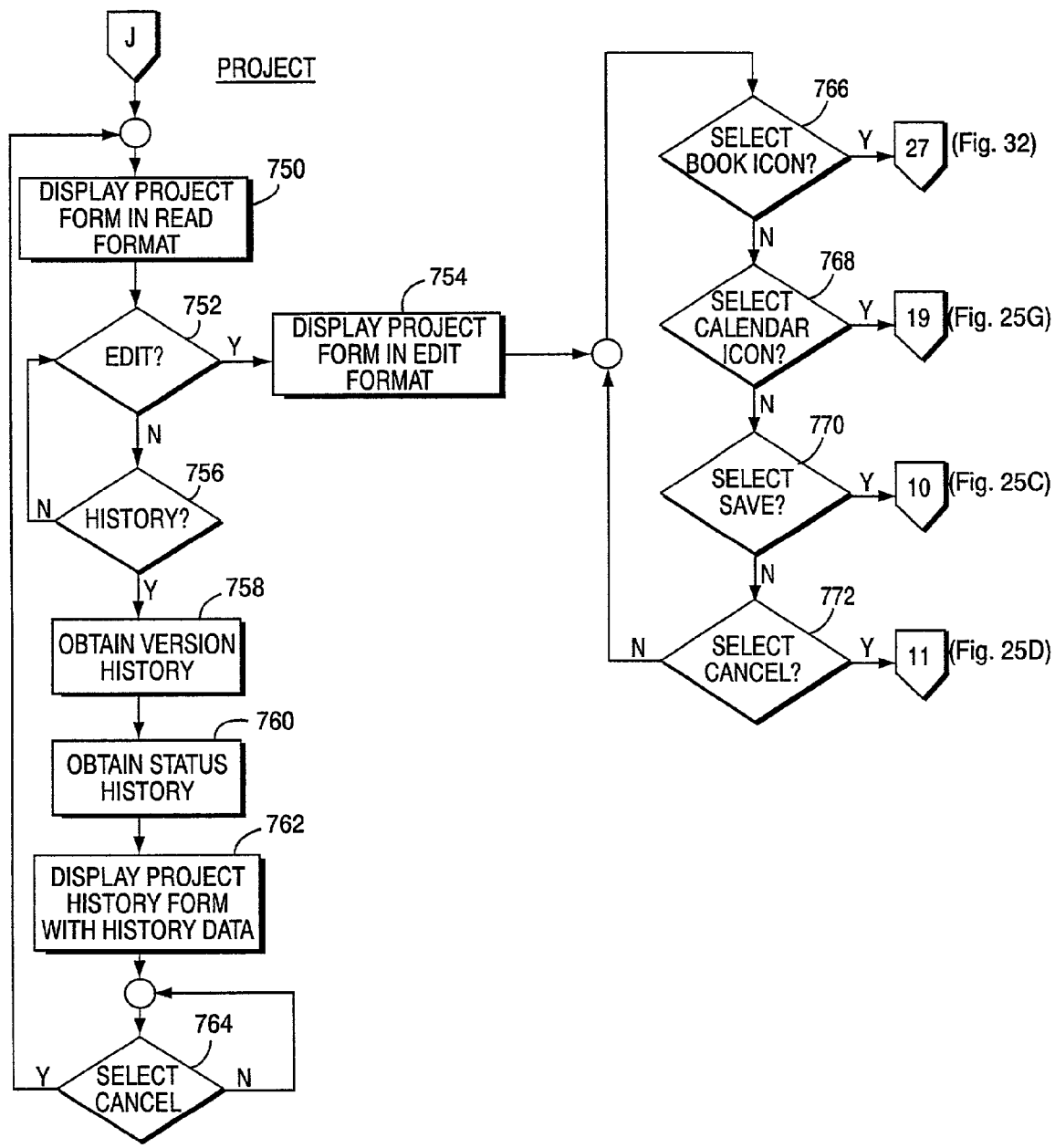
FIG. 31 is a flowchart illustrating the sequence of operations performed if the project menu is selected by a coordinator.

FIG. 31 is a flowchart indicating the sequence of operations performed if the project menu is selected by a coordinator. Initially, a project form is displayed in read format (750). A check is then made to determine whether an edit function has been selected (752). If so, the project is displayed in edit format and the functions indicated by decision blocks 766, 768, 770 and 772 are selectable by a user.

Figure 32:
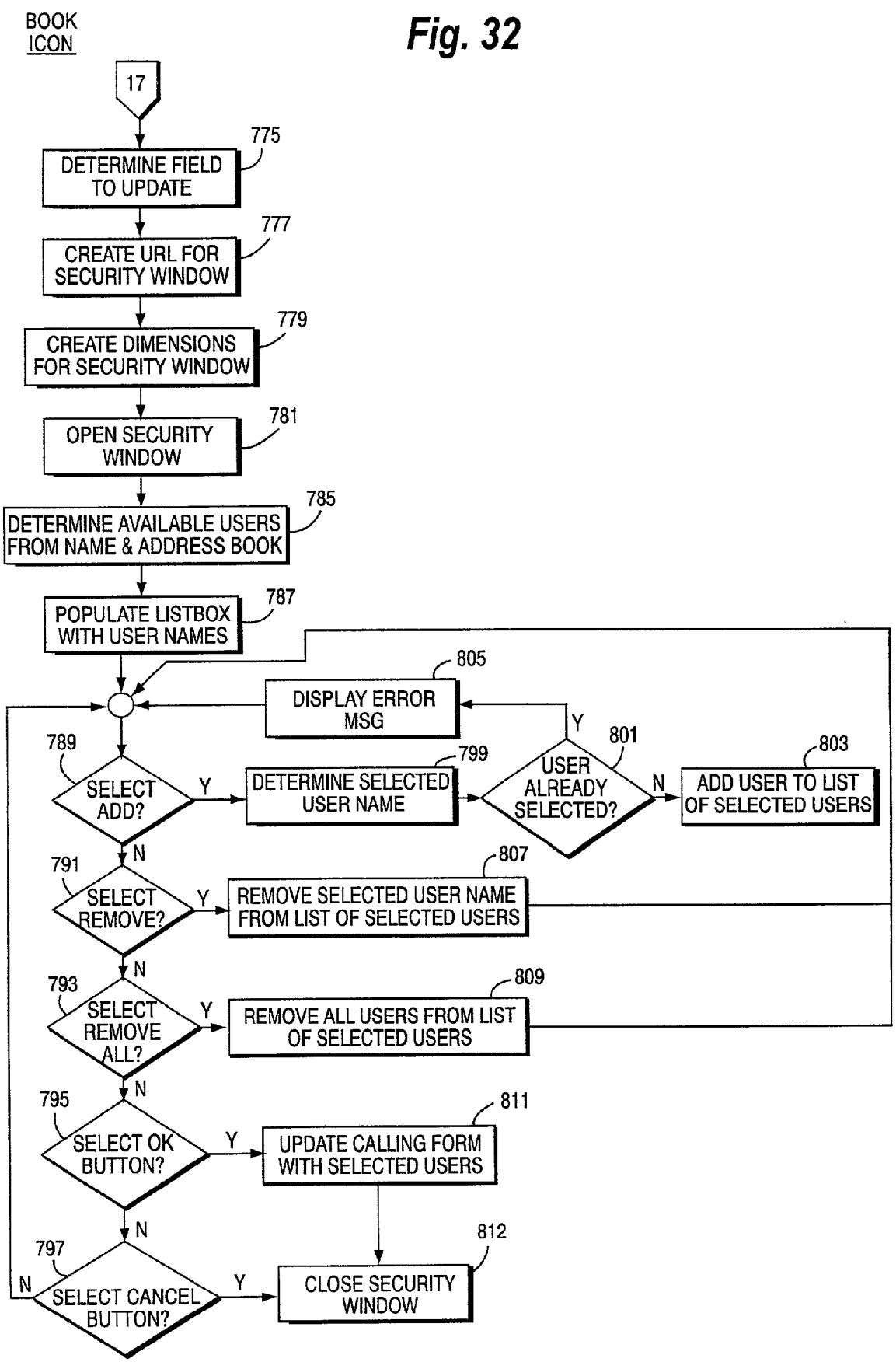
FIG. 32 is a flowchart of an illustrative sequence of processing operations performed when a user selects the security related book icon.

If the "book" icon is selected in decision block 776, book icon, security related processing is performed which is illustrated in FIG. 32. FIG. 32 delineates the sequence of processing operations performed when a user selects the security related book icon processing. Initially, the field to update is determined (775). Thereafter, a URL is created for a security window (777). The dimensions of the security window are then created (779) and the security window is opened (781). Thereafter, authorized available users are determined from a name and address book (785). Once the available users have been determined, a list box is populated with user names (787). A check is made to determine whether, for example, a project coordinator has selected the add function (789). If so, the selected user name is determined (799) and a check is made at block 801 to determine whether the user was already selected. If so, an error message is displayed and the routine branches back to block 789. If the user hadn't already been selected then the user is added to the list of selected users (803).

If the check at block 789 indicates that the "add" function was not selected, then a check is made at block 791 to determine whether a "remove" function has been selected. If Yes, then the selected user name is removed from the list of selected users (807) and the routine branches back to block 789. If the remove function was not selected, then a check is made to determine whether a selection of removing all the users has been made (793). If so, all users are removed from the list of selected users (809) and the routine branches back to block 789. If not, a check is made to determine whether the OK button has been selected (795). If so, then the calling form is updated with the selected users, which serves to provide a listing of authorized coordinators, developers, testers, etc. The security window is then closed (812). If the check at block 795 indicates that the OK button was not selected, then a check is made at block 797 to determine whether a cancel button has been selected. If so, the routine closes the security window (812). If not, the routine branches back to block 789.

Turning back to the project form processing of FIG. 31, if the edit function was not selected, as indicated by the check at 752, then a check is made to determine whether the "history" function has been selected (756). If so, the version history is obtained (758), the status history is obtained (760), and the project history form with the history data is displayed (762). A check is then made at block 764 to determine whether the cancel function has been selected. If not, the routine continues to check whether the cancel function has been selected. If the cancel function has been selected, then the routine branches back to block 750.

Turning back to the coordinator processing in FIG. 23, if the project menu is not selected at block 700, then a check is made to determine whether the comments menu has been selected (702). If the comments menu has been selected then the routine performs comments processing.

Figure 33:
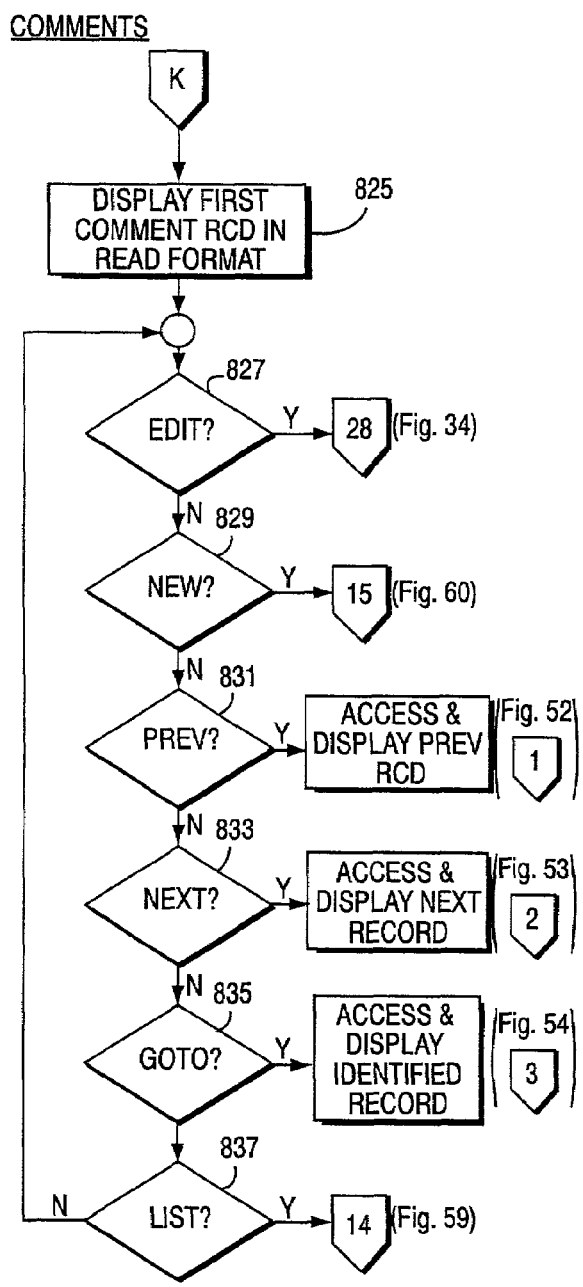
FIG. 33 is a flowchart of an illustrative sequence of operations involved in comments menu processing.

FIG. 33 shows the sequence of operations involved in comments processing. After displaying the first comments record (827), a check is made at block 827 to determine whether an edit function has been selected. If an edit function has been selected, then edit processing is performed.

Figure 34:
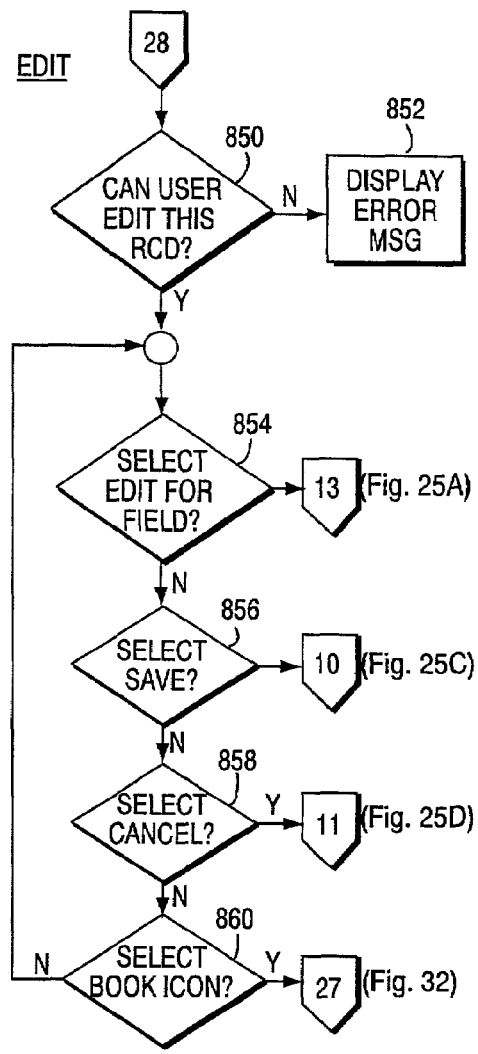
FIG. 34 is a flowchart of an illustrative sequence of operations involved in edit processing in the comments menu.

FIG. 34 shows the sequence of operations involved in edit processing in the comments menu. Initially, a check is made at block 850 to determine whether the user can edit this record. If not, an error message is displayed (852). If so, decision blocks 854, 856, 858 and 860 determine whether a particular editing function has been selected and then initiate the appropriate editing processing operations of the type previously described.

Turning back to FIG. 33, if the editing function was not selected, then checks are made at blocks 829, 831, 833, 835 and 837 to determine which functions have been selected and to perform respective appropriate processing operations along the lines of previous descriptions for such functions.

Turning back to FIG. 23, if the comments menu is not selected, as indicated by the decision block 702, then a check is made to determine whether the test plan menu has been selected (704). If the test plan menu was selected, then test plan processing occurs.

Figure 35:
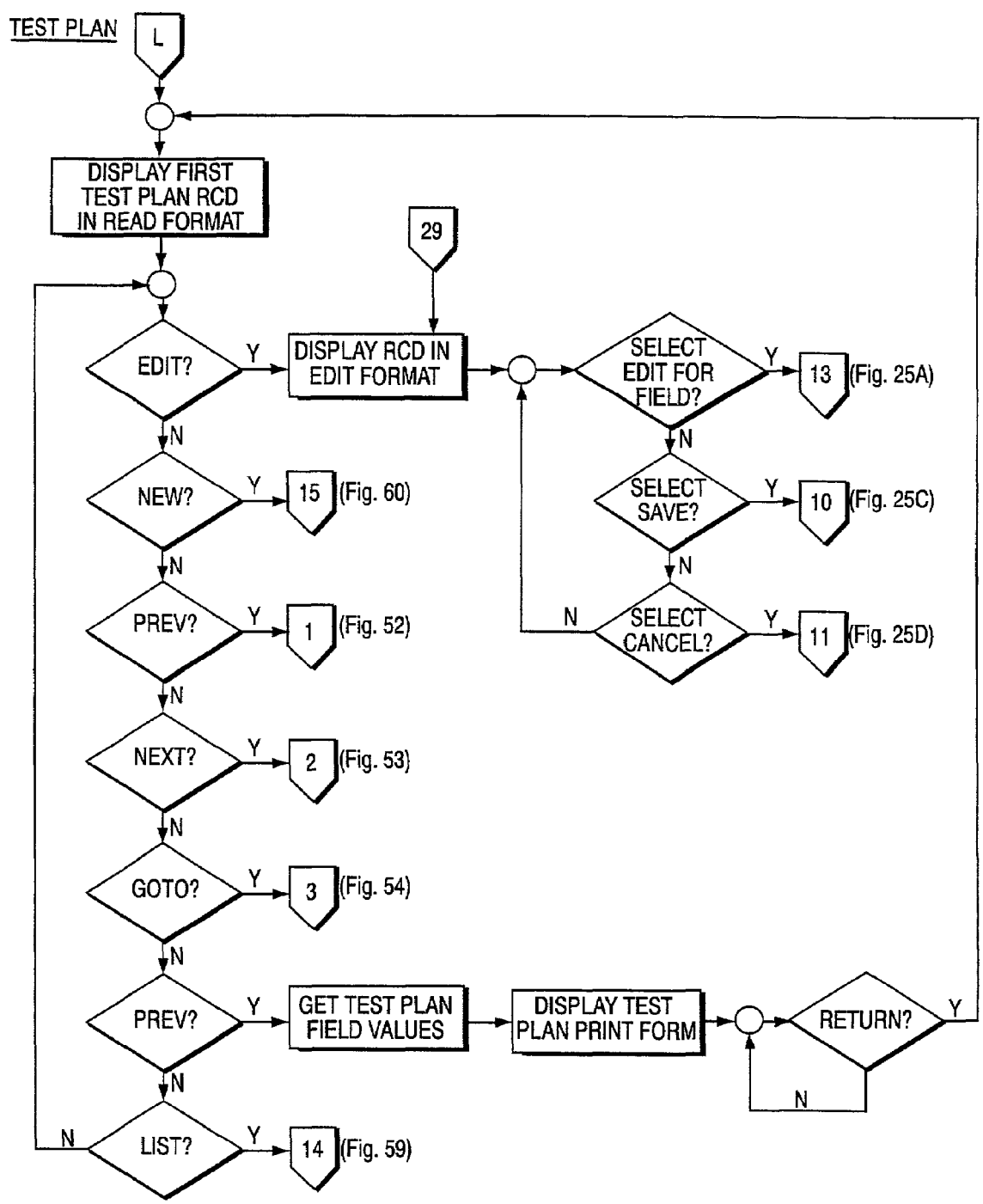
FIG. 35 is a flowchart of an illustrative sequence of operations performed during test plan processing.

FIG. 35 shows the sequence of operations performed during test plan processing. In light of the previous explanation, the test plan processing flowchart is self-explanatory and requires no further explanation.

If the check at block 704 indicates that the test plan menu was not selected, then a check is made to determine whether the developer news menu has been selected (706). If the developer news menu has been selected, then developer news processing is initiated.

FIG. 36 shows the sequence of operations involved in developer news processing. In developer news processing, the first developer news record is displayed in read format. Thereafter, a series of decision blocks are checked to determine whether one of the previously described identified functions has been selected. Upon determining that an identified function has been selected, processing occurs in accordance with the flowcharts referenced in FIG. 36.

Turning back to FIG. 23, if the check at block 706 indicates that a developer news menu has not been selected, then a check is made at block 708 to determine whether a tester broadcast menu has been selected. If the tester broadcast menu has been selected, then tester broadcasting is initiated.

FIG. 37 shows the sequence of operations involved in tester broadcast processing. As shown in FIG. 37, initially the tester broadcast form is displayed in read format (875). A check is then made to determine whether an edit function has been selected at block 877. If an edit function has been selected, then a record is displayed in edit format (879). If the edit function had not been selected, then the routine waits until the edit function has been selected. After displaying the record in edit format, a check is made to determine whether a save function has been selected at block 881. If so, save processing is performed. If not, a check is made to determine whether a cancel function has been selected (883). If so, cancel function processing is performed. If not, the routine branches back to block 881.

Turning back to FIG. 23, if the tester broadcasting menu was not selected, a check is made at block 710 to determine whether the project summary menu had been selected. If so, project summary processing is performed as shown in FIG. 38. As indicated in FIG. 38, project information is determined (885). Thereafter, the project summary is determined by status (887) and the results are displayed as shown in FIG. 15 (889).

Turning back to FIG. 23, if the check at block 710 indicates that a project summary menu was not selected, then a check is made to determine whether a coordinator news menu had been selected (712). If the coordinator news menu had been selected, then coordinator news processing is performed.

Figure 39:
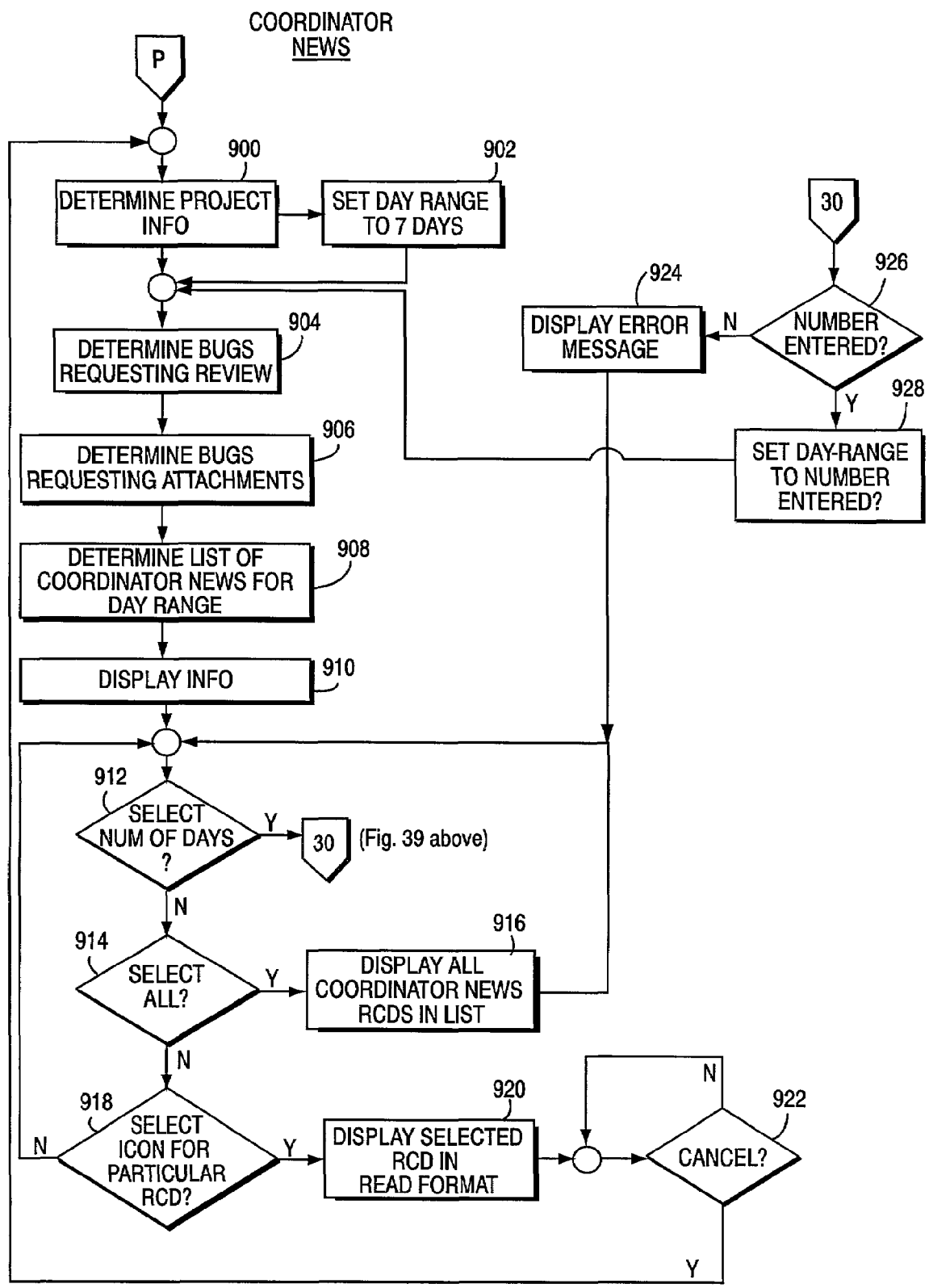
FIG. 39 is a flowchart of an illustrative sequence of operations involved in coordinator news processing.

FIG. 39 illustrates the sequence of operations involved in coordinator news processing. In coordinator news processing, project information is determined (900). Thereafter, by default, the data range is set to 7 days (902). Bugs requesting review are then determined (904). Thereafter, the bugs having associated requests for file attachments are determined (906). Thereafter, a list of coordinator news for the specified date range is determined (which, by default, is 7 days) (908). The information determined in blocks 904, 906, 908 is displayed.

A check is then made to determine whether the user has entered a number of days for display of news (912). If so, then a check is made to determine whether a number has been entered (926). If so, then the date range is set to the number entered (928). If no number has been entered, then an error message is displayed (924) and the routine branches to block 912.

If the number of days has not been selected as indicated by the check at 912, then a check at block 914 is made to determine whether the select all function has been selected. If so, all coordinator news in the list is displayed (916) and the routine branches back to block 912. If the all news function is not selected at block 914, then a check is made as to whether an icon for a particular record has been selected (918). If an icon for a particular record has been selected, then the selected record is displayed in read format (920). A check is then made to determine whether a cancel function has been selected (922). If not, then the routine continues to check to determine whether the cancel function has been selected. If the cancel function has been selected, then the routine branches back to block 900 to repeat the coordinator news processing.

Turning back to FIG. 23, if the coordinator news menu is not selected based on the block 712 check, then a check is made to determine whether the rejected queue menu is selected (714). If the rejected queue processing has been selected, then rejected queue processing occurs.

Figure 40:
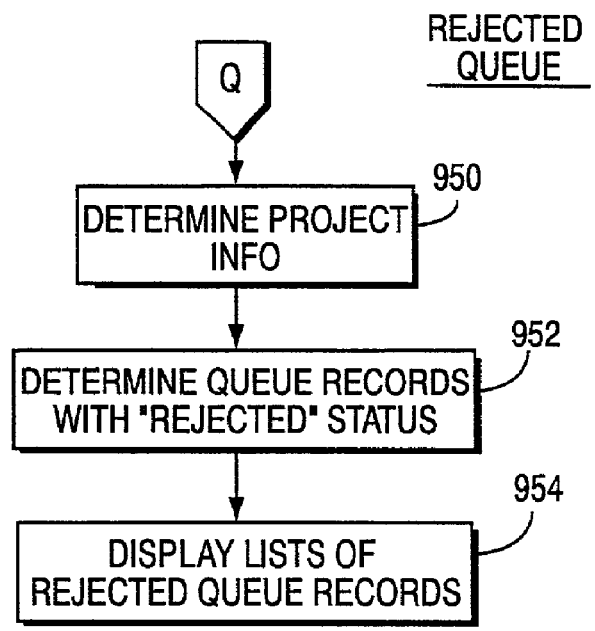
FIG. 40 is a flowchart of an illustrative sequence of operations involved in rejected queue processing.

FIG. 40 illustrates the sequence of operations involved in rejected queue processing. Initially, project information is determined to identify the project being worked on (e.g., Mario Speedway) (950). Thereafter, queue records are monitored to determine which records have rejected status (952) and the rejected queue records are displayed (954).

Turning back to FIG. 23, a check is then made to determine whether the quality control procedures menu has been selected (716). If so, then the quality control procedure file is displayed in a new browser window (718). If the quality control procedures menu has not been selected, as indicated by the check at block 716, then a check is made at 720 to determine whether the help menu has been selected. If the help menu has been selected, then the help file is displayed in a new browser window (722).

If the block at 720 indicates that the help menu was not selected, then a check is made to determine whether an archived projects menu has been selected (724). If so, then archived project processing is initiated.

Figure 41:
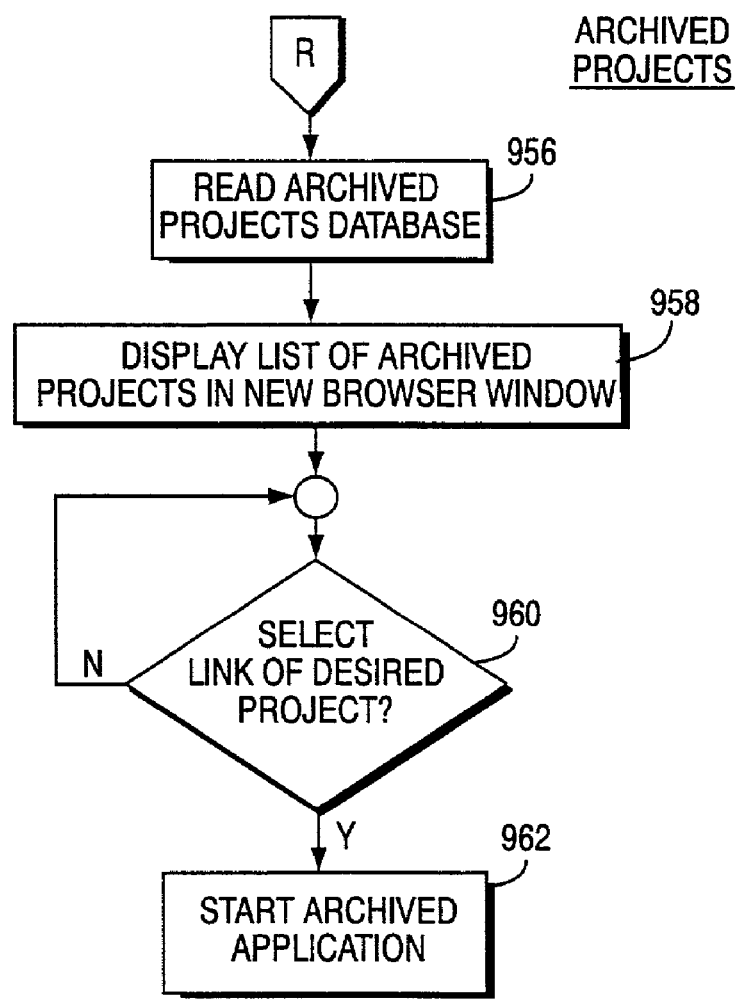
FIG. 41 is a flowchart of an illustrative sequence of operations involved in archived project processing.

FIG. 41 delineates an illustrative sequence of operations involved in archived project processing. Initially, an archived project database is read (956) and a list of archived projects is displayed in a new browser window (958). Each of the archived projects are displayed as a link and check is made to determine whether a user has selected a particular link for a desired project (960). If not, the routine continues to check for such a selection. Once an archived project has been selected, then an archived application is initiated to start the bug tracking processing over for the archived application (962).

If the check at block 724 in FIG. 23 indicates that the archived projects menu has not been selected, then the application home page is displayed (726).

The illustrative project coordinator processing described in conjunction with FIG. 23 through FIG. 41 reflects the most comprehensive use of the exemplary bug tracking system processing operations for any of the authorized users as previously described. The processing operations involved for a tester, developer, corporate contact and translator are similar in many respects to the project coordinator, but typically include far less access to system functionality.

The flowcharts shown in FIGS. 42 through 65 illustrate the processing operations involved for the remaining authorized users in accordance with exemplary embodiments of the present invention. In light of the above detailed description of coordinator processing and the description of many associated menu functions, the remaining flowcharts in FIGS. 42 through 65 are believed to be self-explanatory, and will not be described in detail.

Figure 42:
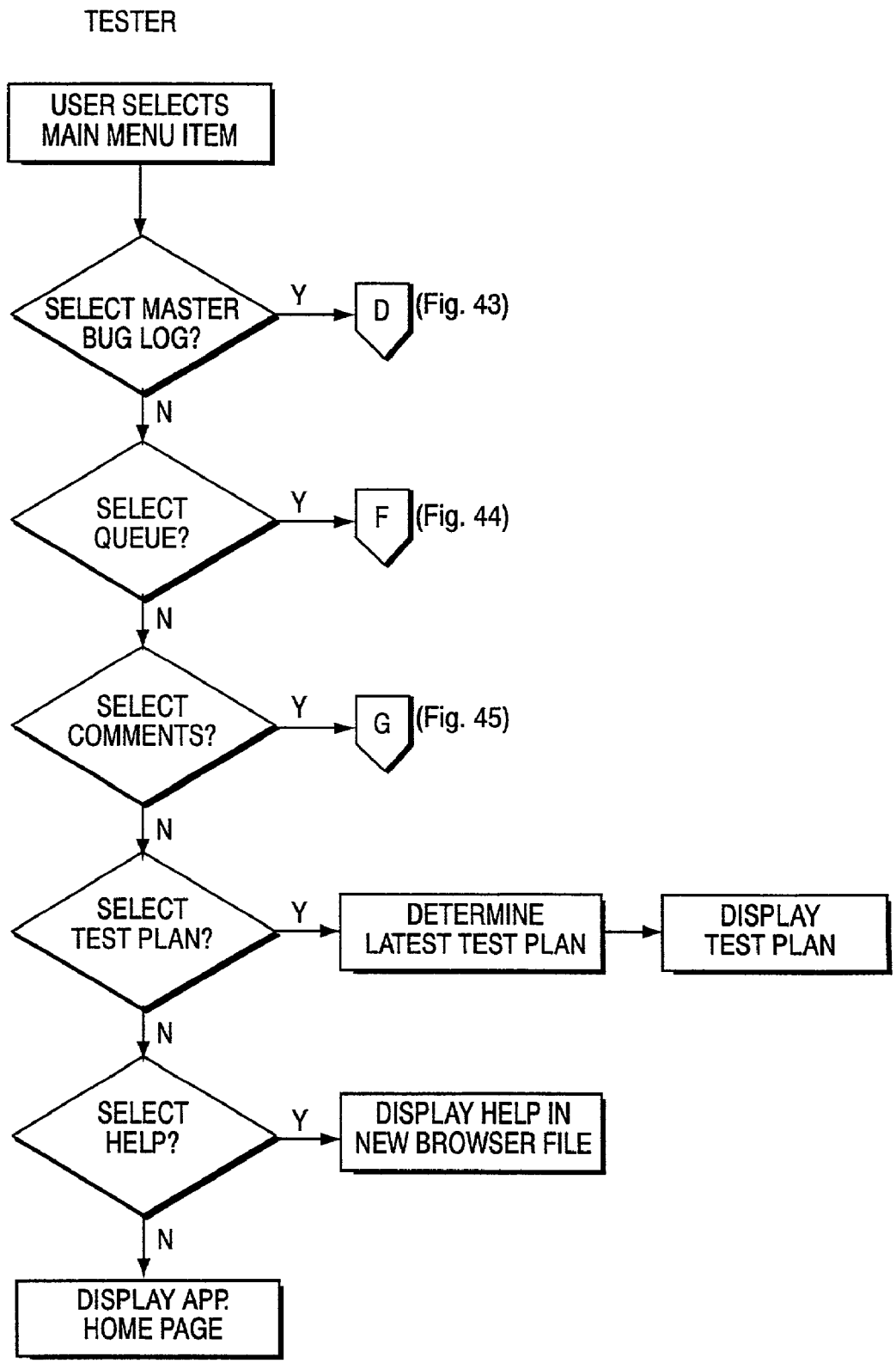
FIG. 42 is a flowchart which shows an illustrative sequence of processing operations for a project tester.
Figure 43:
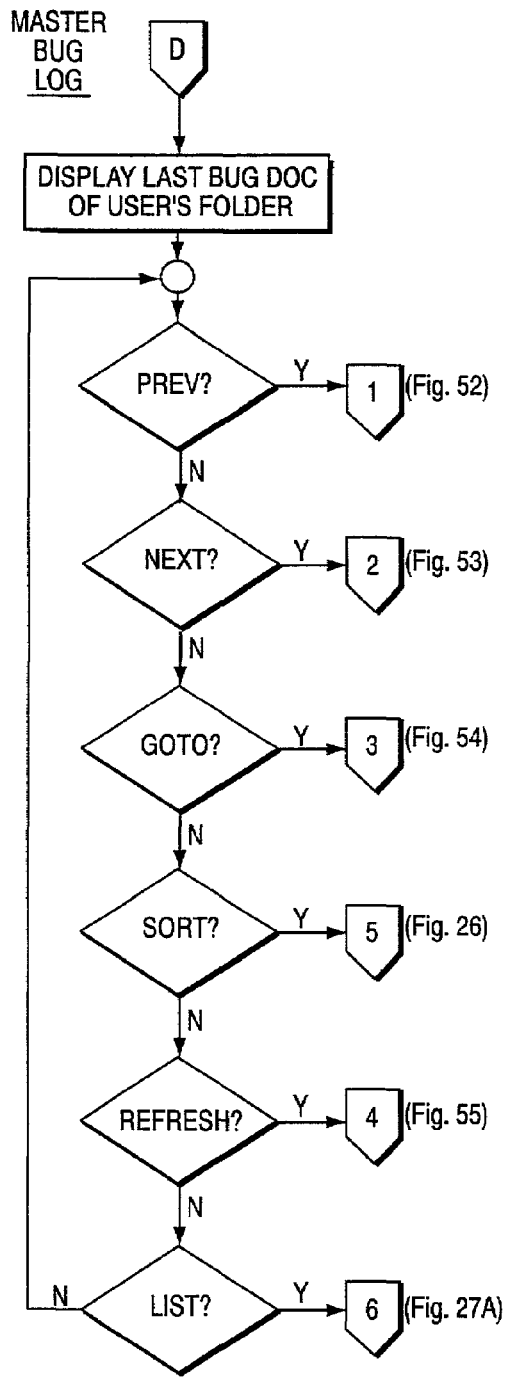
FIG. 43 is a flowchart showing illustrative master bug log processing for a tester and corporate contact.
Figure 44:
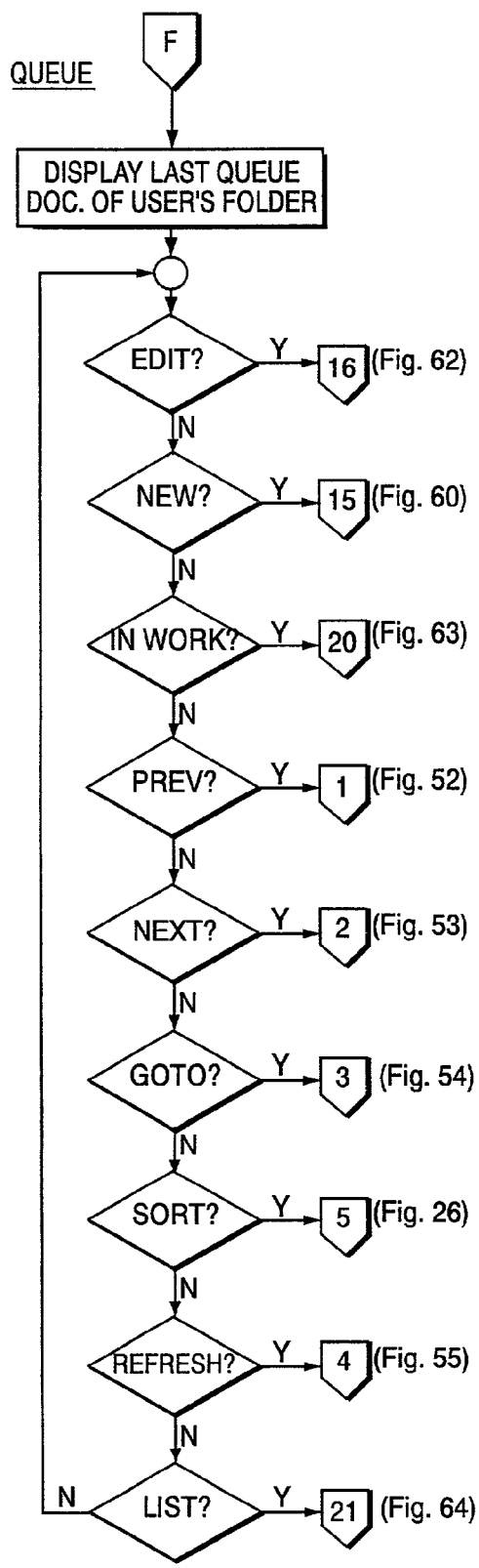
FIG. 44 shows illustrative queue processing for a tester.
Figure 45:
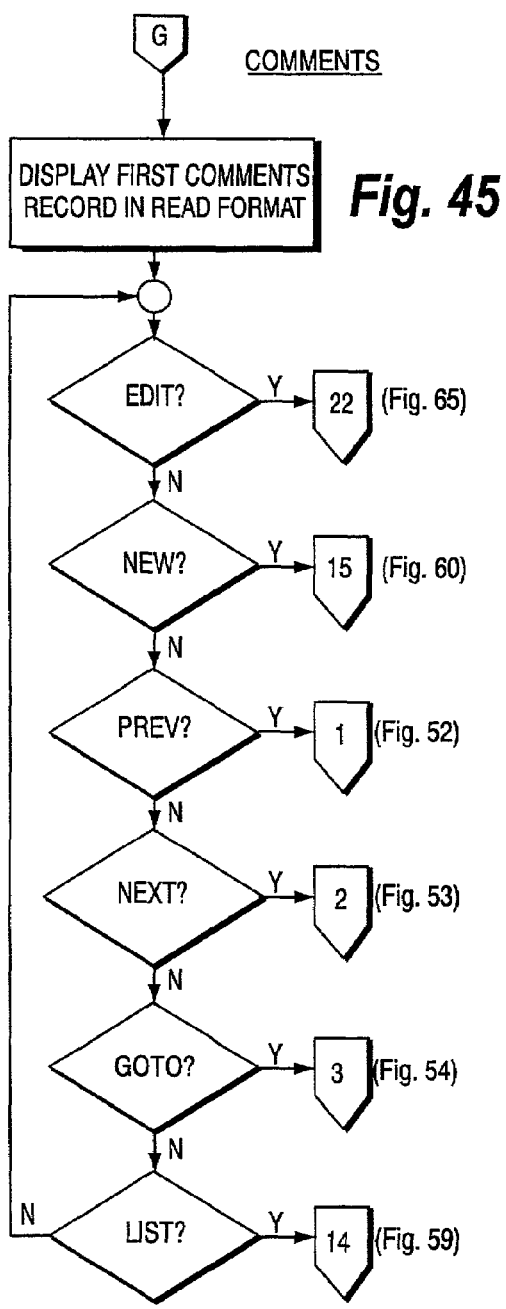
FIG. 45 shows an illustrative sequence of operations involved in comments menu processing for a tester.

FIG. 42 is a flowchart which shows an illustrative sequence of processing operations for a project tester. FIG. 43 is a flowchart showing illustrative master bug log processing for a tester and corporate contact. FIG. 44 shows illustrative queue processing for a tester. FIG. 45 shows an illustrative sequence of operations involved in comments menu processing for a tester.

Figure 46:
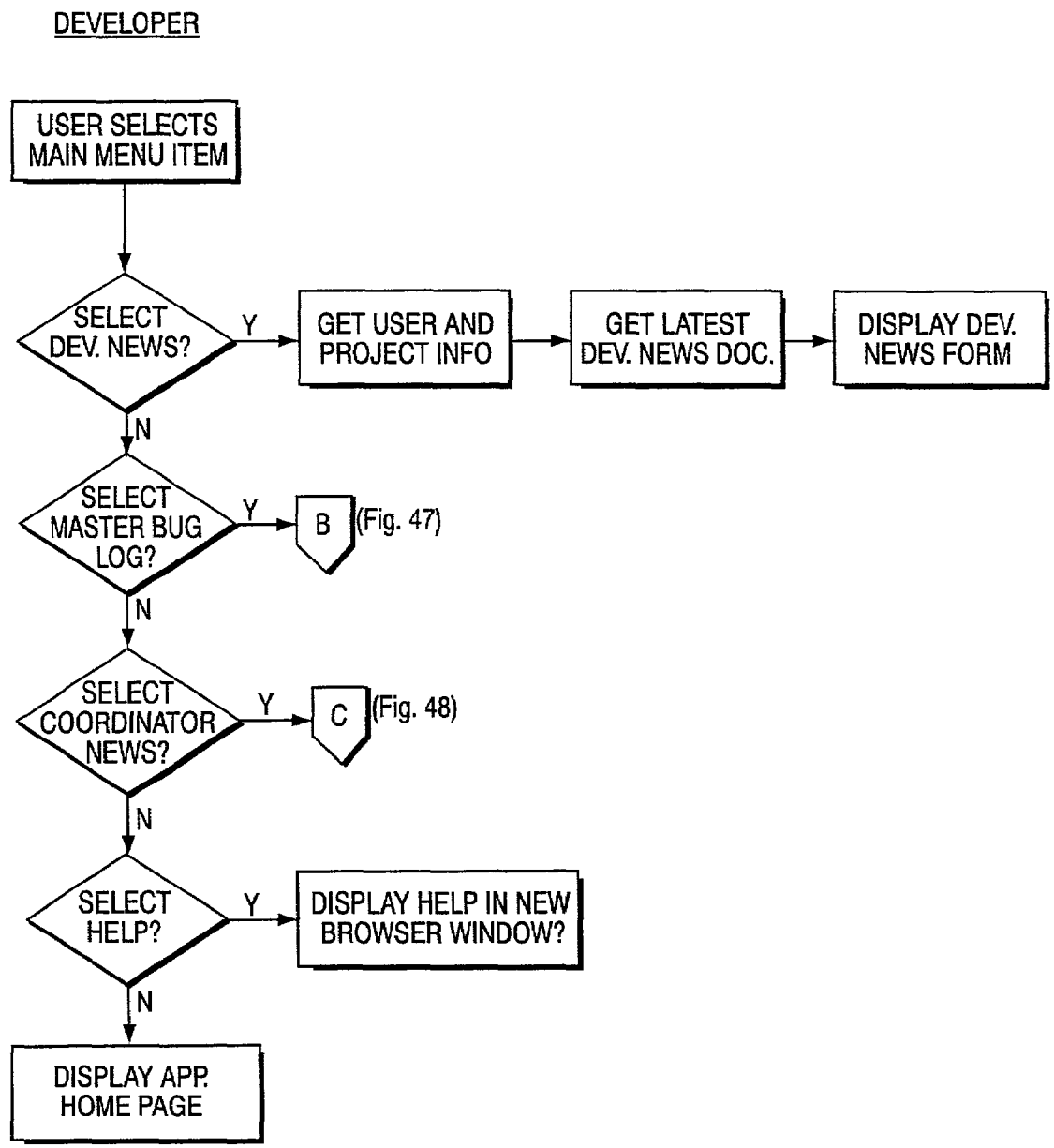
FIG. 46 shows an illustrative sequence of operations involved in developer processing.
Figure 47:
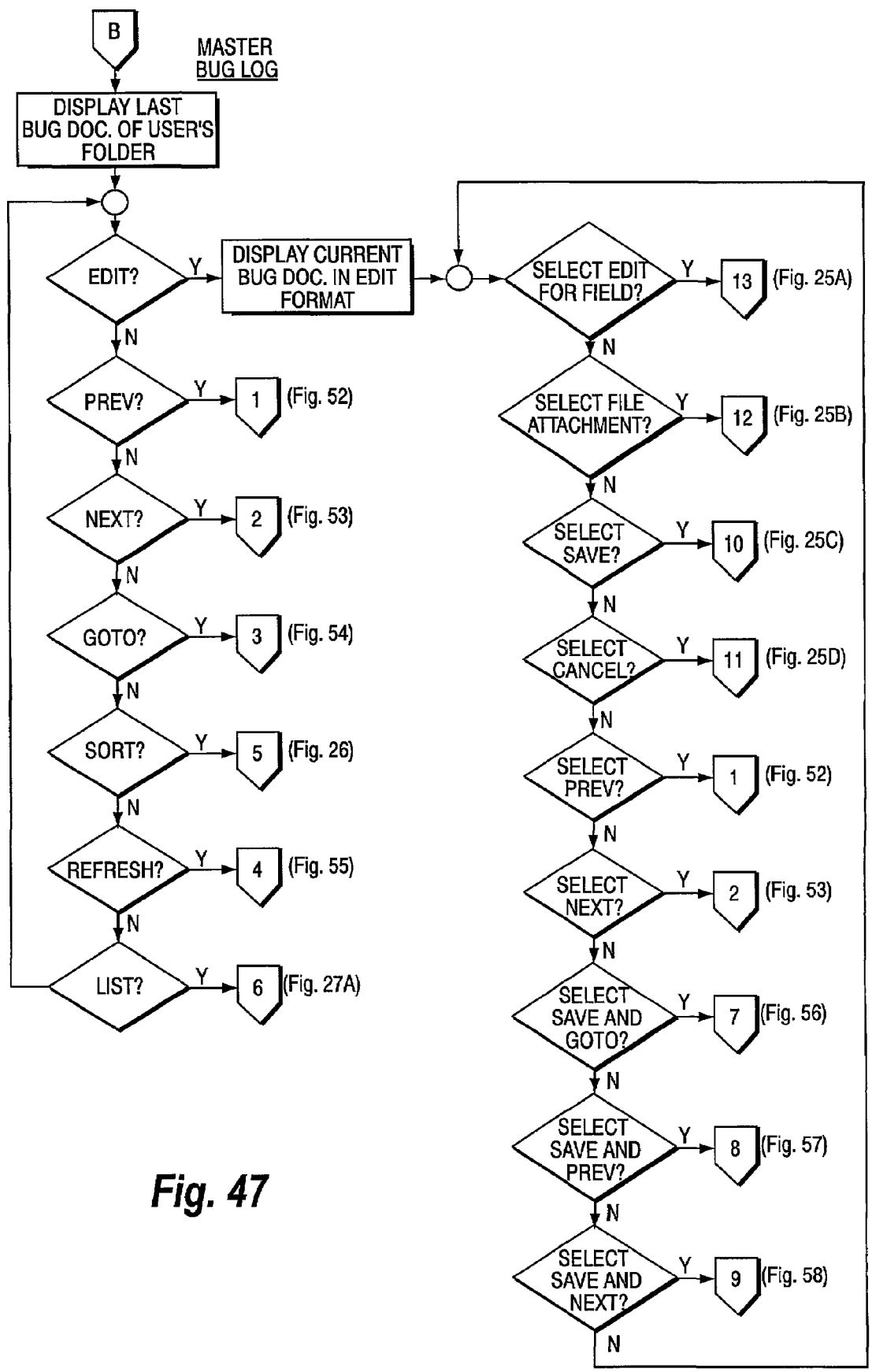
FIG. 47 shows an illustrative sequence of processing operations involved in developer and translator master bug log processing.
Figure 48:
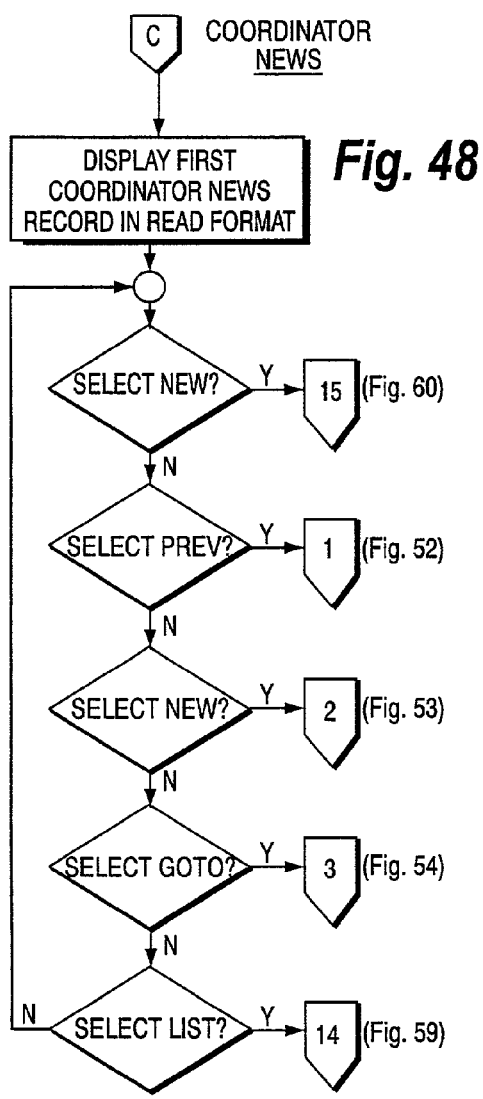
FIG. 48 shows an illustrative sequence of operations involved in the developer coordinator news menu processing.

FIG. 46 shows an illustrative sequence of operations involved in developer processing. FIG. 47 shows an illustrative sequence of processing operations involved in developer and translator master bug log processing. FIG. 48 shows an illustrative sequence of operations involved in the developer coordinator news menu processing.

Figure 50:
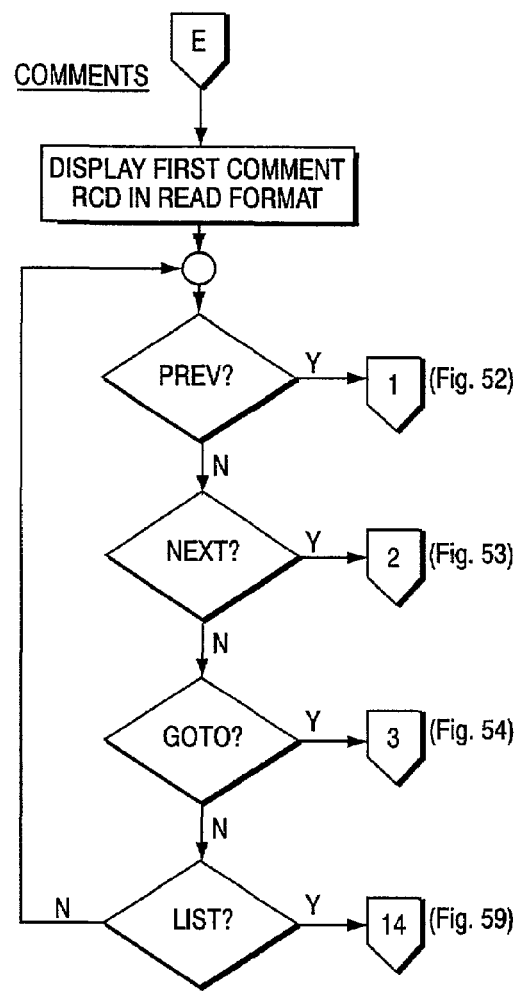
FIG. 50 shows an illustrative sequence operations in corporate contact comment menu processing.
Figure 49:
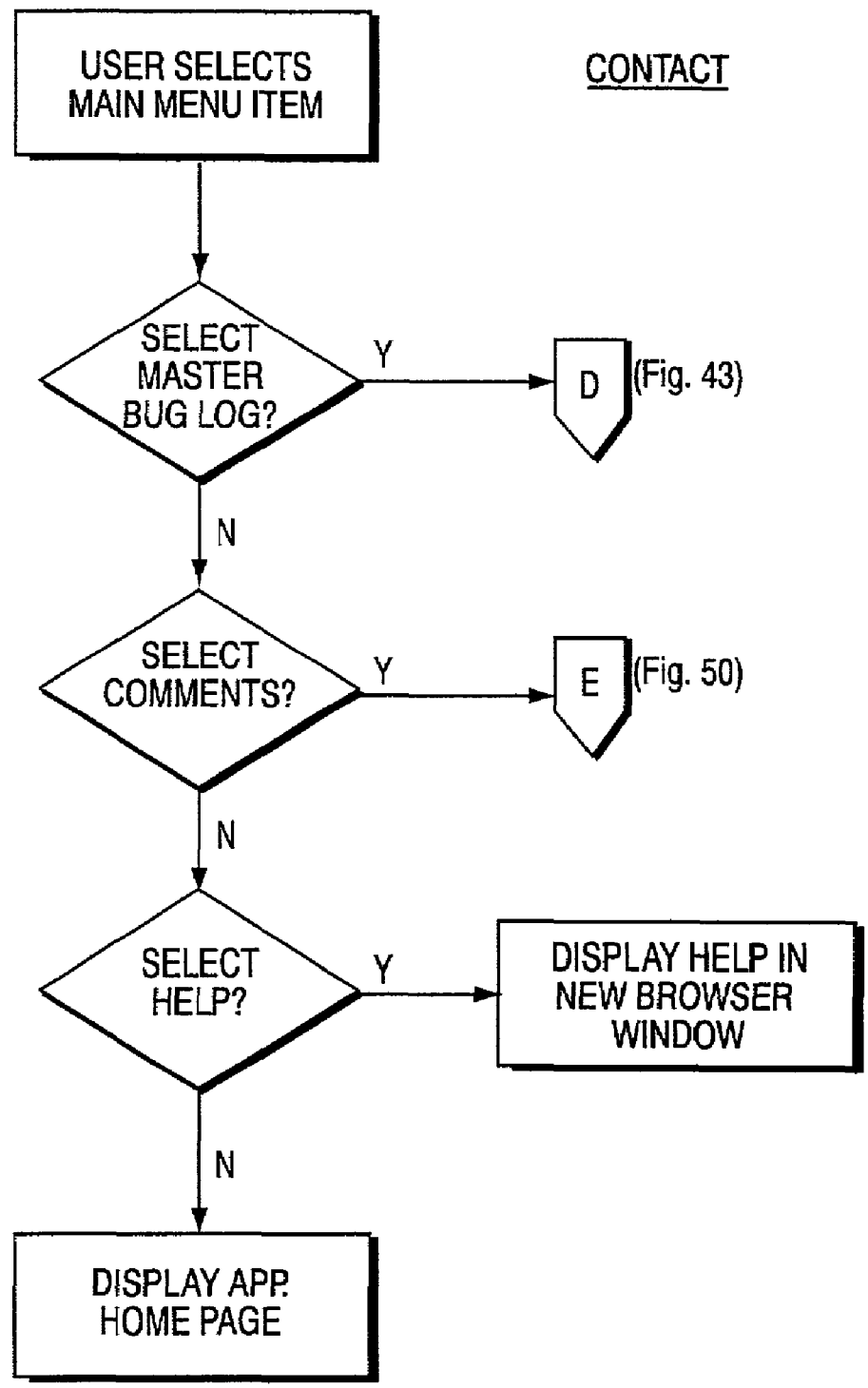
FIG. 49 shows an illustrative sequence of operations involved in corporate contact processing.
Figure 51:
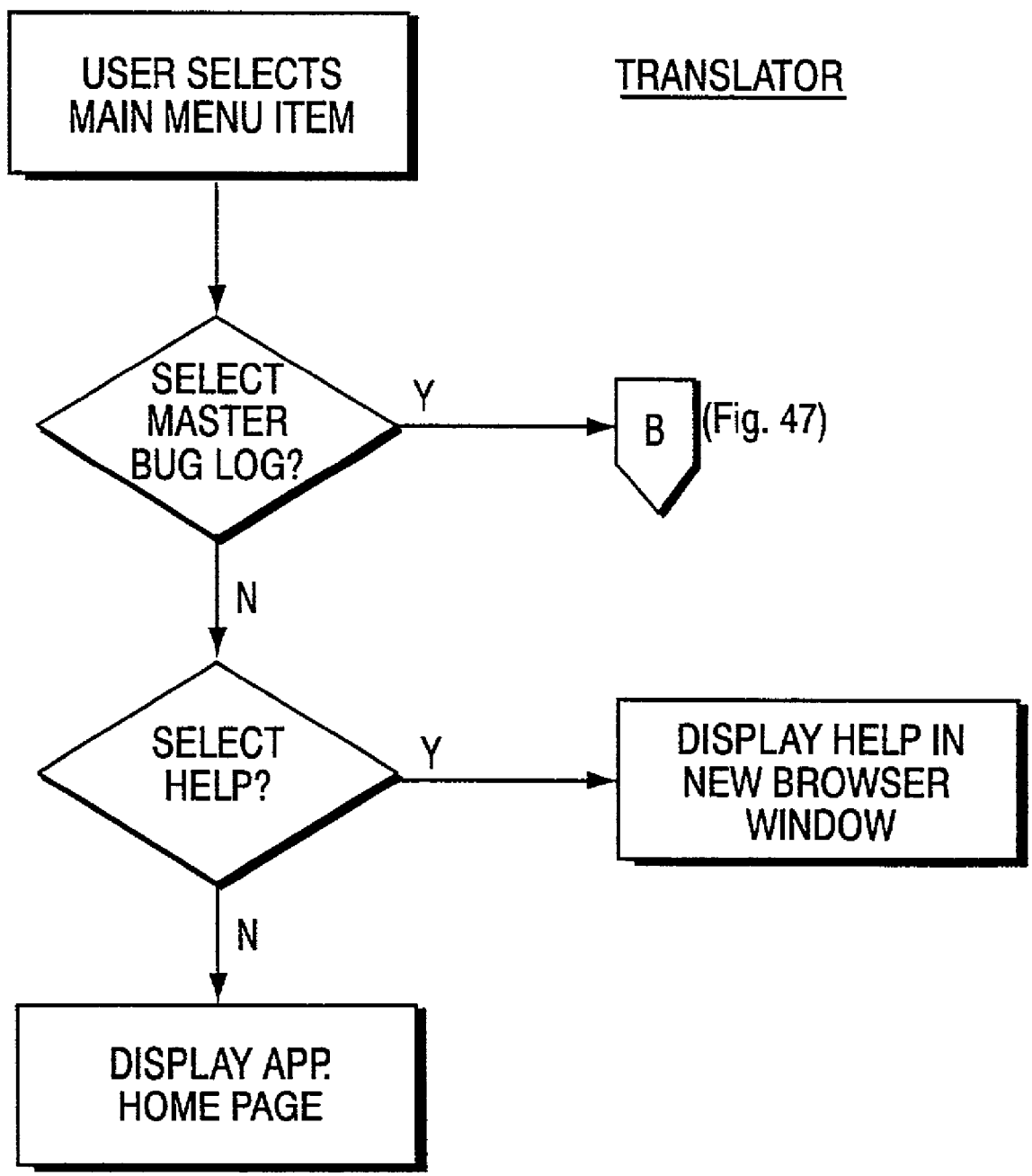
FIG. 51 shows an illustrative sequence of operations involved in translator processing.

FIG. 49 shows an illustrative sequence of operations involved in corporate contact processing. FIG. 50 shows an illustrative sequence operations in corporate contact comment menu processing. FIG. 51 shows an illustrative sequence of operations involved in translator processing.

FIGS. 52-65 are figures showing processor operations involved in various miscellaneous functions that have been referred to herein. These figures are believed to be self-explanatory to those skilled in the art.

Figure 62:
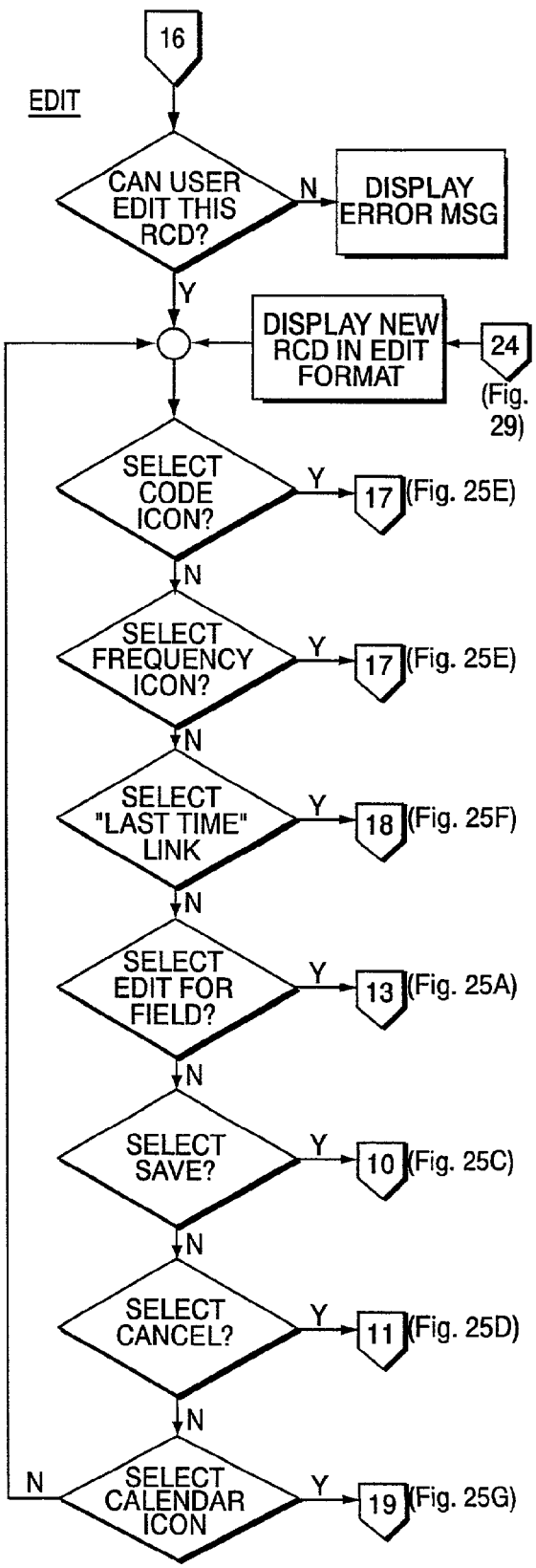
FIG. 62 is a flowchart illustrating an "edit" function selectable by certain identified authorized users.
Figure 65:
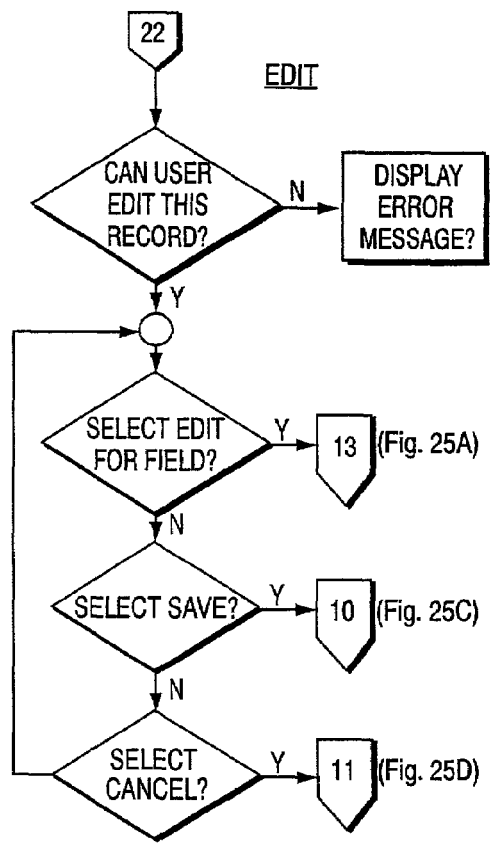
FIG. 65 is a flowchart illustrating an "edit" function selectable by certain authorized users.
Figure 60:
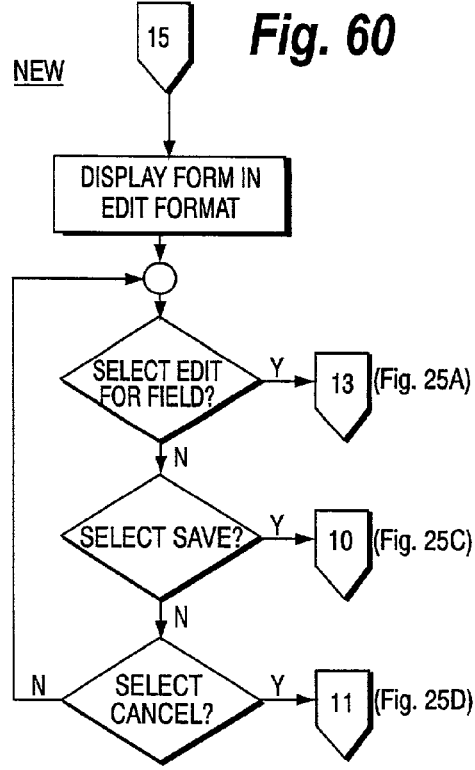
FIG. 60 is a flowchart illustrating a first "new" function selectable by certain authorized users.
Figure 61:
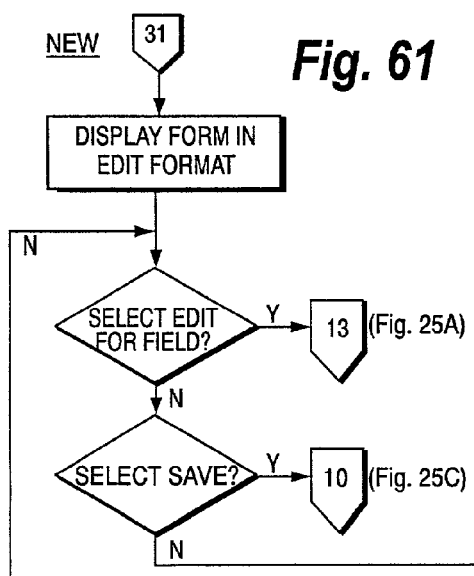
FIG. 61 is a flowchart illustrating a "new" function selectable by other authorized users.
Figure 52:
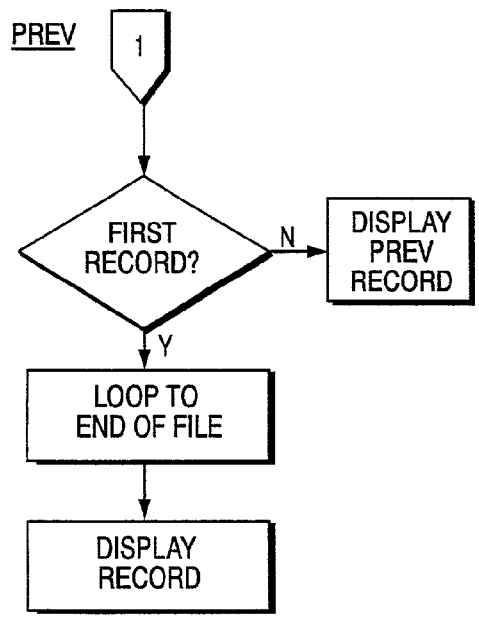
FIG. 52 is a flowchart illustrating a "previous" function.
Figure 53:
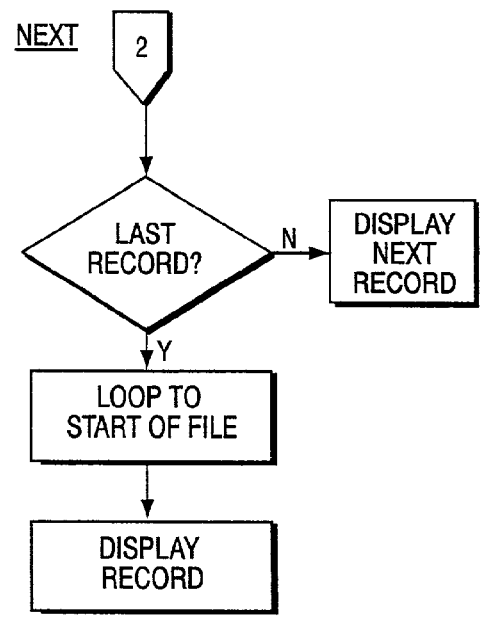
FIG. 53 is a flowchart illustrating a "next" function.
Figure 54:
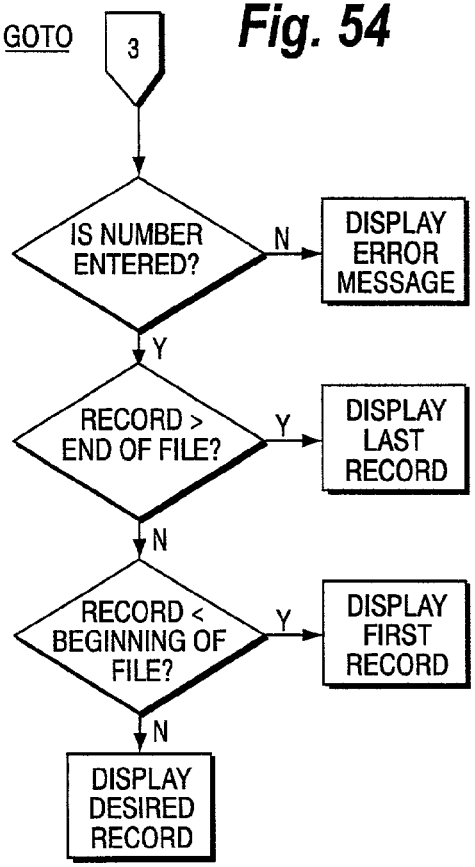
FIG. 54 is a flowchart illustrating a "go to" function.
Figure 55:
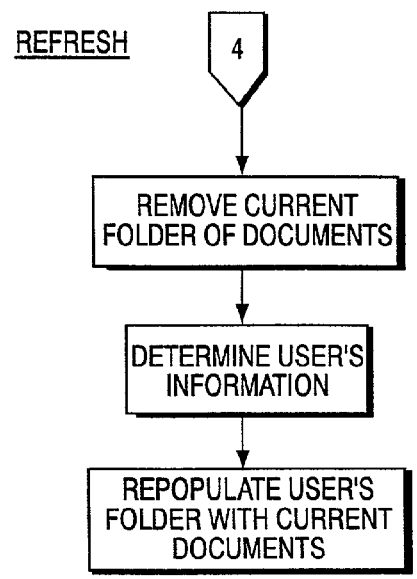
FIG. 55 is a flowchart illustrating a "refresh" function.
Figure 56:
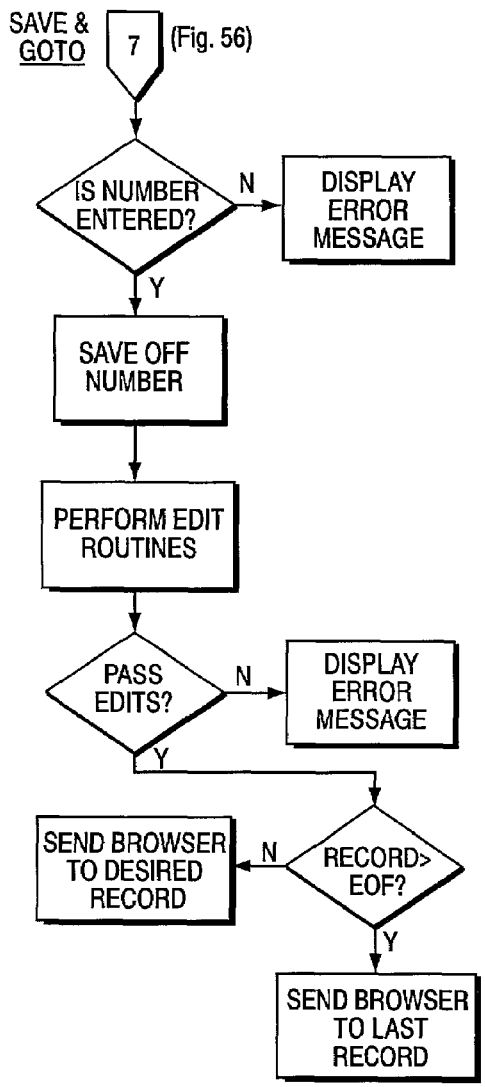
FIG. 56 is a flowchart illustrating a "save" and "go to" function.
Figure 57:
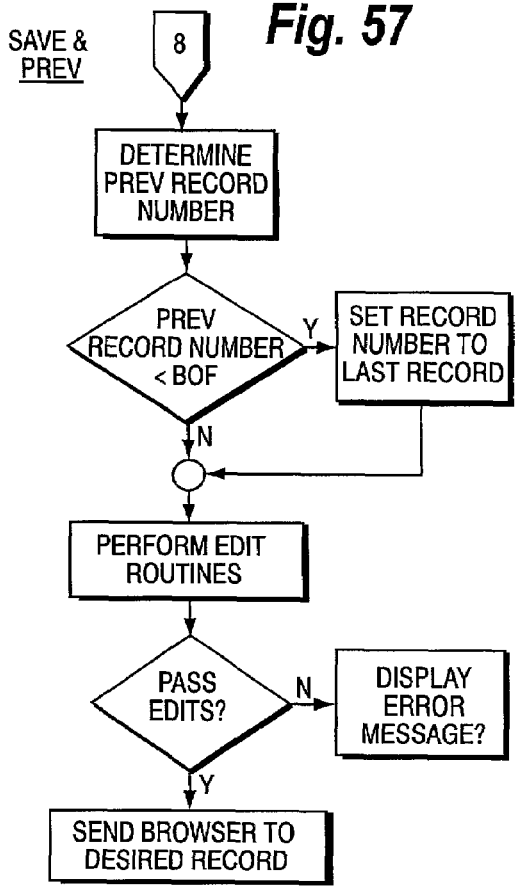
FIG. 57 is a flowchart illustrating a "save and previous" function.
Figure 58:
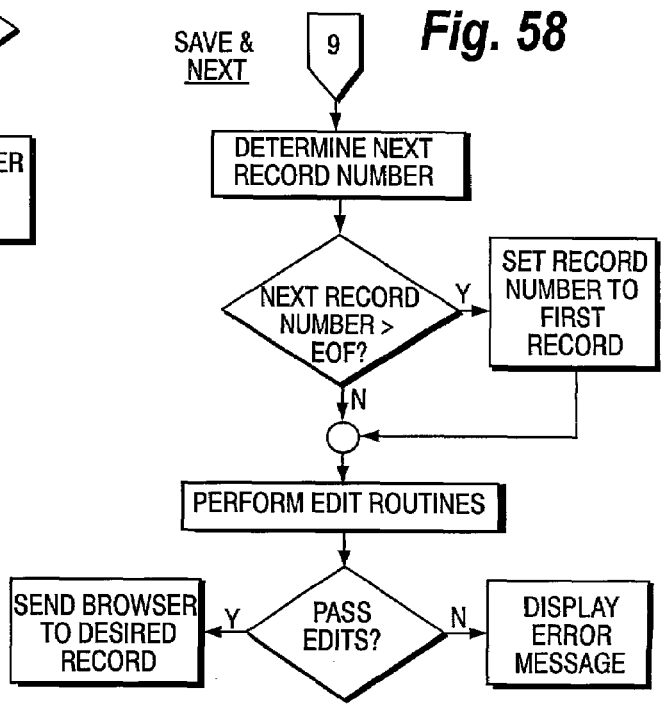
FIG. 58 is a flowchart illustrating a "save and next" function.

FIG. 52 is a flowchart illustrating a "previous" function. FIG. 53 is a flowchart illustrating a "next" function. FIG. 54 is a flowchart illustrating a "go to" function. FIG. 55 is a flowchart illustrating a "refresh" function. FIG. 56 is a flowchart illustrating a "save and go to" function. FIG. 57 is a flowchart illustrating a "save and previous" function. FIG. 58 is a flowchart illustrating a "save and next" function. FIG. 59 is a flowchart illustrating a "list" function. FIG. 60 is a flowchart illustrating a first "new" function selectable by certain authorized users. FIG. 61 is a flowchart illustrating a "new" function selectable by other authorized users. FIG. 62 is a flowchart illustrating an "edit" function selectable by certain identified authorized users. FIG. 63 is a flowchart illustrating an "in work" function selectable by a tester from the queue menu. FIG. 64 is a flowchart illustrating a "list" function selectable by certain authorized users. FIG. 65 is a flowchart illustrating an "edit" function selectable by certain authorized users.

The illustrative embodiments may be modified for applicability to a wide range of software package bug tracking applications as will be apparent to those skilled in the art. Moreover, the illustrative embodiments may be advantageously modified for applicability to tracking errors in other types of complex products under development, particularly where there is need to enhance real time communication capability between remotely located development team members.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A software bug related processing and tracking system comprising:
    a first computer system for use by a software developer including a processing system for executing an Internet browser;
    an encryption system coupled to said first computer for encrypting data transmitted via the Internet by said first computer;
    a second computer system for use by a software tester including a processing system for executing an Internet browser;
    a third computer system for use by a software project coordinator including a processing system for executing an Internet processor; and
    a web server for storing a bug tracking system and for permitting an authorized software developer, an authorized software tester, and an authorized project coordinator to access said bug tracking system and to communicate with each other via said bug tracking system, and in response to received user identification information, including a password, for providing at least one bug tracking related menu including contents which vary based on the user's role as a software developer, software tester or software project coordinator in the software development process, wherein said web server is operable to transmit a bug related message using an accessed bug related menu from a computer of either the first computer system, the second computer system or the third computer system to another computer of either the first computer system, the second computer system or the third computer system, wherein said web server is operable to access a test plan identifying a plurality of tests to be performed with respect to an identified software package, and wherein said web server is operable to edit bug related information in response to user input via at least one bug tracking related menu.

2. The system according to claim 1, wherein the second computer system for use by a software tester is a computer system for use by a video game software tester and wherein said web server is operable to provide a bug tracking related menu tailored to video game testers.

3. The system according to claim 1, wherein the third computer system for use by a software project coordinator is a computer system for use by a video game software project coordinator and wherein said web server is operable to provide a bug tracking related menu tailored to video game project coordinators.

4. The system according to claim 1, wherein the first computer system for use by a software developer is a computer system for use by a video game software developer and wherein said web server is operable to provide a bug tracking related menu tailored to video game developers.

5. The system according to claim 1, wherein the first computer system for use by a software developer is a computer system for use by a video game software translator and wherein said web server is operable to provide a bug tracking related menu tailored to video game translators.

6. The system according to claim 1, wherein said web server includes an associated data base storing a plurality of bug tracking menus related to identified software under development, and wherein said web server is operable to provide said plurality of bug tracking menus related to identified software under development.

7. The system according to claim 1, wherein said web server includes an associated data base storing a master bug log identifying a plurality of bugs in a selected software package under development.

8. The system according to claim 1, wherein said web server includes a database storing data indicative of a plurality of bugs in a selected software package; and wherein said web server is operable to sort the bugs based upon any one of a plurality of sorting criteria selected by a user.

9. The system according to claim 8, wherein said sorting criteria includes video game stage.

10. The system according to claim 8, wherein said sorting criteria includes a video game character.

11. The system according to claim 8, wherein said sorting criteria includes the type of bug.

12. The system according to claim 8, wherein said sorting criteria includes the reported date of the bug.

13. The system according to claim 1, wherein said web server is operable to transmit a bug related message using an accessed bug related menu from a computer of the second computer system to a computer of the third computer system.

14. The system according to claim 1, wherein said web server is operable to transmit a bug related message using an accessed bug related menu from a computer of the third computer system to another computer of the third computer system.

15. The system according to claim 1, wherein said web server is operable to associate a digitized video file for visually displaying at least one screen display showing an identified bug with a bug description.

16. A method for processing and monitoring software bug related information for use in software package development, the method being performed by executing on a computer instructions tangibly stored on a computer-readable storage medium, the method comprising:

providing a first computer system for use by a software developer including a processing system for executing an Internet browser, an encryption system being coupled to said first computer for encrypting data transmitted via the Internet by said first computer;

providing a second computer system for use by a software tester including a processing system for executing an Internet browser;

providing a third computer system for use by a software project coordinator including a processing system for executing an Internet processor; and enabling a web server, the web server being configured to (1) store a bug tracking system, (2) permit an authorized software developer, an authorized software tester, and an authorized project coordinator to access said bug tracking system and to communicate with each other via said bug tracking system, and (3) in response to received user identification information, including a password, provide at least one bug tracking related menu including contents which vary based on the user's role as a software developer, software tester or software project coordinator in the software development process, wherein said web server is operable to transmit a bug related message using an accessed bug related menu from a computer of either the first computer system, the second computer system or the third computer system to another computer of either the first computer system, the second computer system or the third computer system, wherein said web server is operable to access a test plan identifying a plurality of tests to be performed with respect to an identified software package, and wherein said web server is operable to edit bug related information in response to user input via at least one bug tracking related menu.

17. The method according to claim 16, wherein the second computer system for use by a software tester is a computer system for use by a video game software tester and wherein said web server is operable to provide a bug tracking related menu tailored to video game testers.

18. The method according to claim 16, wherein the third computer system for use by a software project coordinator is a computer system for use by a video game software project coordinator and wherein said web server is operable to provide a bug tracking related menu tailored to video game project coordinators.

19. The method according to claim 16, wherein the first computer system for use by a software developer is a computer system for use by a video game software developer and wherein said web server is operable to provide a bug tracking related menu tailored to video game developers.

20. The method according to claim 16, wherein the first computer system for use by a software developer is a computer system for use by a video game software translator and wherein said web server is operable to provide a bug tracking related menu tailored to video game translators.

21. The method according to claim 16, wherein said web server includes an associated data base storing a plurality of bug tracking menus related to identified software under development, and wherein said web server is operable to provide said plurality of bug tracking menus related to identified software under development.

22. The method according to claim 16, wherein said web server includes an associated data base storing a master bug log identifying a plurality of bugs in a selected software package under development.

23. The method according to claim 16, wherein said web server includes a database storing data indicative of a plurality of bugs in a selected software package; and wherein said web server is operable to sort the bugs based upon any one of a plurality of sorting criteria selected by a user.

24. The method according to claim 23, wherein said sorting criteria includes video game stage.

25. The method according to claim 23, wherein said sorting criteria includes a video game character.

26. The method according to claim 23, wherein said sorting criteria includes the type of bug.

27. The method according to claim 23, wherein said sorting criteria includes the reported date of the bug.

28. The method according to claim 16, wherein said web server is operable to transmit a bug related message using an accessed bug related menu from a computer of the second computer system to a computer of the third computer system.

29. The method according to claim 16, wherein said web server is operable to transmit a bug related message using an accessed bug related menu from a computer of the third computer system to another computer of the third computer system.

30. The method according to claim 16, wherein said web server is operable to associate a digitized video file for visually displaying at least one screen display showing an identified bug with a bug description.

* * * * *